(12) United States Patent
Wagner et al.

(10) Patent No.: US 12,209,023 B2
(45) Date of Patent: Jan. 28, 2025

(54) LOW TEMPERATURE, HIGH YIELD SYNTHESIS OF HYDROGEN TERMINATED HIGHLY POROUS AMORPHOUS SILICON, AND NANOMATERIALS AND COMPOSITES FROM ZINTL PHASES

(71) Applicant: The George Washington University, Washington, DC (US)

(72) Inventors: Michael J. Wagner, Rockville, MD (US); Nathan A. Banek, Rockville, MD (US)

(73) Assignee: The George Washington University, Washington, DC (US)

(*) Notice: Subject to any disclaimer, the term of this patent is extended or adjusted under 35 U.S.C. 154(b) by 708 days.

(21) Appl. No.: 17/470,621

(22) Filed: Sep. 9, 2021

(65) Prior Publication Data

US 2022/0073356 A1 Mar. 10, 2022

Related U.S. Application Data

(63) Continuation-in-part of application No. 16/478,327, filed as application No. PCT/US2017/055069 on Oct. 4, 2017, now Pat. No. 11,158,845.

(60) Provisional application No. 63/166,618, filed on Mar. 26, 2021, provisional application No. 62/450,392, filed on Jan. 25, 2017.

(51) Int. Cl.
| | | |
|---|---|---|
| C01B 33/021 | (2006.01) | |
| C06B 43/00 | (2006.01) | |
| H01M 4/58 | (2010.01) | |
| H01M 10/0525 | (2010.01) | |

(52) U.S. Cl.
CPC ........... *C01B 33/021* (2013.01); *C06B 43/00* (2013.01); *H01M 4/58* (2013.01); *H01M 10/0525* (2013.01); *C01P 2002/72* (2013.01); *C01P 2002/82* (2013.01); *C01P 2004/04* (2013.01); *C01P 2006/12* (2013.01); *C01P 2006/16* (2013.01); *C01P 2006/40* (2013.01)

(58) Field of Classification Search
None
See application file for complete search history.

(56) References Cited

U.S. PATENT DOCUMENTS

| | | | |
|---|---|---|---|
| 4,071,415 A | 1/1978 | Wong | |
| 7,875,388 B2 | 1/2011 | Le | |
| 2007/0098988 A1 | 5/2007 | Cho et al. | |
| 2008/0178974 A1* | 7/2008 | Rudolf | C06B 33/08 149/2 |
| 2009/0186267 A1* | 7/2009 | Tiegs | H01M 4/38 429/129 |
| 2010/0310941 A1 | 12/2010 | Kumta et al. | |
| 2013/0045420 A1* | 2/2013 | Biswal | C25F 3/12 252/502 |
| 2016/0049656 A1 | 2/2016 | Laicer et al. | |
| 2016/0351894 A1 | 12/2016 | Wagner et al. | |

FOREIGN PATENT DOCUMENTS

| | | |
|---|---|---|
| CN | 104030290 A | 9/2014 |
| CN | 105347347 A | 2/2016 |
| CN | 105529442 A | 4/2016 |
| CN | 106299362 A | 1/2017 |

OTHER PUBLICATIONS

Plummer et al., "Combined Thermal and FTIR Analysis of Porous Silicon Based Nano-Energetic Films", RSC Advances, vol. 7, pp. 7338-7345, 2017.
Abraham et al., "Combustion of Energetic Porous Silicon Composites Containing Different Oxidizers", Propellants Explos. Pyrotech., vol. 41, pp. 179-188, 2016.
Li et al., "Hydrogen-Terminated Mesoporous Silicon Monoliths with Huge Surface Area as Alternative Si-based Visible Light-Active Photocatalysts", RSC Advances, vol. 6, pp. 71092-71099, 2016.
Adams et al., "Silicon Quantum Dots for Energetic Material Applications", App. Phys. Lett., vol. 112, pp. 233108-1-233108-5, 2018.
Kovalev et al., "Strong Explosive Interaction of Hydrogenated Porous Silicon with Oxygen at Cryogenic Temperatures", Phys. Rev. Lett., vol. 87, No. 6, pp. 068301-1-068301-4, Aug. 2001.
Al-kadumi et al., "The Fabrication of Porous Silicon by Electrochemical Etching with Photo Assisted", Int. Journal of Enhanced Res. in Sci, Tech. & Eng., vol. 3, No. 11, pp. 167-171, Nov. 2014.
Hikata et al., "Changes in the Geometric Structure and Hydrogen-Termination Modify the Electronic and Optical Properties of Porous Silicon", Optik—International Journal for Light and Electron Optics, vol. 224, No. 165539, 2020, 7 pgs.
Zhang et al., "Effects of Terminated Atoms, Porosity and Drilling Orientations on the Band Structure of Porous Silicon", Comp. Mat. Sci., vol. 136, pp. 126-132, 2017.
Plummer et al., "Investigating the Performance and Behaviour of Porous Silicon Energetic Materials", Thesis, Doctor of Philosophy, Flinders University, Adelaide, South Australia, Nov. 2017, 202 pgs.
Karbassian, "Porous Silicon", Porosity—Process, Technologies and Applications, Chapter 1, IntechOpen, 2018, 35 pgs.
Hernandez-Montelongo et al., "Nanostructured Porous Silicon: The Winding Road from Photonics to Cell Scaffolds—a Review", Frontiers in Bioengineering and Biotechnology, vol. 3, Article 60, May 2015, pp. 1-15.

(Continued)

*Primary Examiner* — Carlos Barcena
(74) *Attorney, Agent, or Firm* — BLANK ROME LLP

(57) ABSTRACT

The present disclosure relates to an improved process for the synthesis of hydrogen terminated silicon from Zintl phases. The hydrogen terminated silicon is useful, for example, as explosives, chemical and biochemical sensors, optoelectronic materials and Li-ion battery anode ion storage materials. The present disclosure also relates to an improved process for the synthesis of nanomaterials and composites from Zintl phases. The nanomaterials and composites are useful, for example, as ion storage materials.

40 Claims, 47 Drawing Sheets

(56) References Cited

OTHER PUBLICATIONS

Chinese Office Action and English-language translation for CN 2017800827660, dated Sep. 15, 2022, 23 pgs.
A. Godin, Shape-Preserving Physical and Chemical Transformation of Si and $SiO_2$ Nano- and Microstructures, Dissertatin, 2014, 193 pages.
Levin et al., The System $NaCl$—$AlCl_3$, Journal of Research of the National Bureau of Standards—A. Physics and Chemistry, 78A(4), 505-507, 1974.
O. M. Nayfeh, et al., "Thin Film Silicon Nanoparticle UV Photodetector", IEEE Photonics Technology Letters, vol. 16, No. 8, Aug. 2004; pp. 1927-1929.
L. T. Canham, "Silicon Quantum Wire Array Fabrication by Electrochemical and Chemical Dissolution of Wafers", Appl. Phys. Lett., vol. 57, No. 10, Sep. 1990, pp. 1046-1048.
"Mineral Commodity Summaries 2015", U.S. Department of the Interior, US Geological Survey, 2015, 196 pgs.
F. Dai, et al., "Amorphous $Si/SiO_x/SiO_2$ Nanocomposites via Facile Scalable Synthesis as Anode Materials for Li-ion Batteries with Long Cycling Life", RSC Advances, www.rsc.org/advances; vol. 2, 2012, pp. 12710-12713.
H. Kim, et al., "A Critical Size of Silicon Nano-Anodes for Lithium Rechargeable Batteries", Communications, Angew. Chem. Int. Ed., www.angewandte.org, vol. 49, 2010, pp. 2146-2149.
J. Zhou, et al., "Solvothermal Synthesis of a Silicon Hierarchical Structure Composed of 20 nm Si Nanoparticles Coated with Carbon for High Performance Li-ion Battery Anodes", Dalton Transactions, The Royal Society of Chemistry, vol. 45, 2016, pp. 13667-13670.
C. K. Chan, et al., "Solution-Grown Silicon Nanowires for Lithium-Ion Battery Anodes", ACS Nano, www.acsnano.org, vol. 4, No. 3, 2010, pp. 1443-1450.
Y. Zhao, et al., "Hierarchical Micro/Nano Porous Silicon Li-ion Battery Anodes", Chem. Commun., www.rsc.org/chemcomm, vol. 48, 2012, pp. 5079-5081.
R. Yi, et al., "Micro-Sized Si—C Composite with Interconnected Nanoscale Building Blocks as High-Performance Anodes for Practical Application in Lithium-Ion Batteries", www.MaterialsViews.com, Adv. Energy Mater., vol. 3, 2013, pp. 295-300.
Z. Lu, et al., "Synthesis of Ultrathin Silicon Nanosheets by Using Graphene Oxide as Template", Chemistry of Materials, vol. 23, 2011, pp. 5293-5295.
A. Magasinski, et al., "High-Performance Lithium-ion Anodes Using a Hierarchical Bottom-up Approach", Nature Materials, www.nature.com/naturematerials, vol. 9, Apr. 2010, pp. 353-358.
M. W. Forney, et al., "High Performance Silicon Free-Standing Anodes Fabricated by Low-Pressure and Plasma-Enhanced Chemical Vapor Deposition onto Carbon Nanotube Electrodes", Journal of Power Sources, vol. 228, 2013, pp. 270-280.
S. D. Beattie, et al., "Si Electrodes for Li-Ion Batteries—A New Way to Look at an Old Problem", Journal of the Electrochemical Society, vol. 155, No. 2, 2008, pp. A158-A163.
M. N. Obrovac, et al., "Structural Changes in Silicon Anodes During Lithium Insertion/Extraction", Electrochemical and Solid-State Letters, vol. 7, No. 5, 2004, pp. A93-A96.
F. Erogbogbo, et al., "On-Demand Hydrogen Generation Using Nanosilicon: Splitting Water without Light, Heat, or Electricity", Nano Letters, pubs.acs.org/NanoLett, vol. 13, 2013, pp. 451-456.
D. Nainer, et al., "Hydrogen-Capped Silicon Nanoparticles as a Potential Hydrogen Storage Material: Synthesis, Characterization, and Hydrogen Release", Chemistry of Materials, vol. 22, 2010, pp. 487-493.
Z. Kang, et al., "Silicon Quantum Dots: A General Photocatalyst for Reduction, Decomposition, and Selective Oxidation Reactions", JACS Communications, vol. 129, 2007, pp. 12090-12091.
X. Duan, et al., "High-Performance Thin-Film Transistors using Semiconductor Nanowires and Nanoribbons", Nature, www.nature.com/nature, vol. 425, Sep. 2003, pp. 274-278.
C. Robelin, et al., "Thermodynamic Evaluation and Optimization of the $(NaCl+KCl+AlCl_3)$ System", J. Chem. Thermodynamics, vol. 36, 2004, 683-699.
"Hollow Carbon Nanosphere Composite Based Secondary Cell Electrodes", Technology Commercialization Office, The George Washington University, 3 pgs.
S. Xiu, et al., "Bio-Oil Production and Upgrading Research: A Review", Renewable and Sustainable Energy Reviews, vol. 16, 2012, pp. 4406-4414.
D. Woolf, et al., "Biofuels from Pyrolysis in Perspective: Trade-Offs Between Energy Yields and Soil Carbon Additions", Environmental Science & Technology, vol. 48, 2014, pp. 6492-6499.
J. L. Murray, et al., "The Al—Si (Aluminum-Silicon) System", Bulletin of Alloy Phase Diagrams, vol. 5, No. 1, 1984, pp. 74-84.
M. N. Obrovac, et al., "Reversible Cycling of Crystalline Silicon Powder", Journal of the Electrochemical Society, vol. 154, No. 2, 2007, pp. A103-A108.
D. Aurbach, et al., "Design of Electrolyte Solutions for Li and Li-ion Batteries: A Review", Electrochimica Acta, vol. 50, 2004, pp. 247-254.
N. Liu, et al., "A Yolk-Shell Design for Stabilized and Scalable Li-Ion Battery Alloy Anodes", Nano Letters, vol. 12, 2012, pp. 3315-3321.
B. R. Ortiz, et al., "Potential for High Thermoelectric Performance in N-Type Zintil Compounds: A Case Study of Ba Doped $KAlSb_4$,", Royal Society of Chemistry, vol. 5, Jan. 2017, 30 pgs.
International Search Report & Written Opinion for PCT/US2017/055069, dated Dec. 14, 2017, 7 pages.
N. A. Banek, et al., "High Capacity Silicon/Multiwall Graphene Nanoshell Li-Ion Battery Anodes from a Low-Temperature, High-Yield and Scalable Green Synthesis", J. Electrochem. Soc., 2017, 164, A1569.

* cited by examiner

LOW TEMPERATURE, HIGH YIELD SYNTHESIS OF HYDROGEN TERMINATED HIGHLY POROUS AMORPHOUS SILICON, AND NANOMATERIALS AND COMPOSITES FROM ZINTL PHASES

CROSS REFERENCE TO RELATED APPLICATIONS

This application is a continuation-in-part of U.S. application Ser. No. 16/478,327, filed Jul. 16, 2019, which is the U.S. National Phase of international Application No. PCT/US2017/055069, filed Oct. 4, 2017, and claims the benefit of U.S. Provisional Application Nos. 63/166,618 filed Mar. 26, 2021, and 62/450,392 filed Jan. 25, 2017, the entire contents of each of which are hereby incorporated by reference.

STATEMENT REGARDING FEDERALLY SPONSORED RESEARCH OR DEVELOPMENT

At least some aspects of this invention were made with Government support from the National Reconnaissance Office under Grant No. NRO000-14-C-0335. The Government may have certain rights in this invention.

FIELD OF THE INVENTION

The present invention relates to an improved process for the synthesis of hydrogen terminated silicon from Zintl phases. The hydrogen terminated silicon is useful, for example, as an explosive. The present invention also relates to an improved process for the synthesis of nanomaterials and composites from Zintl phases. The nanomaterials and composites are useful, for example, as ion storage materials.

BACKGROUND OF THE INVENTION

Hydrogen terminated silicon is a chemically passivated form of silicon in which the silicon atoms are covalently bonded to hydrogen. Hydrogen terminated silicon, when combined with an oxidizer, may be used as a primary explosive as part of an initiator, as a primer (igniter) or a detonator of an energetic material such as secondary explosives, as a propellant or as a pyrotechnic, Hydrogen terminated silicon is significantly environmentally friendlier than lead azide. Hydrogen terminated highly porous silicon may also be used for optoelectronic materials, photocatalysts, chemical and biochemical sensors, and as Li-ion battery anode ion storage materials.

See, e.g., Plummer et at, *RSC Adv.*, 7, 7338-7345, 2017, Abraham et al., *Propellants Explos. Pyrotech.*, 41, 179-188, 2016, Li et al., *RSC Adv.*, 6, 71092, 2016, Adams et al, *App, Phys. Lett,* 112, 233108, 2018, Kovalev et at, *Phys. Rev. Len.*, 87(6), 068301-1, 2001, Kherella et al., *Int. J. Eng. Res. in Sci, Tech. & Eng.*, 3(11 Porosity—Process, Techologies and Applications, Chapter 1), 167-171, 2014, Hikata et al., *Optik,* 165539, 2020, Zhang et at, *Comp. Mat. Sci.*, 136, 126-132, 2017, Plummer et at, *Thesis, Doctor of Philsophy*, Flinders University, Adelaide, South Australia, November 2017, Karbassian, *Porosity—Process, Technologies and Applications*. Chapter 1, Porous Silicon, IntechOpen, 2018, and Hernandez-Montelongo et al., *Frontiers in Bioengineering and Biotechnology*, Vol. 3, Article 60, 2015.

To date, hydrogen terminated silicon is typically prepared by anodic etching of silicon wafer using hydrofluoric acid. This process is expensive, time consuming, dangerous, not readily scalable, and environmentally deleterious.

There is therefore a need for new safe and environmentally friendly processes to prepare highly porous amorphous hydrogen terminated silicon (e.g., from Zintl phases) that may be used, e.g., as explosives.

Silicon nanomaterials are of great interest due to their potential use in a wide variety of applications, including size-dependent photoluminescence (see, e.g., Canham, *Appl. Phys. Lett.*, 57, 1046, 1990) photovoltaics (see, e.g., Nayfeh et al., *IEEE Photonics Technol. Lett.*, 16, 1927, 2004, and Duan et at, *Nature,* 425, 274, 2003) field-effect transistors (Duan et al., 2003) photocatalysts (see, e.g., Kang et al., *J. Am. Chem. Soc.*, 129, 12090, 2007), hydrogen storage and generation (see, e.g., Neiner et al., *Chem. Mater,* 22, 487, 2010, and Erogbogbo et al., *Nano Lett.,* 13, 451, 2013) and Li-ion battery anodes. Silicon (Si) is an attractive active material in Li-ion battery anodes due to its low cost, high abundance, non-toxicity, and high gravimetric and volumetric capacity, theoretically as much as 3579 mAh/g and 8335 mAh/cm$^3$, respectively (see, e.g., Obrovac et al., *Electrochem. Solid State Lett.*, 7, A93, 2004). Although silicon offers significant energy storage improvement over graphite (372 mAh/g and 830 mAh/mL, theoretical), bulk silicon cycles poorly and large volume of expansion (270%) occurs during electrochemical lithiation leading to mechanical degradation and rapid anode failure (see, e.g., Beattie et al., *J. Electrochem. Soc.*, 155, A158, 2008). The use of nanoscale silicon with conductive carbons (Si/C) has been shown to alleviate the strain caused by repeated cycling, significantly increasing cycle life.

A number of synthetic methods have been reported to result in Si/C composite nanomaterials, including chemical vapor deposition (see e.g., Forney et al. *J. Power Sources,* 228, 270, 2013, and Magasinski et al., *Nat. Maier,* 9, 353, 2010), synthesis in the presence of a template (see e.g., Kim et al., *Angew. Chem. Int. Ed.*, 49, 2146, 2010, and Lu et al., *Chem. Mater.,* 23, 5293, 2011) and chemical etching (see, e.g., Yi et al., *Adv. Energy Mater.*, 3, 295, 2012, and Zhao et al., *Chem. Commun.*, 48, 5079, 2012), However, all of these methods are lacking in one or more aspects, with disadvantages ranging from poor scalability, the use of materials with lower earth abundance or high carbon impact, high cost, high temperature, low yield, requiring use of highly toxic agent for synthesis (e.g. SiH$_4$) or product etching (e.g. HF) and post-synthetic carbon coating.

In addition, there have been a few reports of nanostructures of silicon produced by solvothermal synthesis. However, these reactions were either performed or annealed at high temperatures, had low or no reported yields, used expensive surfactants and solvents, or produced material that had rapid capacity fade when tested as a Li-ion anode (see e.g., Kim et al. *Angew. Chem. Int. Ed.*, 49, 2146, 2010, Heath, *Science,* 258, 1131, 1992, Chan et al., *ACS Nano,* 4, 1443, 2010, Zhou et al, *Dalton Trans.*, 45, 13667, 2016, and Dai et *RSC Adv.*, 2, 12710, 2012).

There is therefore also a need for new processes to prepare nanomaterials and composites (e.g., from Zintl phases) that may be used as electrode active materials that exhibit enhanced performance, such as stability over multiple charge/discharge cycles.

SUMMARY OF THE INVENTION

In a first aspect, the present invention relates to a simple, scalable, low temperature, high-yield process adaptable to solvothermal, solution, molten salt or solid-state synthetic methods for the synthesis of hydrogen terminated highly porous amorphous silicon.

The processes described herein in the first aspect are fast, inexpensive, environmentally friendly, safe and readily scalable for mass production.

In a second aspect, the present invention relates to a simple, scalable; low temperature, high-yield process adaptable to solvothermal, solution, molten salt or solid state synthetic methods for the preparation of high-capacity nanomaterials useful as ion storage materials (e.g., ion electrodes).

The processes described herein in the second aspect use non-toxic earth abundant materials and do not require the use of expensive equipment, templates or highly toxic substances. The one-step, one-pot process results in a high performance composite anode materials, utilizing a $CO_2$ negative carbon material, and eliminating the need for high temperature carbonization common to previously known methods. The nanomaterials and composites prepared by the processes described herein are environmentally friendly anode materials with very high capacity for electrochemical energy storage.

In a first aspect, the present invention relates to a process for preparing hydrogen terminated silicon. In one embodiment, the process comprises:
a) reacting a silicon containing Zintl compound with an aluminum compound, optionally in the presence of a support material
b) optionally isolating the resulting product;
c) adding a hydroxyl containing compound to produce the hydrogen terminated silicon; and
d) optionally isolating the hydrogen terminated silicon, wherein step a) is conducted:
  i) by mechanical milling;
  ii) in a solvent; or
  iii) in a molten salt comprising the aluminum compound in combination with one or more alkali metal halides, alkali earth metal halides, or any combination thereof.

In one embodiment of this first aspect, the hydrogen terminated silicon is substantially amorphous.

In one embodiment of this first aspect, the hydrogen terminated silicon has a surface area of from about 100 to about 1500 $m^2/g$, such as from about 100 to about 1100 $m^2/g$ or from about 1000 to about 1100 $m^2/g$. In one embodiment of this first aspect, the hydrogen terminated silicon has a surface area of about 770 $m^2/g$.

In one embodiment of this first aspect, the hydrogen terminated silicon has a porosity of from about 40 to about 90%, such as from about 60 to about 90%.

In one embodiment of this first aspect, the hydrogen terminated silicon has a Barret-Joyner-Halenda (BJH) desorption cumulative pore volume of about 0.4 to about 1.1 $cm^3/g$, such as from about 0.6 to about 0.8 $cm^3/g$. In one embodiment of this first aspect, the hydrogen terminated silicon has a BJH desorption cumulative pore volume of about 0.7 $cm^3/g$.

In one embodiment of this first aspect, the hydrogen terminated silicon has an average BJH desorption pore width of about 1 to about 40 nm, such as from about 1 to about 10 nm. In one embodiment of this first aspect, the hydrogen terminated silicon has an average BJH desorption pore width of about 4 nm.

In one embodiment of this first aspect, the hydroxyl containing compound is an alcohol, a hydroxyl containing polymer, a carboxylic acid, or any combination thereof.

In one embodiment of this first aspect, the hydroxyl containing compound is an alcohol, such as, e.g., a $C_{1-10}$ alcohol, e.g., methanol, ethanol, propanol, isopropanol, butanol, pentanol, hexanol, or any combination thereof.

In one embodiment of this first aspect, the hydroxyl containing compound is a hydroxyl containing polymer, such as, e.g., polyvinyl alcohol), poly(allyl alcohol) or any combination thereof.

In one embodiment of this first aspect, the hydroxyl containing compound is a carboxylic acid, such as, e.g., formic acid, acetic acid, propionic acid, or any combination thereof.

In one embodiment of this first aspect, step c) further comprises adding an inorganic acid, such as, e.g., hydrochloric acid.

In a second aspect, the present invention relates to a process for preparing an ion storage material (e.g., an ion storage nanomaterial) from a Zintl compound. In one embodiment, the process comprises
a) reacting a Zintl compound with an aluminum compound, optionally in the presence of a support material;
b) optionally isolating the resulting product; and
c) optionally purifying the isolated product.

In one embodiment of any of the processes described herein, the Zintl compound is a Zintl, a Zintl cluster, a metallic Zintl phase or a metalloid Zintl phase. For example, the Zintl compound is a compound comprising, in any stoichiometric ratio, a) a Group 1 metal, a Group 2 metal, or any combination thereof, and b) a post transition metal or metalloid, or any combination thereof.

In one embodiment of any of the processes described herein, the Group 1 and/or Group 2 metal is selected from Li, Na, K, Rb, Cs, Be, Mg, Cn, Sr, Ba, and any combination thereof. In one embodiment of any of the processes described herein, the Group 1 and/or Group 2 metal comprises Mg.

In one embodiment of any of the processes described herein, the post transition metal or metalloid is selected from B, Si, Ga, Ge, As, In, Sn, Sb, Te, Tl, Bi, and any combination thereof. In one embodiment of any of the processes described herein, the post transition metal or metalloid comprises silicon. In another embodiment, the post transition metal or metalloid comprises a combination of Si and Sn (e.g., $Si_xSh_y$, where x ranges from 0 to about 1 and y, independently, ranges from about 0 to about 1).

In one embodiment of any of the processes described herein, the post transition metal or metalloid is not silicon.

In one embodiment of any of the processes described herein, the Zintl compound is $Mg_2Si$.

In one embodiment of any of the processes described herein, the aluminum compound is an aluminum salt. Suitable examples include, but are not limited to, halides, oxides, alkoxides, hydroxides, sulfates, sulfites, nitrates, nitrites, phosphates, and phosphites of aluminum, hydrates of any of the foregoing, and any combination thereof.

In one embodiment of any of the processes described herein, the aluminum compound is an aluminum halide, such as, but not limited to, $AlCl_3$, $AlBr_3$, $AlI_3$, and any combination thereof. In one embodiment, the aluminum halide is $AlCl_3$. In another embodiment, the aluminum halide is $AlBr_3$.

In one embodiment, the molar ratio of the Zintl compound to the aluminum compound in step a) ranges from about 0.9:1 to about 1:1.2, such as from about 1:1 to about 1:1.2, for example, about 1:1, about 1:1.15, or about 1:1.13.

In one embodiment, the product of any of the processes described herein (such as a hydrogen terminated silicon product) comprises between 0 and about 20 wt. % of Al, such as between 0 and about 15 wt. % Al, between 0 and about 10 wt. % Al, between 0 and about 5 wt. % Al, between 0 and about 4 wt. % Al, between about 0 and about 3 wt. %

Al, between about 0 and about 2 wt. % Al, between about 0 and about 1 wt. % Al or between about 1 and about 3 wt. Al. In one embodiment, the product of any of the processes described herein comprises about 2 wt. % Al. Without wishing to be bound by theory, the inventors theorize that the presence of Al in the product may phase segregate to the surface where it is oxidized, providing protection against further oxidation and corrosion, thereby increasing cycling performance of a battery comprising the product as an anode material.

In one embodiment of any of the processes described herein, the support material is selected from carbonaceous materials, metals, glasses, oxides, nitrides, borides, and any combination thereof.

Suitable examples of carbonaceous materials include, but are not limited to, carbon spheres, graphite, carbon nanotubes, carbon nanofibers, carbon fibers, hard and soft carbons, activated carbons, carbon blacks, amorphous carbons, soots, graphene (including single and multilayer graphenes, and nanoshells thereof), fullerenes, coal, coke, fossil fuel derived materials, biomass, biochar, charcoal, chars, and any combination thereof.

In one embodiment of any of the processes described herein, the support material is graphite.

In one embodiment of any of the processes described herein, the support material is a graphene, or related material, such as a multiwall graphene nanoshell (MGNS). In one embodiment of any of the processes described herein, the support material is selected from graphene (such as a multiwall graphene nanoshell (MG-NS)), graphite, and any combination thereof.

In one embodiment of any of the processes described herein, the support material is not a hollow graphene nanoshell (HGNS).

In one embodiment of any of the processes described herein, the support material is not a hollow graphene nanoshell (HGNS) and the post transition metal or metalloid is not silicon.

In one embodiment of any of the processes described herein, the amount of support material is about 0 to about 100% by weight, such as about 1 to about 20% by weight, such as about 1 to about 15% by weight.

In one embodiment of any of the processes described herein, the support material is a graphene, or related material, such as a multiwall graphene nanoshell (MGNS).

In one embodiment of any of the processes described herein, the mass fraction of post transition metal or metalloid (for example silicon) in the ion storage material composite (i.e., an ion storage material comprising a support material) is between about 0.1 and about 90%, such as between about 1 and about 90%, between about 1 and about 80%, between about 1 and about 60%, between about 1 and about 50%, between about 1 and about 40%, between about 10 and about 40%, or between about 10 and about 30%.

In certain embodiments of any of the processes described herein, step a) is conducted in a solvent (e.g., in solution), in the solid state (e.g., by mechanical milling), by molten salt, or by solid/solid reaction. In certain embodiments of any of the processes described herein, step a) is conducted at elevated temperature, at elevated pressure, or at elevated temperature and elevated pressure.

In one embodiment of any of the processes described herein, step a) is conducted in a solvent, for example, a solvent in which the aluminum salt is substantially soluble. Suitable solvents include, but are not limited to, organic solvents (e.g., aromatic hydrocarbons, nonaromatic hydrocarbons, amities, or any combination thereof). In one embodiment of any of the processes described herein, the solvent is an aprotic solvent. In another embodiment of any of the processes described herein, the solvent is selected from cyclohexane, toluene and any combination thereof.

In another embodiment of any of the processes described herein, step a) is conducted in a molten salt (e.g., in the absence of a solvent, such as an organic solvent). In one embodiment, the molten salt comprises an aluminum salt that melts at a temperature lower than its sublimation temperature (e.g., $AlBr_3$, $AlI_3$), and/or an aluminum salt that melts at a temperature higher than its sublimation temperature e.g., $AlCl_3$), or any combination thereof, optionally further in combination with one or more alkali metal halides, alkali earth metal halides, and any combination thereof. In one embodiment, the one or more alkali metal halides is selected from a sodium halide (e.g., NaCl), a potassium halide (e.g., KCl), a lithium halide (e.g., LiCl), and any combination thereof.

In one embodiment, the molten salt comprises an aluminum salt. In another embodiment, the molten salt comprises an aluminum salt in combination with one or more alkali metal halides, alkali earth metal halides, and any combination thereof. In one embodiment, the molten salt comprises $AlCl_3$ in combination with one or more alkali metal halides, alkali earth metal halides, and any combination thereof. In another embodiment, the molten salt comprises $AlBr_3$, $AlI_3$, or any combination thereof.

In one embodiment of any of the processes described herein, step a) is conducted at a temperature ranging between about 50° C. and about 600° C., such as between about 50° C. and about 200° C., between about 90° C. and about 200° C., between about 100° C. and about 200° C., or between about 120° C. and about 180° C., for example, at 125° C. or at 180° C.

In one embodiment of any of the processes described herein, the support material is added to the mixture of the Zintl compound and the aluminum compound in step a) prior to heating the mixture. In another embodiment of any of the processes described herein, the support material is added to the mixture of the Zintl compound and the aluminum compound in step a) as the mixture is being heated.

In one embodiment of any of the processes described herein, step a) is conducted at a pressure of between about 0.5 and about 100 atm., such as between about 1 and about 10 atm.

In one embodiment of any of the processes described herein, step b) comprises adding a solvent, such as water or an organic solvent (including, but not limited to ethers, ketones (e.g., acetone), or any combination thereof), and isolating the resulting product, e.g., by centrifuge, filtration or in mem), in another embodiment of any of the processes described herein, step b) comprises isolating the resulting product, e.g., by centrifuge, filtration or in vacuo, without adding an additional solvent such as water or an organic solvent.

In one embodiment of any of the processes of the second aspect described herein, step c) is not optional. In one embodiment of any of the processes of the second aspect described herein, when step c) is not optional, step c) comprises adding a solvent or an acid that dissolves aluminum and its oxides but does not dissolve silicon. In one embodiment of any of the processes described herein when step c) is not optional, step c) comprises adding an acid to the product of step b). Suitable acids include, but are not limited to, inorganic acids, such as hydrochloric acid (e.g., a 50% aqueous hydrochloric acid solution).

In one embodiment of any of the processes of the first aspect described herein, step c) optionally further comprises isolating the hydrogen terminated silicon, washing the hydrogen terminated silicon (e.g., washing with water, alcohols, ammonia, alkanes, ethers, ketones (e.g., acetone), or any combination thereof), isolating the resulting product, washing the isolated product a second time (e.g., washing with water, alcohols, ammonia, alkanes, ethers, ketones (e.g., acetone), or any combination thereof) and then drying the resulting hydrogen terminated silicon. Washing with water is convenient to remove any salts in solution so the product (hydrogen terminated silicon) can be readily isolated by any of the separation techniques described herein. Washing with a ketone such as acetone is convenient to remove any excess organics, and to facilitate faster drying of the product.

In one embodiment of any of the processes of the second aspect described herein, step c) optionally further comprises isolating the acid washed product, washing the isolated acid washed product (e.g., washing with water, alcohols, ammonia, alkanes, ethers, ketones (e.g., acetone), or any combination thereof) isolating the resulting product and then drying the resulting product. Washing with water is convenient to remove any salts in solution so the product (e.g., silicon) can be readily isolated by any of the separation techniques described herein. Washing with a ketone such as acetone is convenient to remove any excess organics, and to facilitate faster drying of the product.

In one embodiment of any of the processes of the first aspect described herein, step b) is not optional.

In one embodiment of any of the processes of the second aspect described herein, step b) and step c) are not optional.

In another aspect the present invent relates to hydrogen terminated silicon prepared by any of the processes of the first aspect described herein.

In another aspect, the present invention relates to an explosive prepared by any of the processes of the first aspect described herein. The hydrogen terminated silicon prepared herein may be combined with an oxidizing agent, such as, e.g., concentrated nitric acid, sodium perchlorate, potassium nitrate, sulfur, poly(tetrafluoroethylene), polyvinyl fluoride, or any combination thereof, and ignited.

In another aspect the present invention relates to an ion storage material (e.g., a lithium ion storage material) prepared according to any of the processes of the first or second aspect described herein.

In another embodiment, an ion storage material herein (such as a lithium ion storage material) prepared according to any of the processes of the first or second aspect described has a reversible capacity greater than about 400 mAh/g, such as 500 mAh/g, greater than about 600 mAh/g, greater than about 700 mAh/g, greater than about 800 mAh/g, greater than about 900 mAh/g, greater than about 1000 mAh/g, greater than about 1100 mAh/g, greater than about 1200 mAh/g, greater than about 1300 mAh/g, greater than about 1400 mAh/g, greater than about 1:500 mAh/g, greater than about 2000 mAh/g, greater than about 2500 mAh/g, greater than about 3000 mAh/g, greater than about 3500 mAh/g or, greater than about 4000 mAh/g.

In another aspect, the present invention relates to an electrode comprising an ion storage material (such as a lithium ion storage material) prepared according to any of the processes of the first or second aspect described herein. In one embodiment, the electrode further comprises a current collector associated with the ion storage material. Suitable current collectors include, but are not limited to, copper or nickel metal, including alloys thereof, coated or uncoated carbon, carbon nanotubes, carbon fiber sheets, and the like one embodiment, the current collector is copper.

In one embodiment, the ion storage material forms a layer on the current collector.

In one embodiment, the electrode is included within a secondary ion battery. Thus, in another aspect, the present invention relates to a secondary ion battery comprising an electrode according to any of the embodiments described herein.

BRIEF DESCRIPTION OF THE DRAWINGS

FIG. 20(*b*) is the differential capacity plot of the galvanostatic cycling profile shown in FIG. 20(*a*).

FIG. 21(*b*) is a differential capacity plot Si+MGNS (mechanically milled) cycled at C/2 rate for cell cycles 2 (circles), 25 (squares), 50 (triangles) and 75 (diamonds).

FIG. 46(*b*) shows a sample of the hydrogen terminated silicon prepared in Example 6, after oxidation and ignition.

FIG. 47(*b*) shows a sample of the hydrogen terminated silicon prepared in Example 6, after oxidation and ignition.

DETAILED DESCRIPTION OF THE INVENTION

Figure 1B:
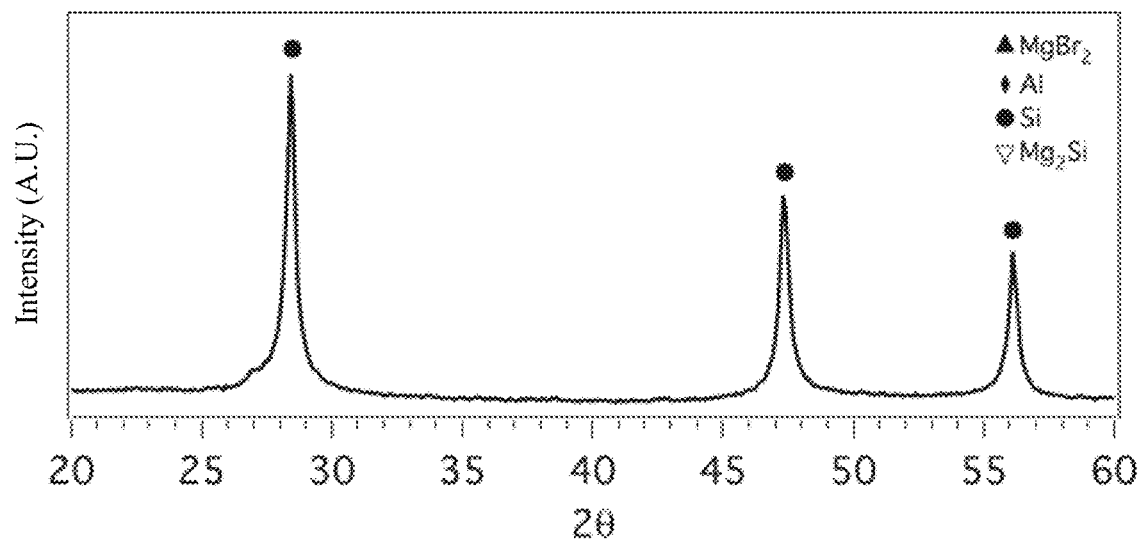
FIG. 1(b) is a powder X-ray diffraction pattern of a Si/C nanomaterial prepared in toluene at 1255° C. following washing with HCl.

U.S. Publication No 2016/0351894, which is hereby incorporated by reference in its entirety, describes hollow nanosphere composite based secondary cell electrodes.

As used herein, the term "substantially amorphous" when applied to hydrogen terminated silicon, means that the hydrogen terminated silicon is greater than about 90% amorphous, such as greater than about 91% amorphous, greater than about 92% amorphous, greater than about 93% amorphous, greater than about 94% amorphous, greater than about 95% amorphous, greater than about 96% amorphous, greater than about 97% amorphous, greater than about 98% amorphous, greater than about 99% amorphous, greater than about 99.5% amorphous, or greater than about 99.9% amorphous. The term "substantially amorphous" can also mean that the hydrogen terminated silicon exhibits less than about 10% crystallinity, such as less than about 9% crystallinity, less than about 8% crystallinity, less than about 7% crystallinity, less than about 6% crystallinity, less than about 5% crystallinity, less than about 4% crystallinity, less than about 3% crystallinity, less than about 2% crystallinity, less than about 1% crystallinity, less than about 0.5% crystallinity, or less than about 0.1% crystallinity.

As used herein, the term "highly porous" when applied to hydrogen terminated silicon, means, for example, that the hydrogen terminated silicon has a porosity of greater than about 40%, such as greater than about 50%, greater than about 60%, greater than about 70%, greater than about 80%, greater than about 90%, greater than about 95%, greater than about 99% or greater than about 99.5%.

One non-limiting example for step a) according to any of the processes described herein is shown by the following equation:

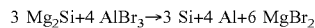

$$3\ Mg_2Si + 4\ AlBr_3 \rightarrow 3\ Si + 4\ Al + 6\ MgBr_2$$

$Mg_2Si$ is readily available in high purity, is low-cost and both magnesium and silicon are earth abundant. When using $Mg_2Si$ as a silicon source for Li-ion battery anodes, high product yield is desirable not only for economic reasons, but also because unreacted $Mg_2Si$ dissolution during purification can cause silane oxidation that leads to silica formation. Silica is non-conductive and as such, should be minimized so that sufficiently low impedance anodes can be realized. In addition, surface passivation of silicon nanoparticles with silica results in an increase in irreversible capacity, an effect that becomes increasingly important as particle size is reduced (see, e.g., Jaumann et al., *Phys. Chem. Chem. Phys.*, 17, 24956, 2015). Etching silicon nanomaterials with hydrofluoric acid (HF) can mitigate the deleterious effects of silica formation to some extent. However, the processes described herein eliminate the need for this extremely hazardous agent. As described herein, nanoscale silicon ($Si_{nano}$) prepared by $Mg_2Si$ oxidation in organic solvents can be worked up without concern for air or water oxidation, nor HF use, to produce highly reversible Si anodes.

$Mg_2Si$ has no appreciable solubility in any solvent; therefore, reactivity is limited by temperature, particle size, and the oxidizing agent used. Aluminum bromide may be selected as the oxidant because it is highly soluble in hydrocarbons and is unlikely to produce an alloy or intermetallic of Al with Si at low-temperatures. In addition, both aluminum and bromine are earth abundant. Aluminum is the most abundant metal and the third most abundant element in the Earth's crust and bromine is readily extracted from brine reservoirs and ocean water, which are estimated to hold 100 trillion tons (see, e.g., Ober, Mineral Commodity Summaries 2015, in *U.S. Geological Survey*, p. 34. U.S. Geological Survey, 2015). Additionally, $AlBr_3$ can form complexes with alkali and alkaline earth metal salts, potentially improving reaction kinetics by inhibiting Mg salt precipitation during the reaction (see, e.g., U.S. Pat. No. 4,071,415). Following the reaction, aluminum and $MgBr_2$ can be readily and safely removed by washing with hydrochloric acid (HCl), resulting in crystalline silicon (c-Si) in high yield. Thus, the processes described herein can be used to create Si/C composites with high reversible lithium electrochemical storage capacity.

The ion storage materials (e.g., Si nanoparticles) described herein may also be prepared in a molten salt comprising an aluminum compound (such as $AlCl_3$, $AlBr_3$, $AlI_3$, or any combination thereof, such as, in one embodiment, $AlCl_3$), optionally in combination with one or more alkali or alkali earth metal salts (e.g., in the absence of a solvent). Addition of the alkali or alkali earth metal salt (or combination of such salts) may lower the melting temperature of the aluminum compound, thereby lowering the cost of the process and easing the difficulty in the use of aluminum salts that melt at temperature higher than their sublimation temperature (such as, in one embodiment, $AlCl_3$). Eliminating the solvent in the reaction provides an even more environmentally benign and potentially less expensive route to silicon nanoparticle production. For example, the ion storage materials (e.g., Si nanoparticles) described herein may be prepared by reacting $Mg_2Si$ in molten $AlBr_3$ in the range of about 97 to about 263° C. (see, e.g., CRC handbook 73$^{rd}$ Edition, page 4-36, Physical Constants of Inorganic Compounds). A molten solution of $AlCl_3$ may be advantageous over $AlBr_3$ due to higher abundance of chlorine (further reducing cost), however, $AlCl_3$ sublimes at 177.8° C. (1 atm), lower than its melting point at 190° C. (CRC handbook 73$^{rd}$ Edition, page 4-36), Inexpensive alkali metal chlorides, such as NaCl and KCl, form congruent melts with $AlCl_3$ at 108.7° C. (for molar ratios 0.388 NaCl and 0.612 $AlCl_3$) and at 156.7° C. (for molar ratios 0.5 NaCl to 0.5 $AlCl_3$) (see e.g., Robelin et al *J. diem. Thermodynamics*, 36, 683-699). At the temperature of 156.7° C. and molar ratio of 0.388 NaCl and 0.612 $AlCl_3$, a designated quantity of $AlCl_3$ (0.112 mol %) can oxidize $Mg_2Si$ while a molten reaction medium is maintained. Up to approximately 0.18 mol. % could be used in theory as the salts are still liquid near approximately 0.68 $AlCl_3$ and approximately 0.32 NaCl. The addition of KCl can reduce the NaCl and $AlCl_3$ melt temperatures to 91.4° C. and 132.1° C., from 108.7° C. and 156.7° C., respectively. This can provide a lower reaction temperature for the production of nanomaterials and composites from the oxidation of a Zintl compound.

The description of the present embodiments of the invention has been presented for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention. Patents and publications cited herein are incorporated by reference in their entirety.

EXAMPLES

Powder X-Ray Diffraction

Powder X-ray diffraction (XRD) patterns were obtained using a Rigaku Miniflex+ diffractometer with Cu Kα radiation. Electrochemical galvanostatic cycling was performed using an Arbin BT-2000. Ail mass measurements were recorded with Ohaus Analytical Plus balance (AP250D, 0.01 mg resolution).

Brunauer-Emmett-Teller (BET) Surface Area

BET surface area was determined from nitrogen adsorption isotherms obtained with a Micrometrics Tri-Star 3000. One of the three sample measurement ports of the Tri-Star was equipped with an empty sample tube with which the saturation vapor pressure ($P_0$) of nitrogen ($N_2$) was measured concurrently with each measurement of the equilibrium vapor pressure (P) over the sample. Isotherm adsorption data was recorded from 0.05 to 0.3 $P_0/P$.

Barret-Joyner-Halenda (BJH) Pore Size and Pore Volume were Calculated from the Isotherm Adsorption Data.

Infrared (IR) Spectroscopy

IR spectra were collected on a Perkin Elmer Spectrum One Fourier Transform Infrared (FT-IR) spectrometer using attenuated total reflectance.

Focused Ion Beam (FIB) Cross Section

Images were obtained on a FEI Helios Focused Ion Beam (FIB) Scanning Electron Microscope (SEM) before and after etching to create a cross section using a gallium ion source.

Transmission Electron Microscopy (TEM)

TEM micrographs were obtained on a FEI Talos 200X and elemental analysis was obtained in scanning (STEM) operational mode with its Super-X Energy Dispersive Spectroscopy (EDS) detector.

Electrode Preparation

Anode material was formulated by combining 75 mg of a Si/MGNS composite material, 5 mg of carbon black (Super C45, TIMCAL America Inc.), 50 µL of ethanol (200 proof, Pharmco-Aaper) and 400 µL of 5% Li-polyacrylate binder solution prepared by dissolving poly(acrylic acid) (1000 kDa, Poly sciences) in deionized water and neutralizing with LiOH (95%, Strem) (see, e.g., U.S. Pat. No. 7,875,388). Mixing was performed with a Fritsch Pulverisette 23 Mini-Mill using a stainless steel cup (10 mL) and six stainless steel balls (5 mm diameter, 30:1 ball to powder mass ratio) at 50 Hz for 15 minutes to form a slurry. The slurry was cast onto copper foil (0.127 mm, 99.9%, Alfa Aesar) and dried under vacuum at 150° C. for 2 hours. Round electrodes (16 mm diameter) were cut from the resulting sheet using a die cutting press (MSK-T-07 Precision Disc Cutter, MTI Inc.). Electrodes were made tested at two different mass loadings: 0.7 mg/cm$^2$ (13 µm thick) and 1.35 mg/cm$^2$ (20 µm thick).

Mechanically mixed Si with MGNS was prepared for comparison by milling $Si_{nano}$ with MGNS (40% wt Si) for 30 minutes with a Fritsch Pulverisette 23 MiniMill using a stainless steel cup (10 mL) and six stainless steel balls (5 mm diameter) at 50 Hz. Electrodes for this active material and the Si/MGNS composite were prepared in an identical manner with a mass loading of 0.75 mg/cm$^2$.

Electrochemical Testing

Coin cells (CR2016, MTI Inc.) containing Si/MGNS and Li metal (2 cm$^2$ disk, 0.05 g. 99.9%, MTI Inc.) electrodes separated by a polypropylene porous membrane (Celgard 3401) were assembled in an argon filled dry box (<0.1 ppm $O_2$ and $H_2O$). The electrolyte used was 1 M $LiPF_6$ in EC:DMC (1:1 v/v, 40 µL) mixture (battery grade, <15 ppm $H_2O$ content, Sigma Aldrich) with 10% FEC (fluoroethylene carbonate) (>99%, Solvay) by volume. Cells were cycled at constant current (C/20) for one cycle between open circuit voltage to a cutoff potential then under reverse current to 1.5 V vs. Li/Li$^+$. Subsequent cycling was performed at a C/5 or C/2 rate, with cutoff potentials of 10 mV and 20 mV vs. Li/Li$^+$, respectively. A higher potential was chosen for C/2 to reduce the possibility of Li plating at high current density. The cells were rested for 15 minutes between discharge and charge. Impedance testing was performed using a Solartron Analytical 1260 impedance/gain-phase analyzer with 1287A potentiostat/galvanostat using an excitation voltage of 5 mV and a logarithmic sweep from 100 kHz to 100 mHz. Spectra were modeled to an equivalent circuit using ZView software (Scribner Associates, Inc.)

Results and Discussion

Example 1

MGNS Synthesis

MGNS consists of highly graphitic, nested, graphene layers that form the walls of "spheroidal" shells (they can appear significantly distorted from spherical), each surrounding a void left by removal of a nanoparticulate metal catalyst around which it formed (see, e.g., Wagner et al, *Hollow Carbon Nanosphere Based Secondary Cell Electrodes*, 2009). MGNS is a $CO_2$-negative carbon material synthesized from biomass char, the waste product of pyrolytic bio-oil synthesis (see, e.g., Woolf et al, *Environ. Sci. Technol*, 48, 6492, 2014 and Xiu et al., *Renew. Sustainable Energy Rev.*, 16, 4406, 2012).

MGNS was prepared by mixing 10 g of microcrystalline cellulose (Avicel PH-105 NF, FMC BioPolymer) and 4.5 g of $CoCl_2.6H_2O$ (99.9%, Alfa Aesar) in a hardened steel cup (80 mL) with six hardened steel balls (1 cm diameter, 10:1 ball to powder mass ratio) at 300 rpm for 30 min using a Fritsch Pulverisette 6. The resulting powder was pressed at 10,000 psi (Carver 3851 benchtop laboratory press) into a 25.4 mm diameter pellet and heated under $N_2$ gas from room temperature at a 75° C. min$^{-1}$ ramp rate to 375° C. and held for a total heating time of 30 minutes. After cooling, the charred pellet was placed in a chamber with a 0.5 torr He atmosphere and irradiated by a 2 mm diameter 10.4 µm laser beam (Firestar t60, Synrad Inc.) while rotating at a linear velocity of 1.63 mm s$^{-1}$ (1.2 rev min$^{-1}$) for one full rotation. The surface of the pellet exposed to the laser was removed by gentle abrasion and purified by reflux in nitric acid ($HNO_3$) for 4 hours then washed with deionized water and collected by vacuum filtration (P8 cellulose fiber, Fisher Scientific).

Si and Si/MGNS Synthesis $Mg_2Si$ (99.5%, Alfa Aesar) was milled with a Fritsch Pulverisette 6 under a nitrogen atmosphere at 300 rpm for 5 minutes in an 80 mL WC cup with four 1 cm WC balls (10:1 ball to powder mass ratio). The milled $Mg_2Si$ (0.5 g) was then combined with 10 mL of cyclohexane or toluene (99.8% HPLC grade previously dried over NaK alloy and distilled. Acres Organics) and 2.6 g of $AlBr_3$ (13% excess, 99.999% lump form, Alfa) in a dry 23 mL Teflon-lined digestion bomb in a nitrogen filled dry box (<0.1 ppm $O_2$ and $H_2O$). The bomb was sealed and placed into a muffle furnace pre-heated to 180° C. or 125° C., for cyclohexane and toluene, respectively. After 24 hours, the bomb was allowed to cool to room temperature and opened in air. The contents were added to acetone (100 ml, 99.7%, Fischer Scientific) and the product was recovered by centrifuge. The raw product was dispersed in 50% HCl solution (0.100 ml, ACS grade 36.5 to 38%, VWR Analytical) by sonic agitation and then magnetically stirred overnight. The solid product was isolated by vacuum filtration (polyester membrane with 1 µm pore size, Maine Manufacturing LLC) and rinsed with deionized water and acetone. A light-brown powder (178 mg $Si_{nano}$) WES recovered after drying under vacuum. The product yield was 97% in cyclohexane and 93% in toluene based on initial mass of $Mg_2Si$ (this mass also includes any surface oxide that may have formed during purification).

A Si/MGNS composite was prepared in an analogous manner to the reaction in cyclohexane by adding 300 mg of MGNS to the reaction vessel prior to heating. 458 mg total mass of product was recovered after purification and drying (95% yield).

XRD Characterization

Figure 1A:
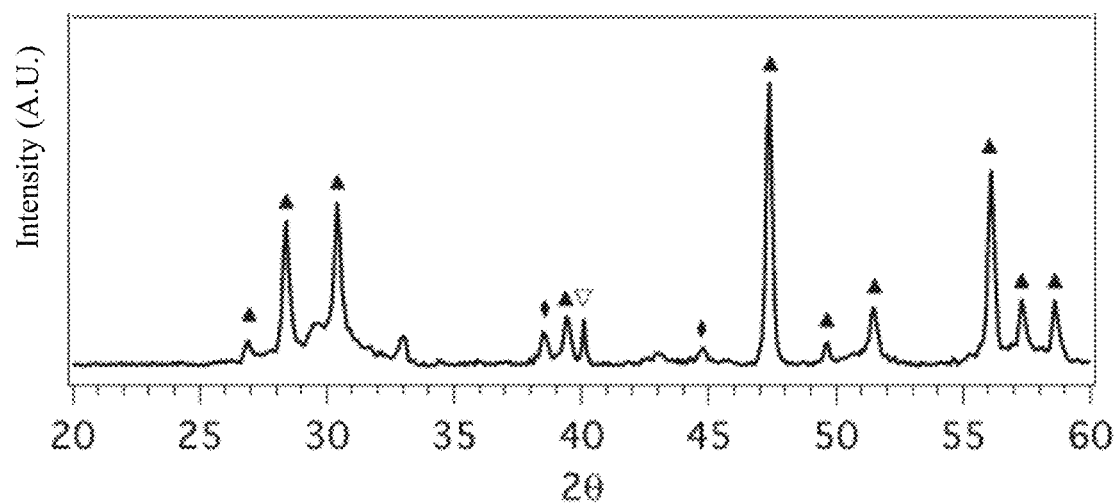
FIG. 1(a) is a powder X-ray diffraction pattern of a crude Si/C nanomaterial prepared in toluene at 125° C.

Prior to rinsing with acetone and HCl, the raw product of the reaction to produce $Si_{nano}$ in toluene at 125° C. was analyzed by XRD. The XRD pattern for the raw product and the product after HQ wash are shown in FIG. 1(a) and FIG. 1(b), respectively. As seen in FIG. 1(a), the highest intensity peaks match those expected for $MgBr_2$. A small amount of $Mg_2Si$ still remained in the product, as indicated by the presence of one low intensity peak at 40.1 degrees (220). However, this minor impurity is easily removed during the HCl washing (FIG. 1(b)), and has little impact on the product yield (93%).

Figure 2B:
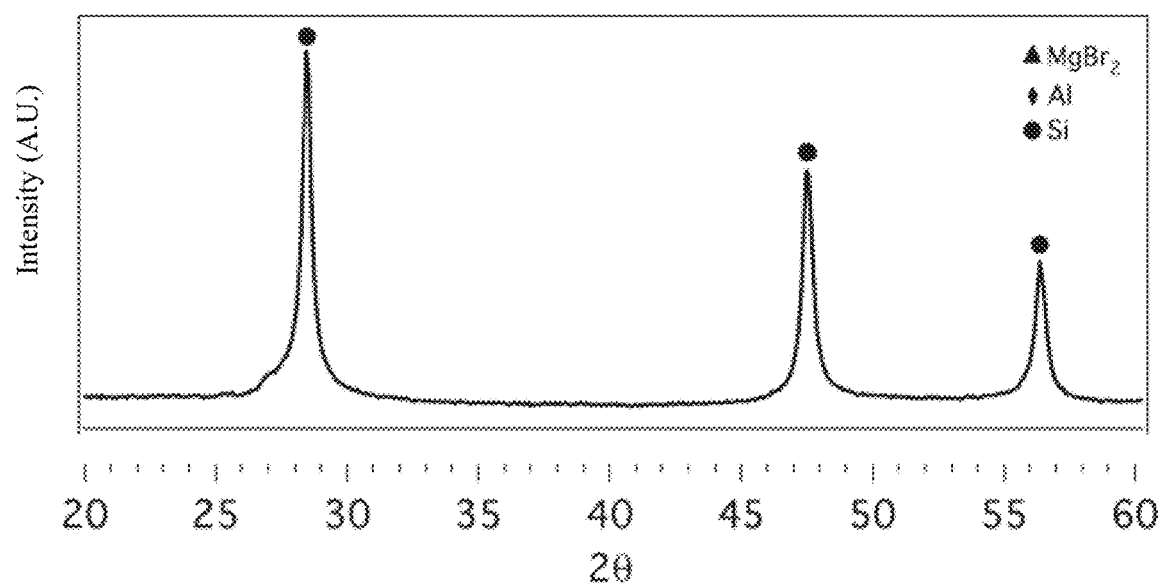
FIG. 2(b) is a powder X-ray diffraction pattern of a Si/C nanomaterial prepared in cyclohexane at 180° C. following washing with HCl.
Figure 2A:
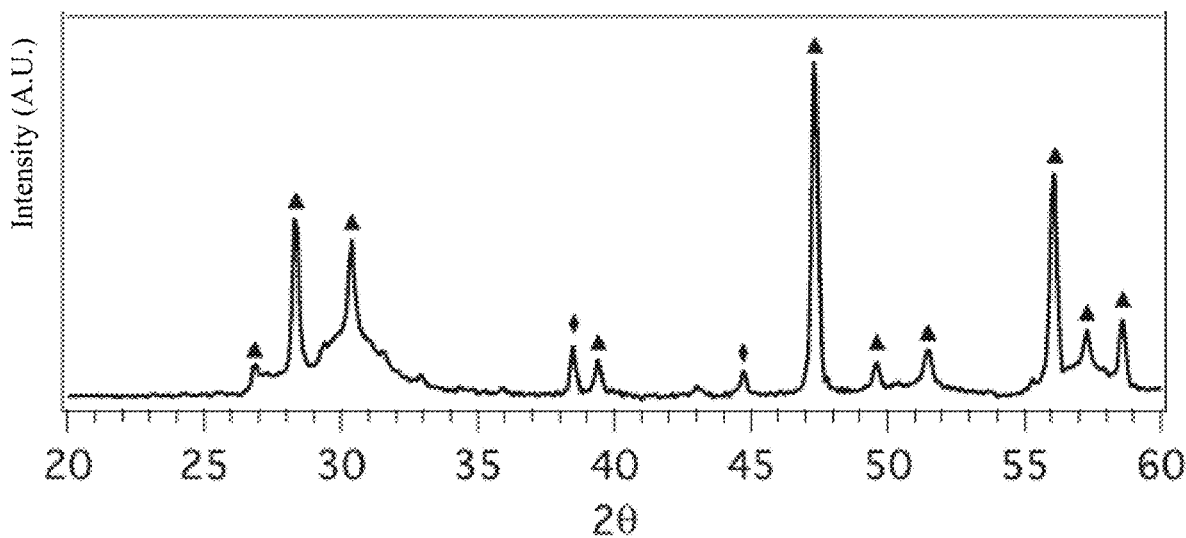
FIG. 2(a) is a powder X-ray diffraction pattern of a crude Si/C nanomaterial prepared in cyclohexane at 180° C.

This reaction was also performed in cyclohexane but required a higher temperature of 180° C. for 24 hours. The XRD pattern for the raw product and the product after vacuum filtration and HCl wash are shown in FIG. 2(a) and FIG. 2(b), respectively. No peaks for Mg$_2$Si are present indicating that the reaction had proceeded to completion (FIG. 2(a)). Other identifiable phases are Al with peaks at 38.4 (ill) and 44.7 degrees (200). Addition of HCl to the raw product results in the slow evolution of H$_2$ gas, presumably from reaction with Al and its dissolution, with the solution color changing from black to brown over a period of a few hours. Is should he noted that the addition of HCl to raw products containing a significant fraction of residual Mg$_2$Si results in a violent reaction, presumably from pyrophoric SiH$_4$ formation and combustion. The XRD diffraction pattern for the purified product after vacuum filtration and washing is shown in FIG. 2(b). Peaks at 28.4, 47.2, and 56.4 degrees match the Si (111), (220), and (311) reflections, respectively. The average crystallite size, estimated using Scherrer's equation, is 35±3.5 nm (see, e.g., Scherrer, *Gottingen*, 2, 98, 1918).

Figure 3A:
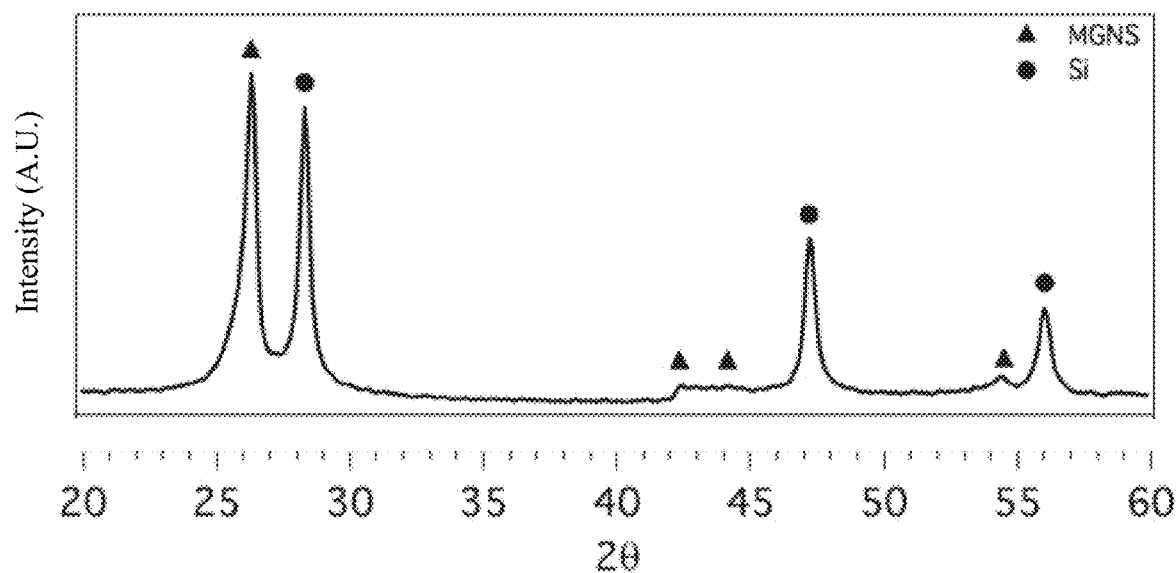
FIG. 3(a) is a powder X-ray diffraction pattern of a Si/MGNS nanomaterial composite.
Figure 3B:
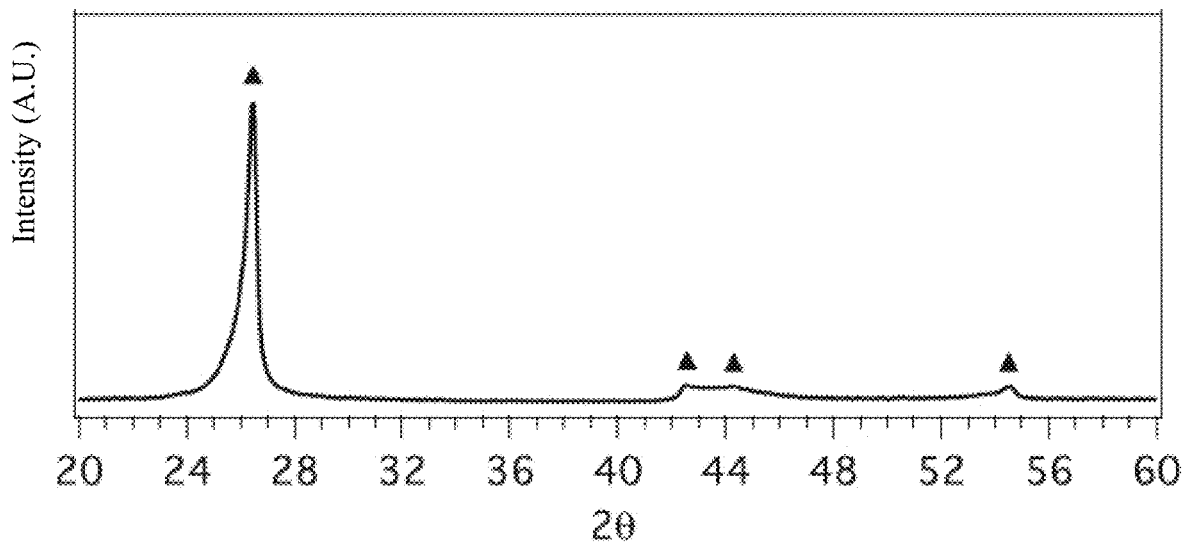
FIG. 3(b) is a powder X-ray diffraction pattern of MGNS.

Powder XRD patterns of Si/MGNS material are essentially identical to the sum of the patterns of the MGNS and separately synthesized Si, indicating that the synthesis was unaffected by the presence of the MGNS. The powder XRD pattern for the MGNS material and Si/MGNS composite material are shown in FIG. 3. The product yield was 97% based on initial mass of Mg$_2$Si (this mass also includes any surface oxide that may have formed during purification).

BET Surface Area

Figure 4A:
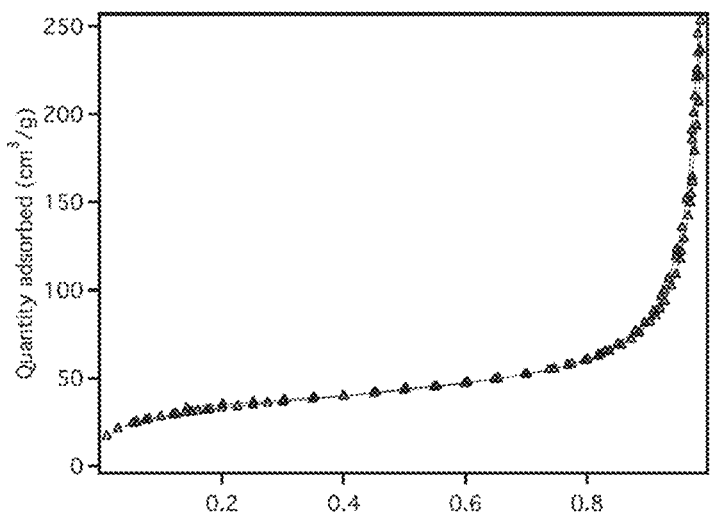
FIG. 4(a) shows nitrogen isotherms for MGNS.
Figure 4B:
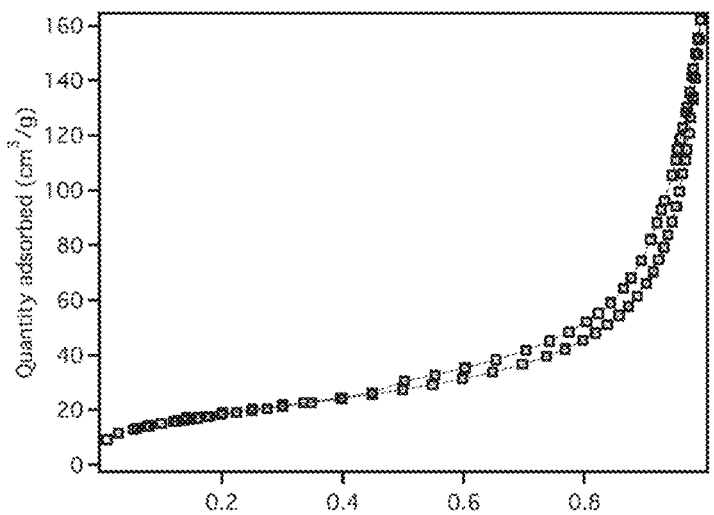
FIG. 4(b) shows nitrogen isotherms for Si/MGNS.
Figure 4C:
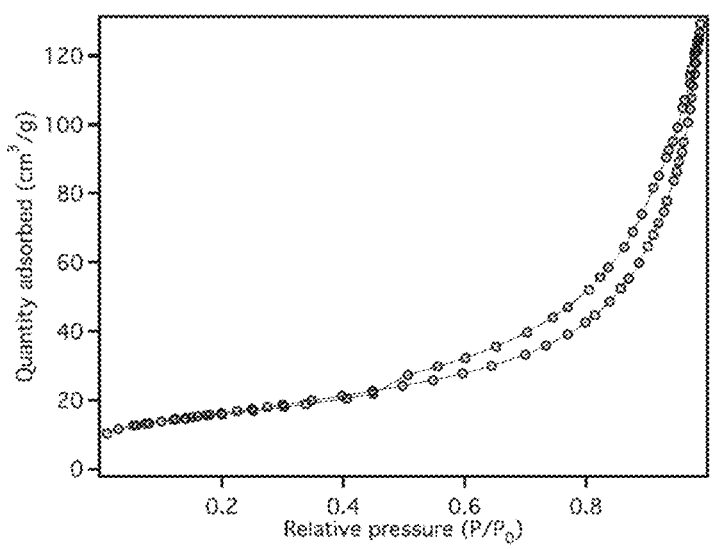
FIG. 4(c) shows nitrogen isotherms for $Si_{nano}$.

The BET surface area was measured by N$_2$ adsorption and found to be 115 m$^2$ g$^{-1}$, 60 m$^2$ g$^{-1}$, and 70 m$^2$ g$^{-1}$ for the Si$_{nano}$, the MGNS and the Si/MGNS composite respectively. Each of the materials display type II isotherms (FIG. 4). Hysteresis is present in those of MGNS and Si/MGNS, indicating capillary condensation by the hollow MGNS, but absent in the solid Si$_{nano}$ alone. The surface area of the Si/MGNS is somewhat less than the summation of the surface areas of the Si$_{nano}$ and MGNS multiplied by their mass fractions (82 m$^2$ g$^{-1}$). This is consistent with the high surface area Si$_{nano}$ being in intimate contact with the MGNS, reducing N$_2$ available surface area.

TEM and Energy Dispersive X-Ray Spectroscopy (EDX) Characterization

Figure 5A:
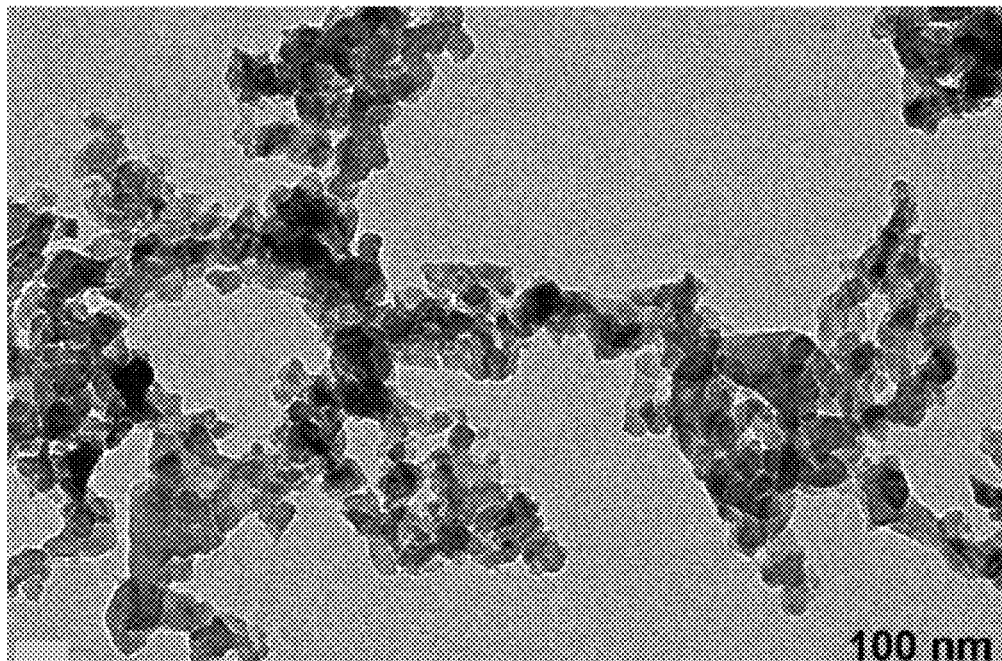
FIG. 5(a) shows a TEM micrograph of purified agglomerates of Si nanocrystals.
Figure 5B:
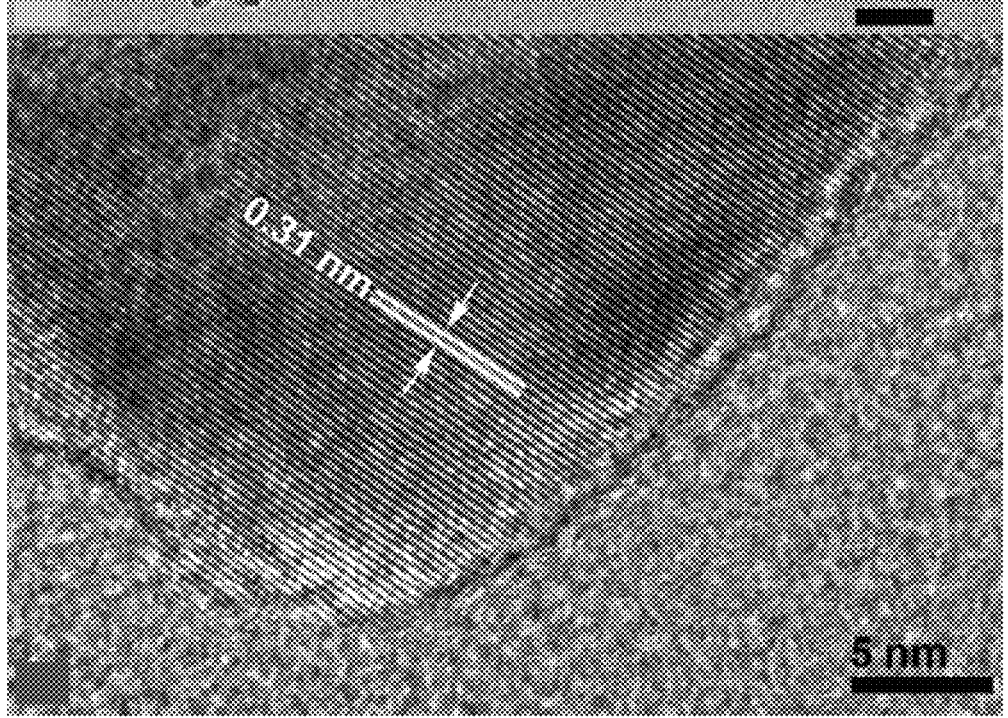
FIG. 5(b) shows a High-Resolution TEM (HRTEM) micrograph of purified agglomerates of Si nanocrystals showing lattice spacing characteristic of crystalline Si.

FIG. 5(a) shows the TEM micrograph of purified agglomerates of silicon nanocrystals (Si$_{nano}$). FIG. 5(b) is a high-resolution TEM micrograph of a silicon nanocrystal showing lattice spacing characteristic of crystalline Si.

The TEM observations showed that the purified Si$_{nano}$ sample consists of agglomerates of spherical and irregularly shaped particles. The size of the particles ranges mostly from 30 to 60 nm in their largest dimension with some larger (~100 nm) particles present (FIG. 5(a)). The image shows lattice fringes with 0.31 nm spacing matching the (111) planes of Si (FIG. 5(b)).

Figure 6:
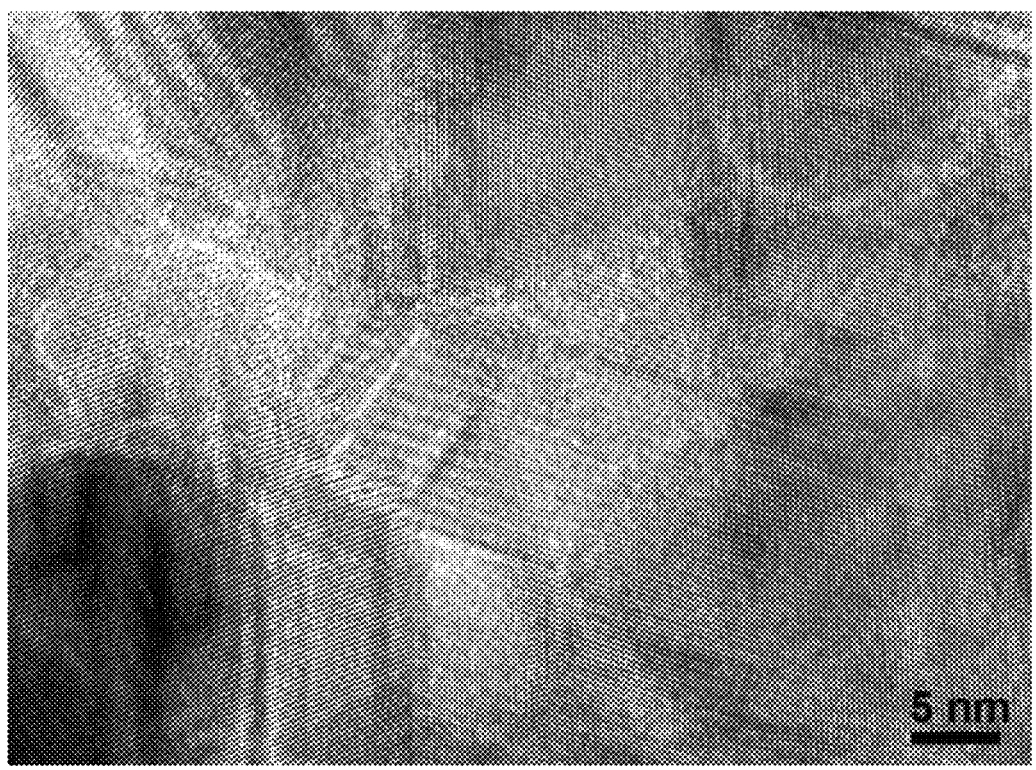
FIG. 6 shows a HRTEM micrograph of a Si particle, showing it to be an agglomerate of sintered nanocrystals.
Figure 7A:
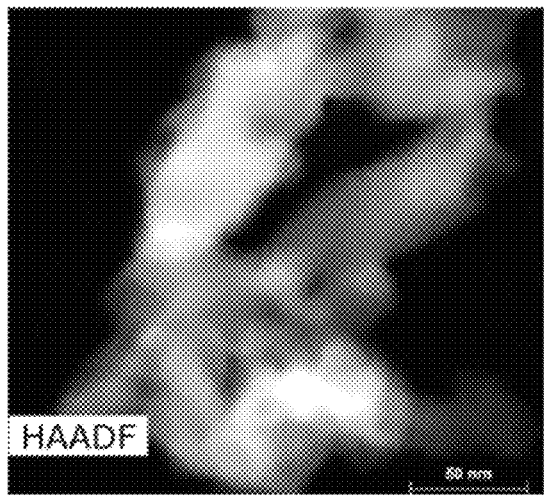
FIGS. 7(a)-7(d) are energy dispersive X-ray HyperMaps of $Si_{nano}$: HAADF image FIG. 7(a), silicon FIG. 7(b), aluminum FIG. 7(c), and oxygen FIG. 7(d).
Figure 7B:
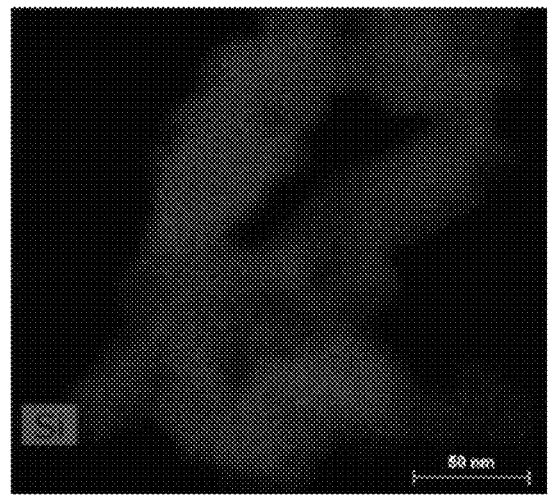
Figure 7C:
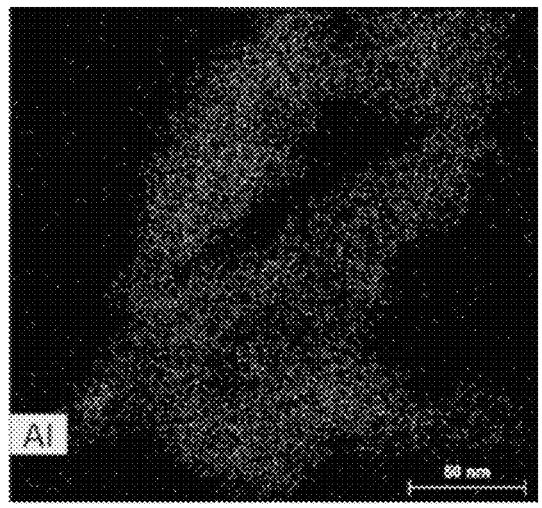
Figure 7D:
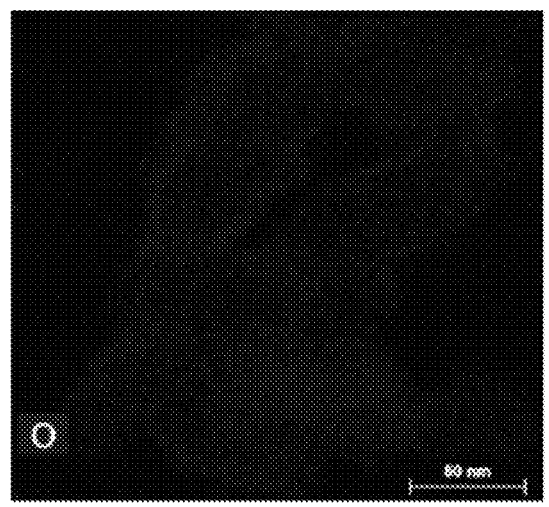

FIG. 6 is a high resolution TEM micrograph of a silicon nanoparticle. Higher magnification reveals that the particles consist of multiple nanocrystallites. 10 to 30 nm in diameter, that appear to be sintered (FIG. 6), FIG. 7 is an EDX HyperMap of Si$_{nano}$. The composition was determined by EDX to be 91% Si, 7.5% O and 1.5% Al.

Without wishing to be bound by theory, the oxygen content found is an upper limit estimate, as it does not include any correction for adsorbed species (FIG. 7). The actual oxygen (O) content of the nanocrystals may likely be much less that 7.5%, as the lattice fringes of the silicon nanocrystals extend essentially to, or within a fraction of a nm of, the edge of the nanocrystals with no evidence of significant oxidation (FIG. 5(b)). Even so, the lower limit of the Si$_{nano}$ reaction yield, taking into account EDX oxygen content results, is 90%. The Al content may explain the lack of significant surface oxidation on the Si nanocrystals despite not using HF to remove SiO$_2$ as is common in other studies and their repeated, and extensive, exposure to air. Al is not soluble in Si at the low temperatures used for the synthesis (see, e.g., Murray et al., *Bulletin of Alloy Phase Diagrams*, 5, 74, 1984). Thus, the Al is likely to have phase segregated to the surface of the Si nanocrystals and oxidized during air exposure and HCl washing, providing an effective passivation layer that prevents significant oxidation of the underlying Si, despite further exposure to air.

Figure 8:
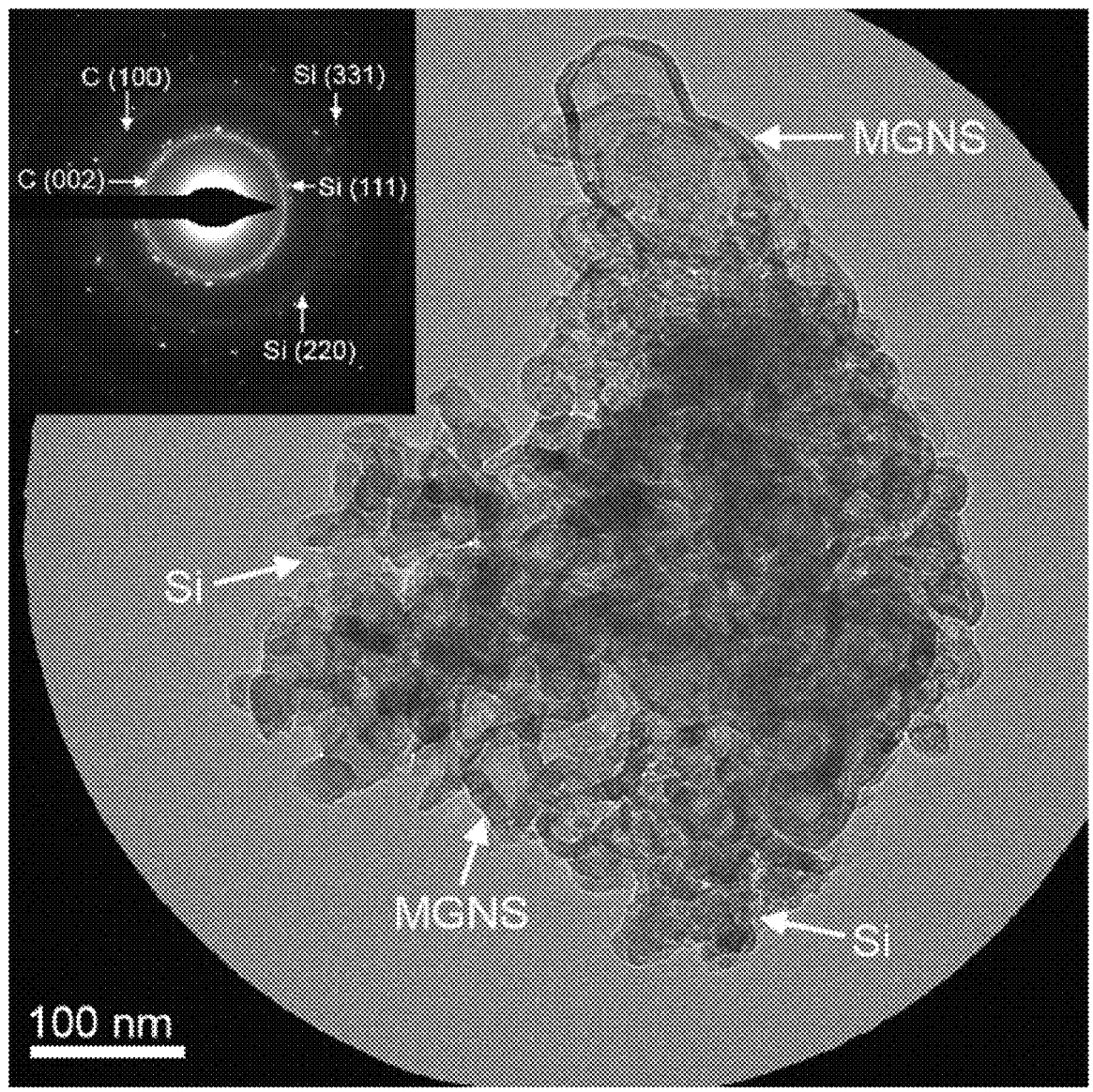
FIG. 8 is a TEM micrograph of Si/MGNS composite, showing the MGNS intimately mixed with the Si nanocrystals. The inset is an electron diffraction pattern of the area shown in the figure showing reflection rings for MGNS (labeled "C") and Si.
Figure 9:
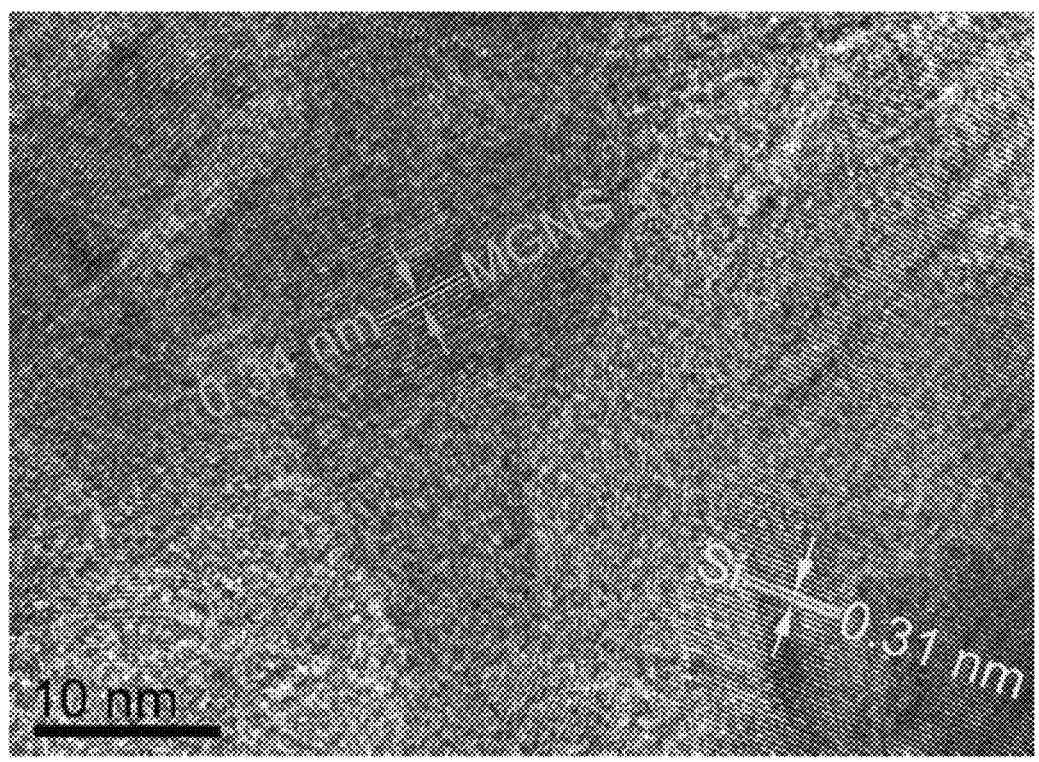
FIG. 9 is a HRTEM micrograph of the Si/MGNS composite.
Figure 10A:
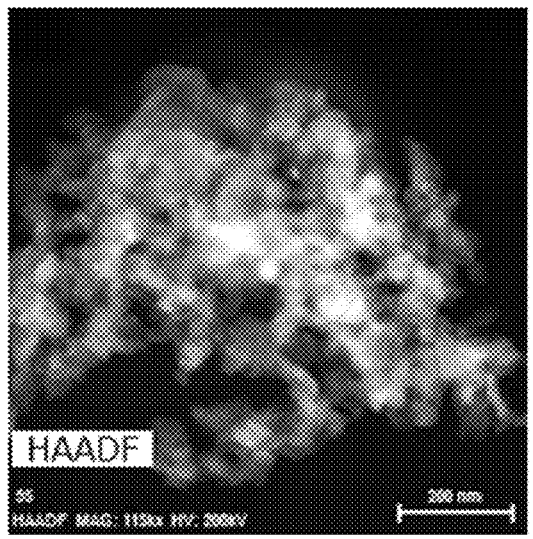
FIGS. 10(a)-10(d) are energy dispersive X-ray HyperMaps of Si/MGNS: HAADF image FIG. 10(a), silicon FIG. 10(b), oxygen FIG. 10(c), and carbon FIG. 10(d).
Figure 10B:
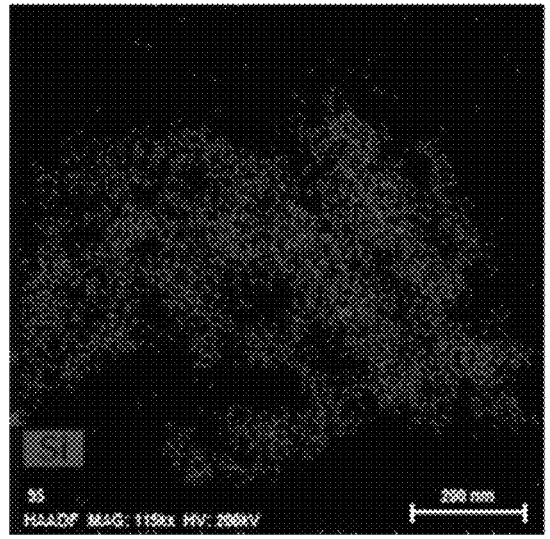
Figure 10C:
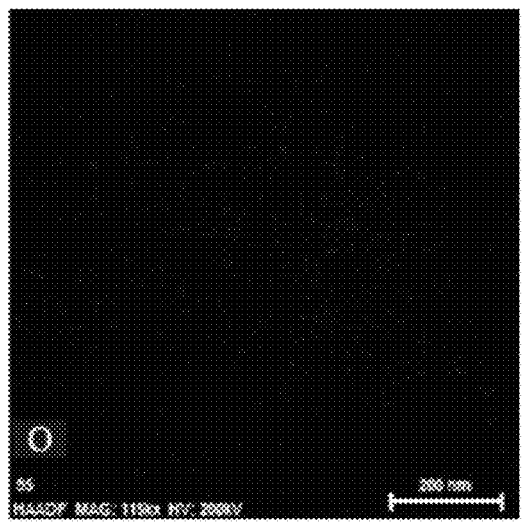
Figure 10D:
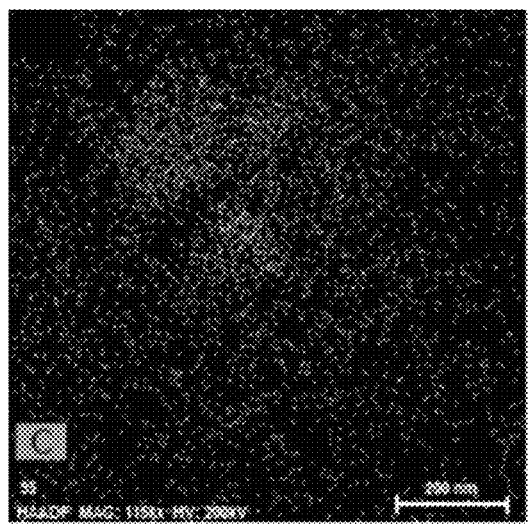

FIG. 8 and FIG. 9 shows the TEM and STEM micrographs, respectively, of the Si/MGNS composite. The Si/MGNS composite consists of intimately mixed agglomerates of silicon nanocrystals and MGNS. The MGNS are of irregular shape, appearing to readily distort from their idealized spherical shape. These shells were selected as the conductive carbon material for the Si/C composites in part due to the ability of their walls to flex, to act as "pillows", relieving mechanical stress caused by the large volume expansion of Si during lithiation, maintaining contact and high conductivity.

FIG. 10 is an EDX HyperMap of the Si/MGNS composite, showing silicon localized on and around the MGNS, identified by correlation of the C intensity beyond that due to the carbon grid with the high-angle annular dark field (HAADF) image. The silicon to carbon ratio of the sample area was measured by EDX and found to be 1:1.375. This is in good agreement with the synthetic reagent stoichiometry and the mass ratio of silicon to 2.0 MGNS (1:1.5) determined by etching a known mass of the composite with 4 M KOH overnight, removing the silicon and leaving MGNS which was weighed after washing with water and drying, the difference between the pre and post etching mass being the mass of silicon.

Electrochemical Characterization

First Cycle Characterization

The first load/unload cycles of half-cells made with Si/MGNS composite electrodes were conducted at a low rate, 70 mA/g (179 mA/g Si, C/20), in attempt to "activate" all the c-Si before reaching the cutoff potential, as high current density can result in significant polarization.

Electrochemical cycling of c-Si is characterized by lithiation to form Li$_{15}$Si$_4$ below 50 mV and de-lithiation to amorphous Si (a-Si) above ~420 mV, but these potentials depend on the applied current density (see, e.g., Obrovac et al., *J. Electrochem, Soc.*, 154, A103, 2007). The onset of charge transfer to Si/MGNS electrodes occurred at ~1.2 V due to the reduction of carbonated solvents forming a solid electrolyte interface (SEI) layer (FIG. 11(a)) (see, e.g., Aurbach et al., *Electrochim. Acta*, 50, 247, 2004).

Below 140 mV, a plateau in the galvanostatic discharge curve accompanied by a broad reductive peak on the differential capacity plot is observed due to lithiation of c-Si to form crystalline Li$_{15}$Si$_4$ (c-Li$_{15}$Si$_4$).

The voltage profile, in agreement with XRD and TEM data, indicates little or no amorphous silicon (a-Si) is initially present; a-Si lithiates over two sloping plateaus at higher potential (see, e.g., Obravac, 2007). MGNS is also lithiated; two reduction peaks at 80 and 25 mV, and reverse current complementary oxidation peaks at 100 and 120 mV associated with electrochemical Li storage in the MGNS are visible in the differential capacity curve (FIG. 11(b)).

Figure 12:
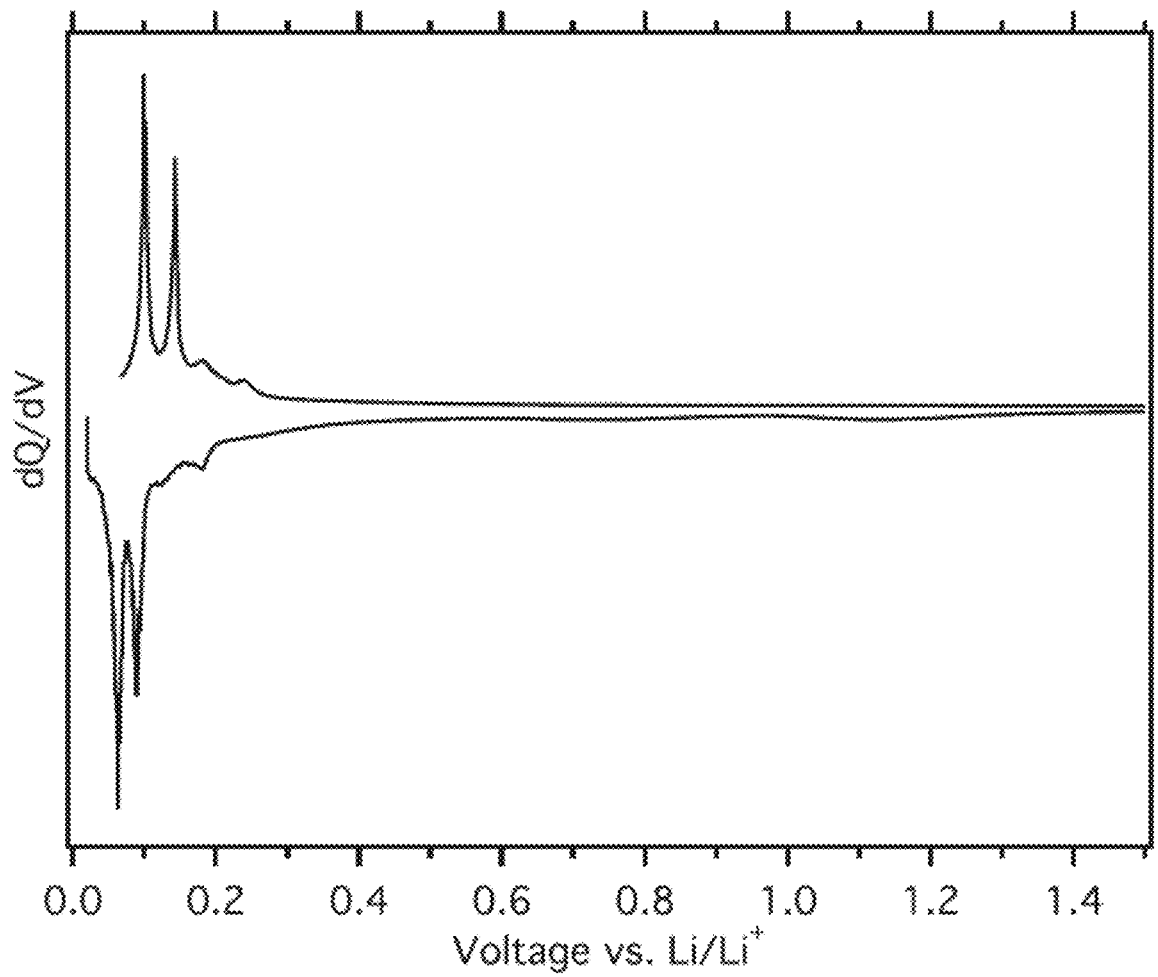
FIG. 12 is a differential capacity plot for MGNS cycled at C/5 rate.

The MGNS material, when prepared in a separate cell, has lithiation peaks at 90 mV and 60 mV and delithiation peaks at 100 mV and 120 mV, respectively (FIG. 12). The differences in the lithiation potentials when prepared in the composite may be a result of cell polarization. The majority of the charge transfer during the unloading step is observed at ~420 mV, indicating that the c-$Li_{15}Si_4$ de-lithiated to a-Si rather than c-Si (see. e.g., Obravac, 2007).

Figure 13:
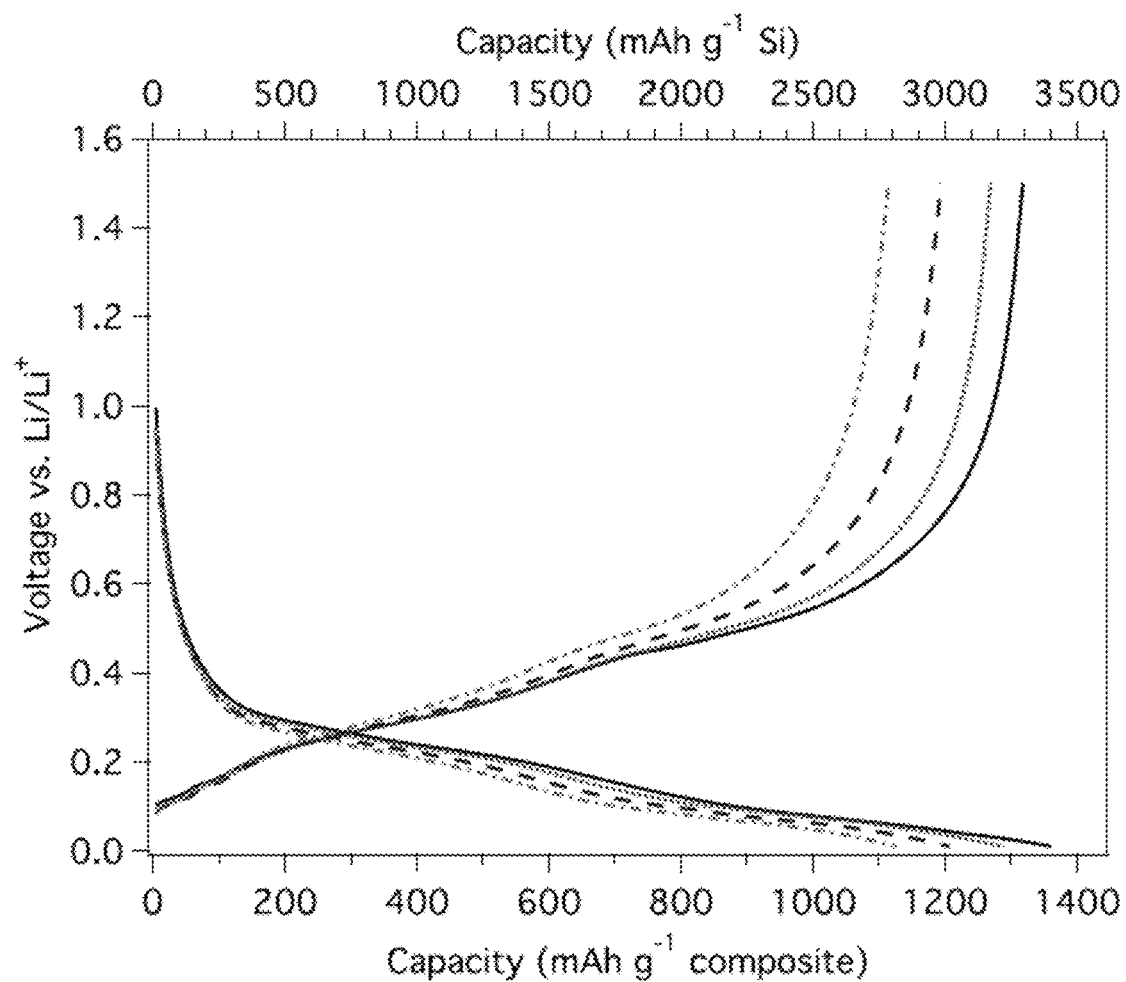
FIG. 13 is a galvanostatic charge/discharge plot for a MGNS cell cycled at C/5 rate.

The reversible capacity of the first cycle is 1382 mAh $g^{-1}$ (for the Si/MNGS composite) (3454 mAh $g^{-1}$ Si). This is 3.7 times the capacity of the theoretical capacity of graphite anodes. The difference in the unload potential of MGNS and silicon allows the contribution of the former to be estimated to be ~100 mAh $g^{-1}$ of the composite material by noting the fractions of full capacity at which the MGNS staging occurs (FIG. 13) and dividing the capacity at which they occur in Si/MGNS by those fractions. Taking the MGNS capacity into account, the capacity due to the $Si_{nano}$ is 3354 mAh $g^{-1}$, ~94% of the theoretical capacity of silicon, indicating a very high degree of utilization and low level of oxidation.

Subsequent Cycle Characterization

Figure 14A:
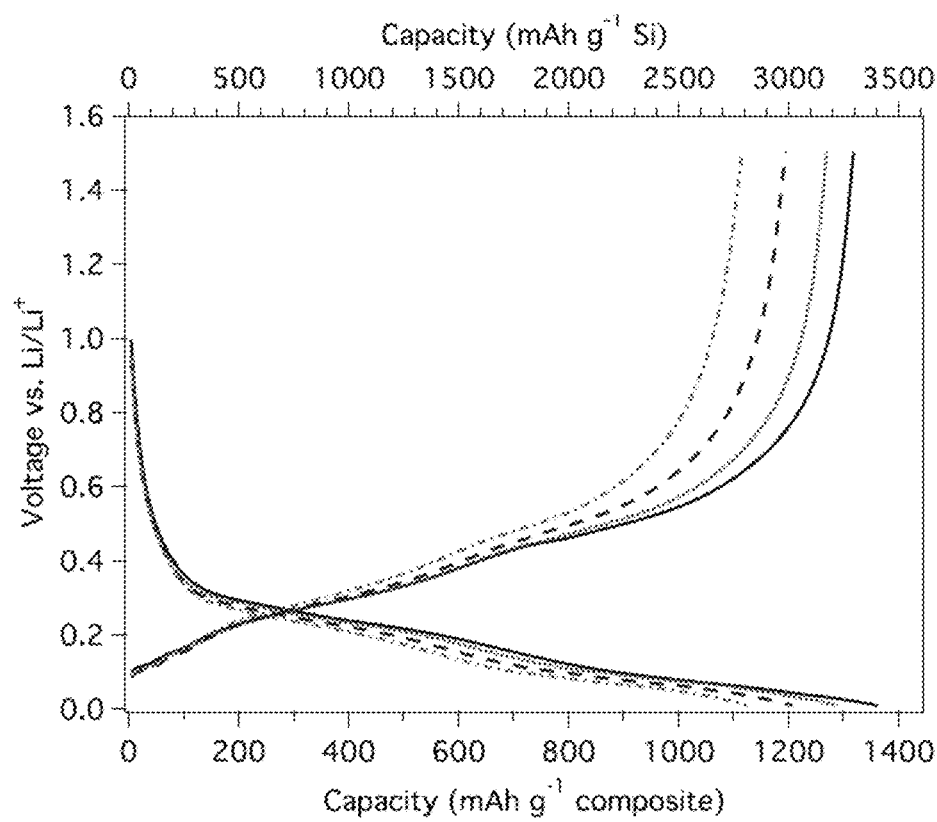
FIG. 14(a) is a galvanostatic charge/discharge plot for Si/MGNS cycled at C/5 rate for cell cycles 2 (solid line), 25 (dots), 50 (dashes) and 75 (dots and dashes).
Figure 14B:
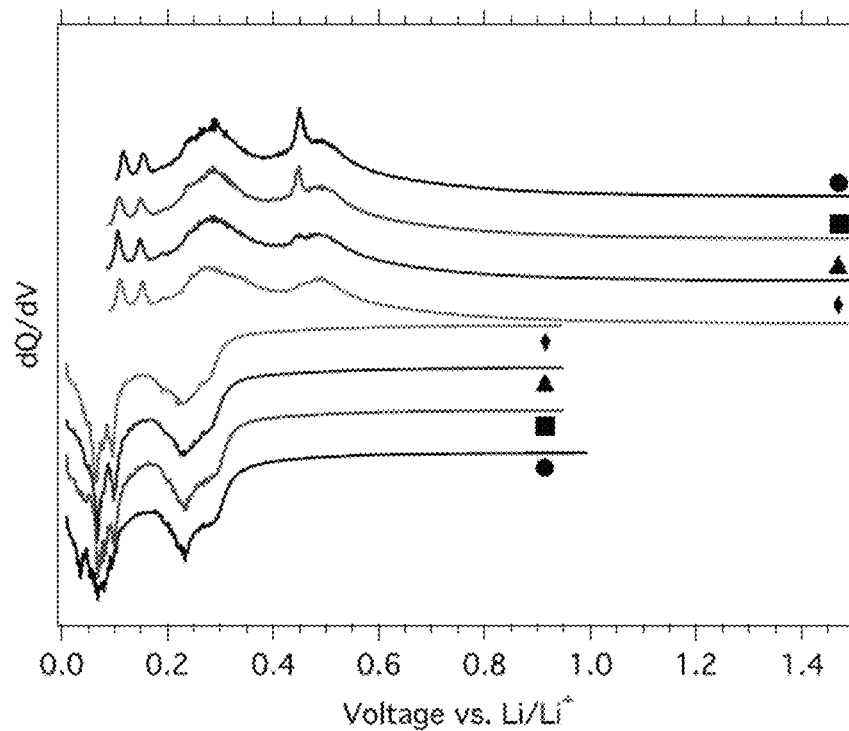
FIG. 14(b) is a differential capacity plot Si/MGNS cycled at C/5 rate for cell cycles 2 (circles), 25 (squares), 50 (triangles) and 75 (diamonds).
Figure 15A:
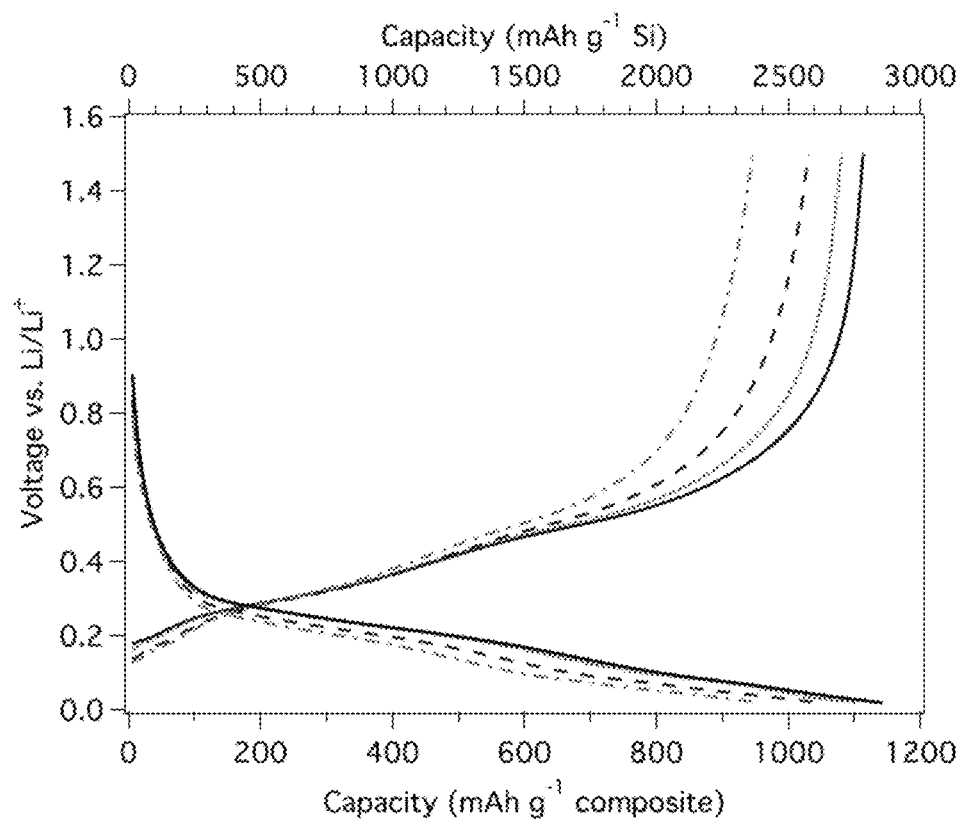
FIG. 15(a) is a galvanostatic charge/discharge plot for Si/MGNS cycled at C/2 rate for cell cycles 2 (solid line), 25 (dots), 50 (dashes) and 75 (dots and dashes).
Figure 15B:
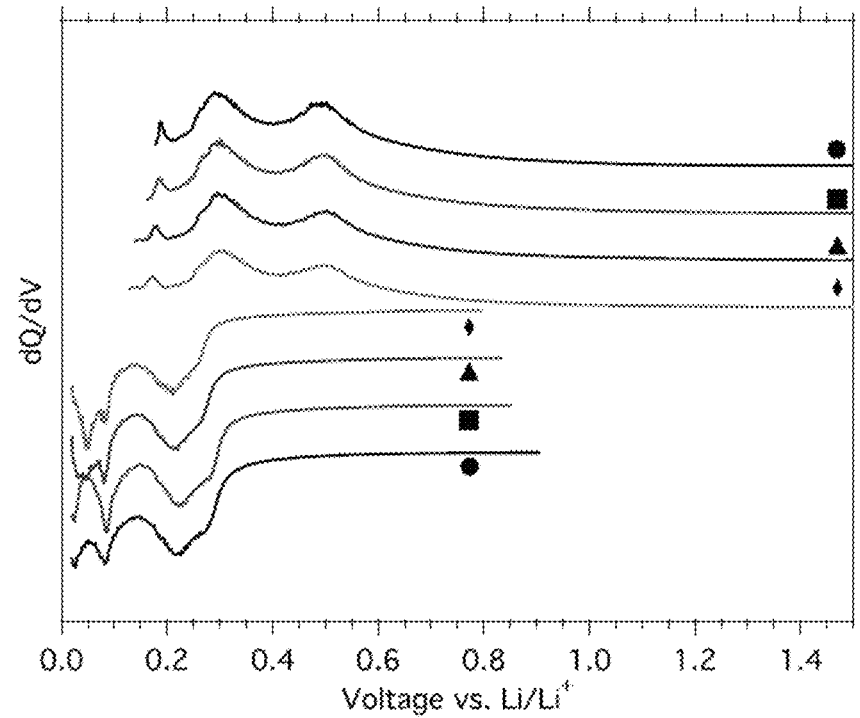
FIG. 15(*b*) is a differential capacity plot Si/MGNS cycled at C/52 rate for cell cycles 2 (circles), 25 (squares), 50 (triangles) and 75 (diamonds).

For cycles subsequent to the first, the electrodes were loaded/unloaded at either 286 mA $g^{-1}$ (715 mA $g^{-1}$ Si, C/5) or 715 mA $g^{-1}$ (1.79 $Ag^{-1}$ by Si, C/2). Increasing the rate from C/20 ($1^{st}$ cycle) to C/5 resulted in a modest (<6%) decrease in reversible capacity. Increasing the rate further to C/2 resulted in a larger (19%) decrease. Second cycle capacities at C/5 and C/2 were 1318 and 1114 mAh $g^{-1}$ composite (3295 and 2785 mAh $g^{-1}$ Si), respectively (see FIG. 14(a) and FIG. 12(a)). Lithiation at a C/5 rate during these cycles occurred at higher potentials than observed during the first, slow, lithiation, displaying the two sloping plateaus expected for a-Si (FIG. 14). Despite cycling below the $Li_{15}Si_4$ formation potential of ~50 mV, charge transfer on de-lithiation indicates the presence of both a-$Li_xSi$ and $Li_{15}Si_4$, with two broad peaks from 200 to 600 mV in addition to the 420 mV peak. Polarization due to the high current density is likely the cause of the incomplete conversion to crystalline $Li_{15}Si_4$. Cycling performed at C/2 rate resulted in loading curves that are similar to those performed at C/5, indicative of a-Si lithiation (FIG. 15). Notably absent was a delithiation peak for $Li_{15}Si_4$, and only one delithiation peak for MGNS was observed as a result of greater polarization at this current density. The lithiation potentials progressively decrease with increasing cycle number, the effect being more acute at C/2, consistent with the gradual buildup of the SEI layer.

Capacity Retention and Coulombic Efficiency

Figure 16:
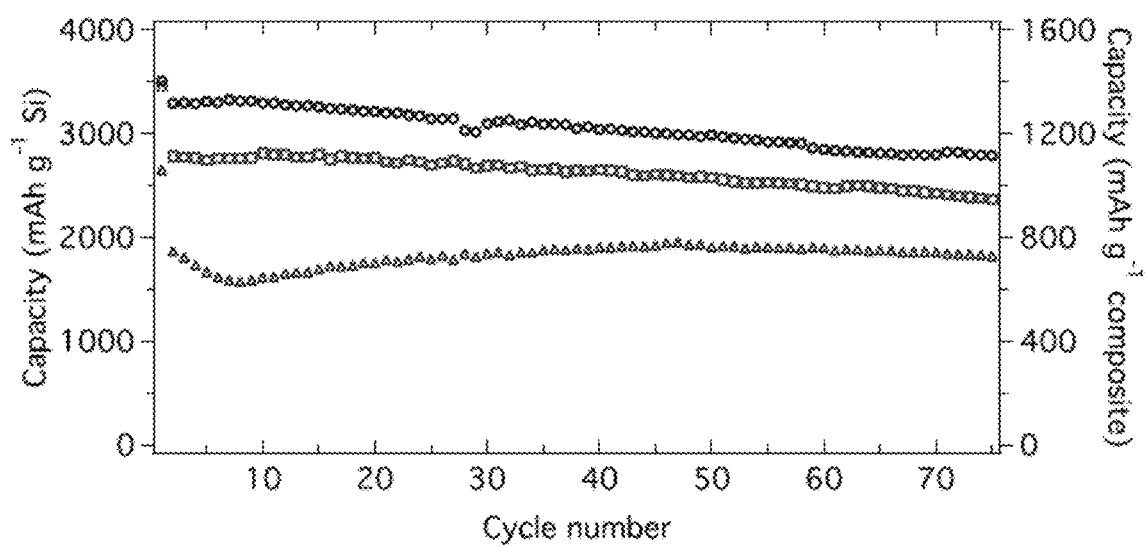
FIG. 16 compares the capacity of the Si/MGNS electrode cycled at C/5 rate (top line, circles), C/2 rate (middle line, squares), with mechanically mixed Si and MGNS at C/2 rate (bottom line, triangles), plotted as a function of cycle number. The first cycle of each electrode was performed at C/20.
Figure 17:
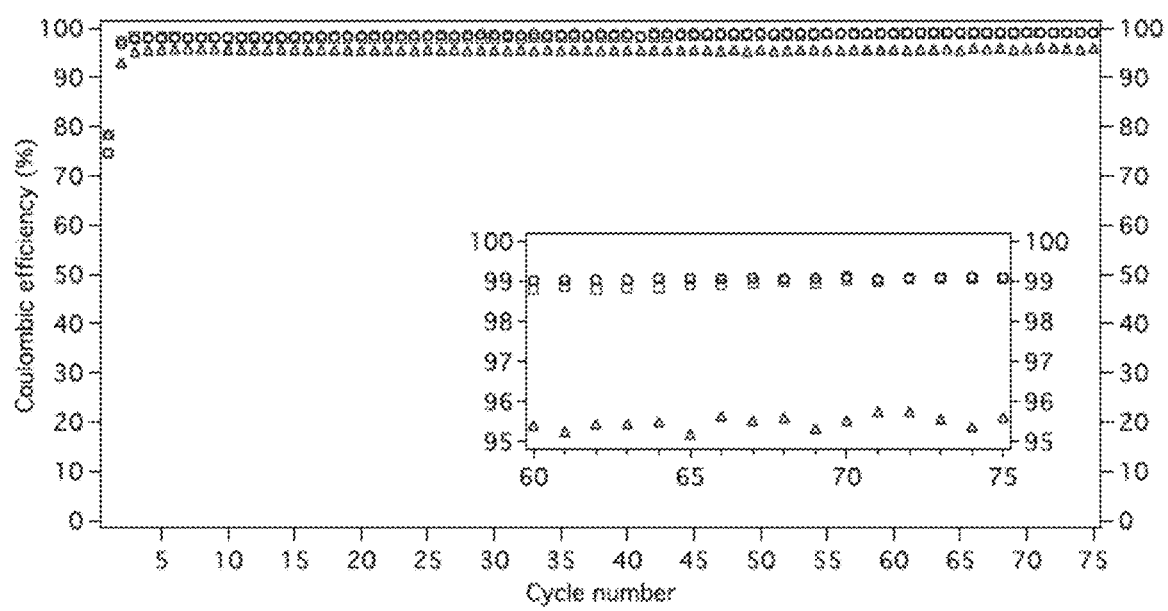
FIG. 17 compares the coulombic efficiencies of Si/MGNS cells cycled at C/5 rate (top line, circles), C/2 rate (middle line, squares), with mechanically mixed Si and MGNS at C/2 rate (bottom line, triangles). The first cycle was performed at C/20. The inset shows data for cycles 60-75, rescaled for clarity.

As can be seen from FIG. 16, reversible capacity is very stable for the first 20 cycles but fades gradually upon subsequent cycling, achieving 1115 and 946 mAh $g^{-1}$ composite (2788 and 2366 mAh $g^{-1}$ Si) after 75 cycles for cells cycled at C/5 and C/2, respectively. The first cycle Coulombic efficiency of the cells was 78% and 75% (FIG. 17). Cells cycled at C/5 and C/2 achieved and maintained greater than 99% Coulombic efficiency. Less than 100% Coulombic efficiency is typical of Li alloying materials due to physical degradation of the SEI layer during expansion and contraction of the lithiation/delithiation cycle and is likely the cause of the capacity fade for these cells (see, e.g., Liu et al., *Nano Lett.*, 12, 3315, 2012).

Figure 18:
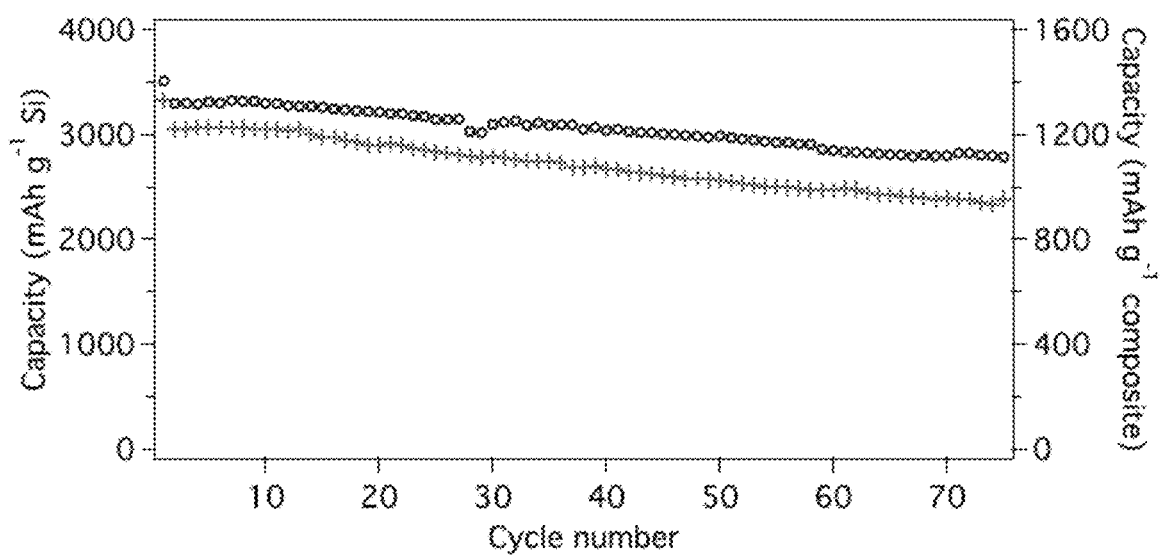
FIG. 18 shows the cycle life of Si/MGNS cells with 0.7 mg/cm² loading (top line, circles) and 1.25 mg/cm' loading (bottom line, crosses).
Figure 19:
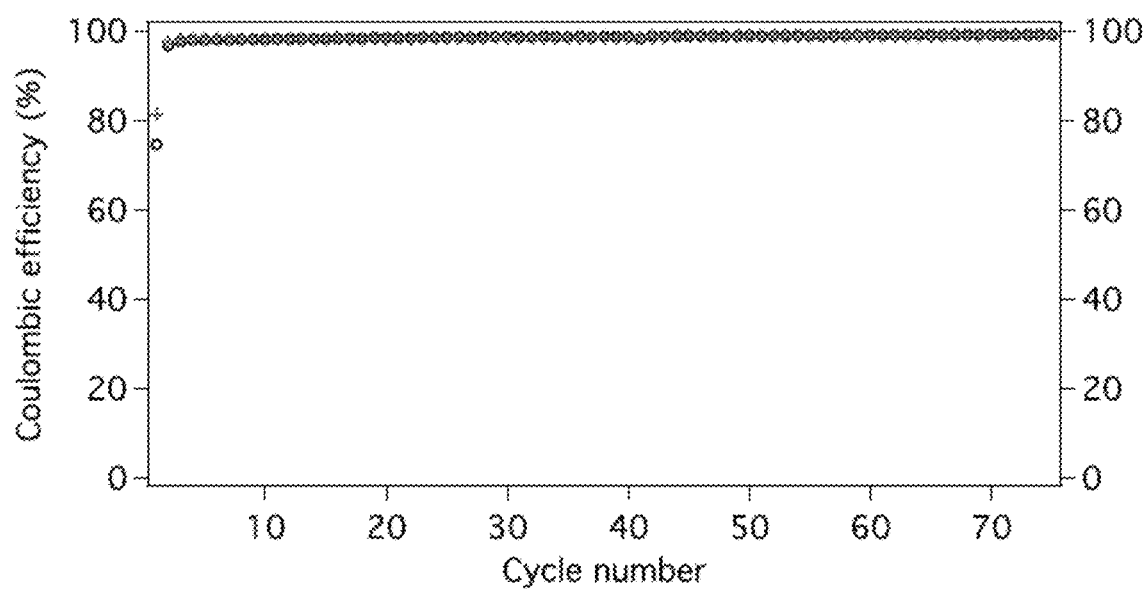
FIG. 19 shows the coulombic efficiencies of Si/MGNS cells with 0.7 mg/cm² loading (top line, circles) and 1.25 mg/cm² loading (bottom line, crosses).

Cells prepared at higher mass loading (1.35 mg/$cm^2$) showed similar electrochemical performance with only 5% lower gravimetric capacity at C/20, 7.5% lower capacity at C/5 rate and 6% higher capacity fade over 75 cycles (FIG. 18). The higher mass loaded cell had a higher first cycle Coulombic efficiency (81% vs 75%) and a similar long-term Coulombic efficiency of greater than 99% at 75 cycles (FIG. 19).

Comparative Cell by Mechanical Milling

Electrode active material prepared by mechanically milling $Si_{nano}$ with MGNS (Si+MGNS) performed significantly worse than electrode active material made by synthesizing $Si_{nano}$ in the presence of MGNS (Si/MGNS).

Figure 11A:
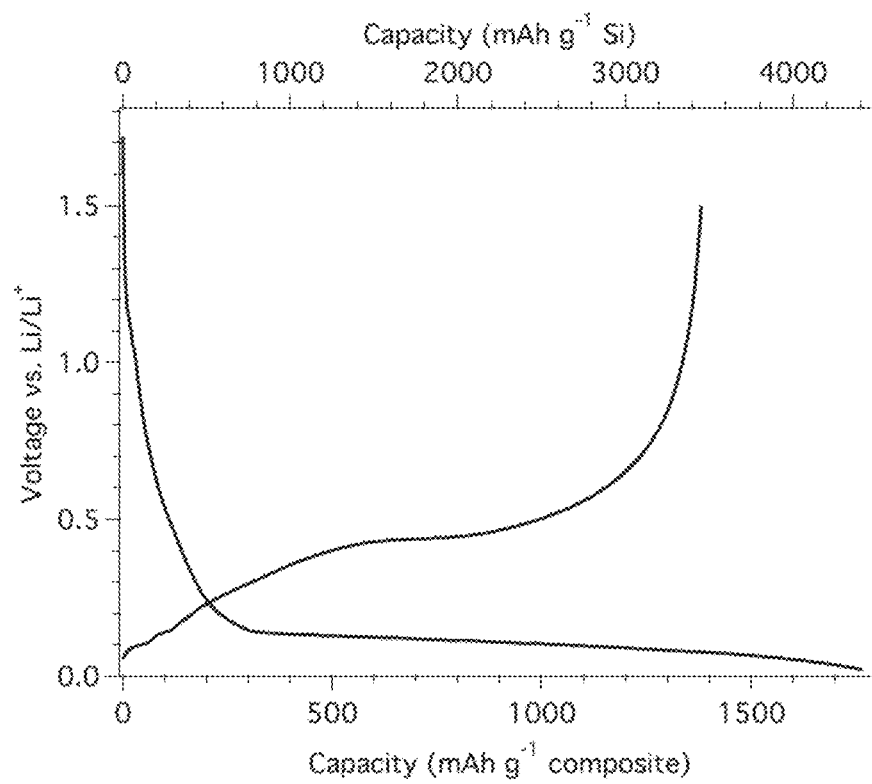
FIG. 11(a) is a galvanostatic cycling profile for Si/MGNS for the formation cycle at C/20.
Figure 11B:
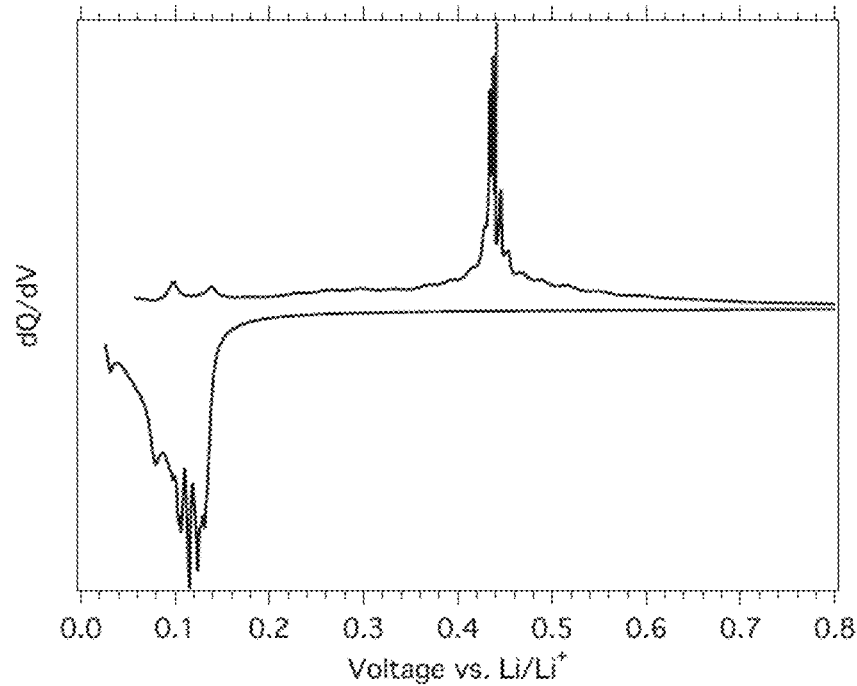
FIG. 11(b) is the differential capacity plot of the galvanostatic cycling profile shown in FIG. 11(a).
Figure 20A:
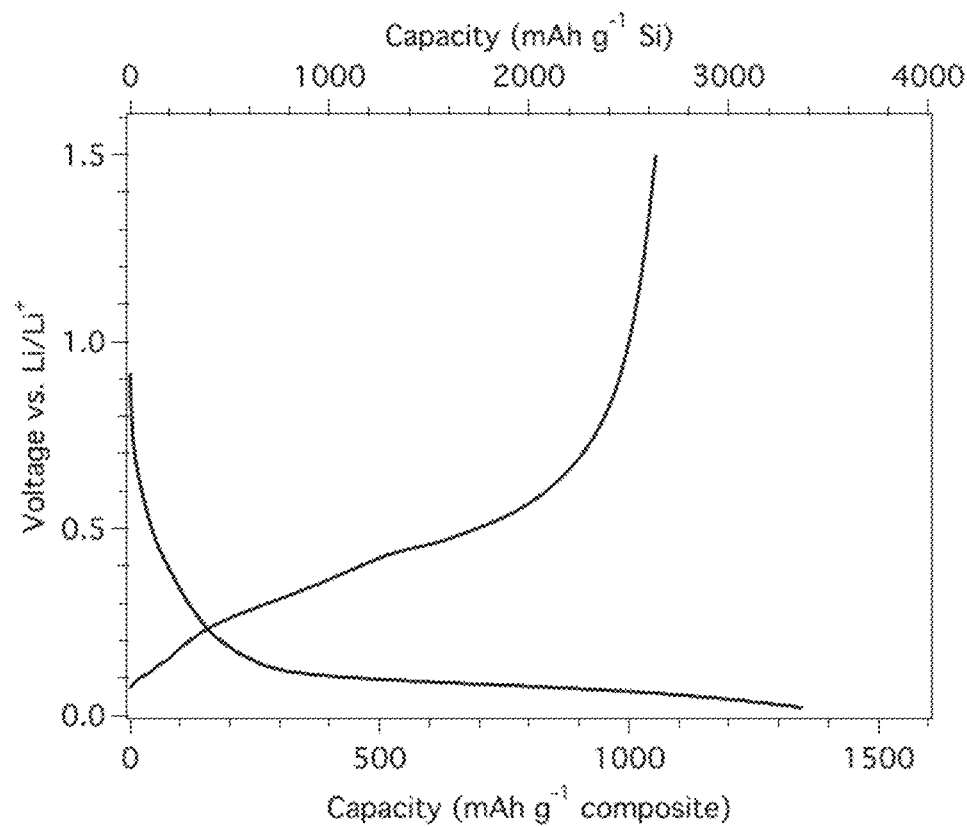
FIG. 20(*a*) is a galvanostatic cycling profile for Si MGNS (mechanically milled) for the formation cycle at C/20.
Figure 20B:
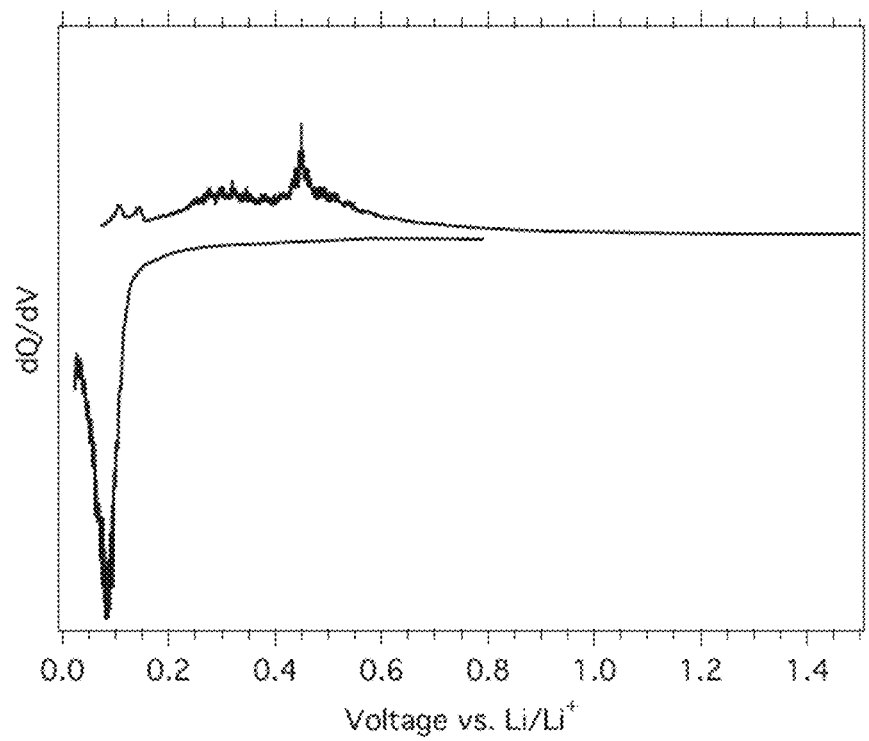

The initial reversible capacity at C/20 rate was 1050 mAh $g^{-1}$ composite (2625 mAh $g^{-1}$ by Si), 332 mAh $g^{-1}$ less than displayed by Si/MGNS (FIG. 20(a) and FIG. 11(a)). The onset of c-Si+MGNS lithiation occurred at a potential closer to Li/$Li^+$ (~90 mV) than with Si/MGNS (~120 mV). This potential decrease is likely due to inferior homogeneity and electrical contact of the Si material with the MGNS by mechanical milling, reducing conductivity within the anode. As a consequence, incomplete conversion to Li is Sty may have occurred, indicated by a less prominent plateau in the galvanostatic unload curve at 420 mV as well, as the presence of a broad peak from 200 to 400 mV consistent with delithiation of a-$Li_x$si (FIG. 11(b) and FIG. 20(b)).

Figure 21A:
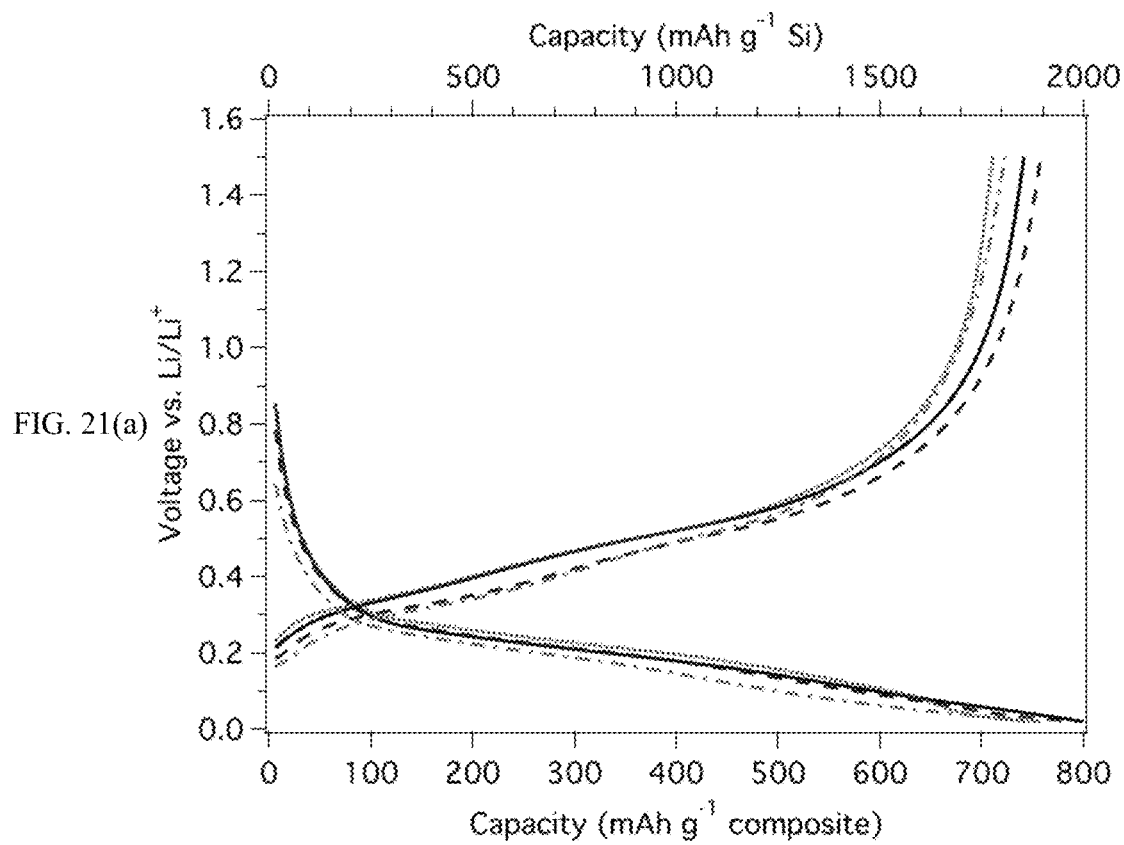
FIG. 21(*a*) is a galvanostatic charge/discharge plot for Si+MGNS (mechanically milled) cycled at C/2 rate for cell cycles 2 (solid line), 25 (dots), 50 (dashes) and 75 (dots and dashes).
Figure 21B:
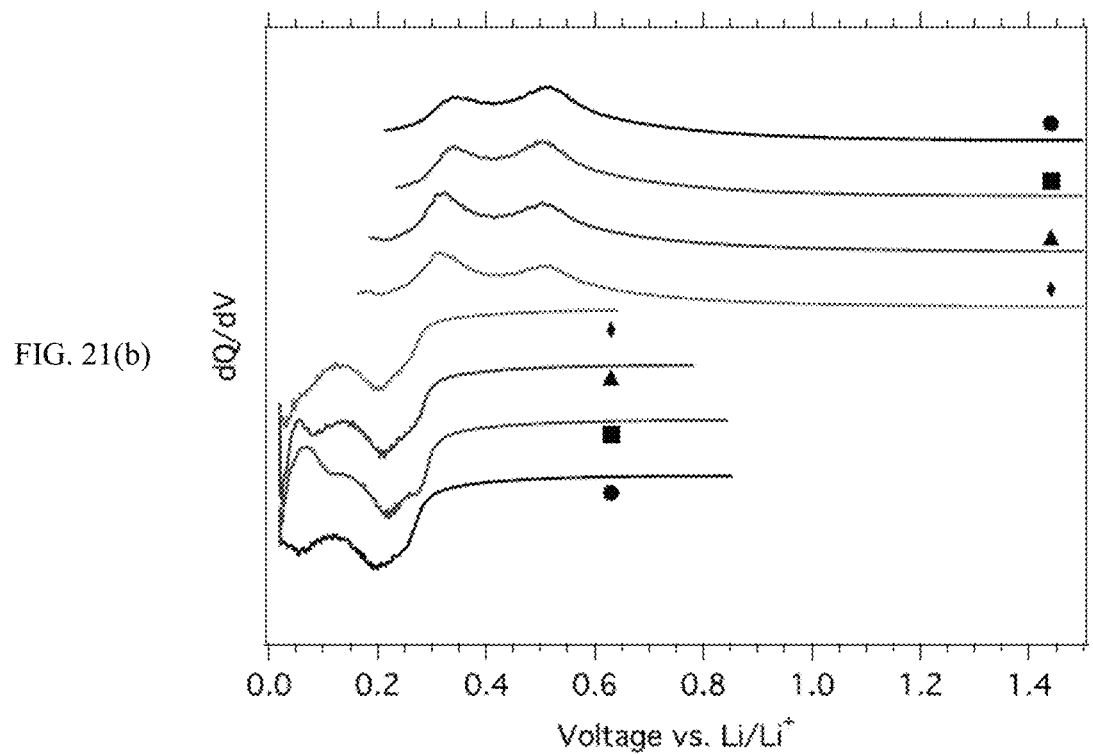

Cycle 2 at a C/2 rate had a reversible capacity of 741 mAh $g^{-1}$ (1854 mAh $g^{-1}$ Si) that faded further until cycle 7, after which it began to gain capacity, possibly due to achieving better electrical contact and activation of additional Si as the electrode expanded and contracted (FIG. 16). Improvement in the electrical contact of the Si is indicated by the decrease in delithiation potential with increasing cycle number (FIG. 21). While the de-lithiation potential at cycle 50 and 75 occurred at similar values, the lithiation potential decreased, becoming closer to Li/$Li^+$, consistent with an increase in impedance. Comparing the lithiation/delithiation curves of Si+MGNS (FIG. 21) to those of Si/MGNS (FIG. 14) indicates that the mixed material has inferior load/unload potentials with significantly larger hysteresis over all cycles. This is not surprising considering the Coulombic efficiency of Si with MGNS never exceeded 95.6%, consistent with a far greater degree of solid electrolyte interface (SEI) growth occurring each cycle than with Si/MGNS.

Impedance

Figure 22:
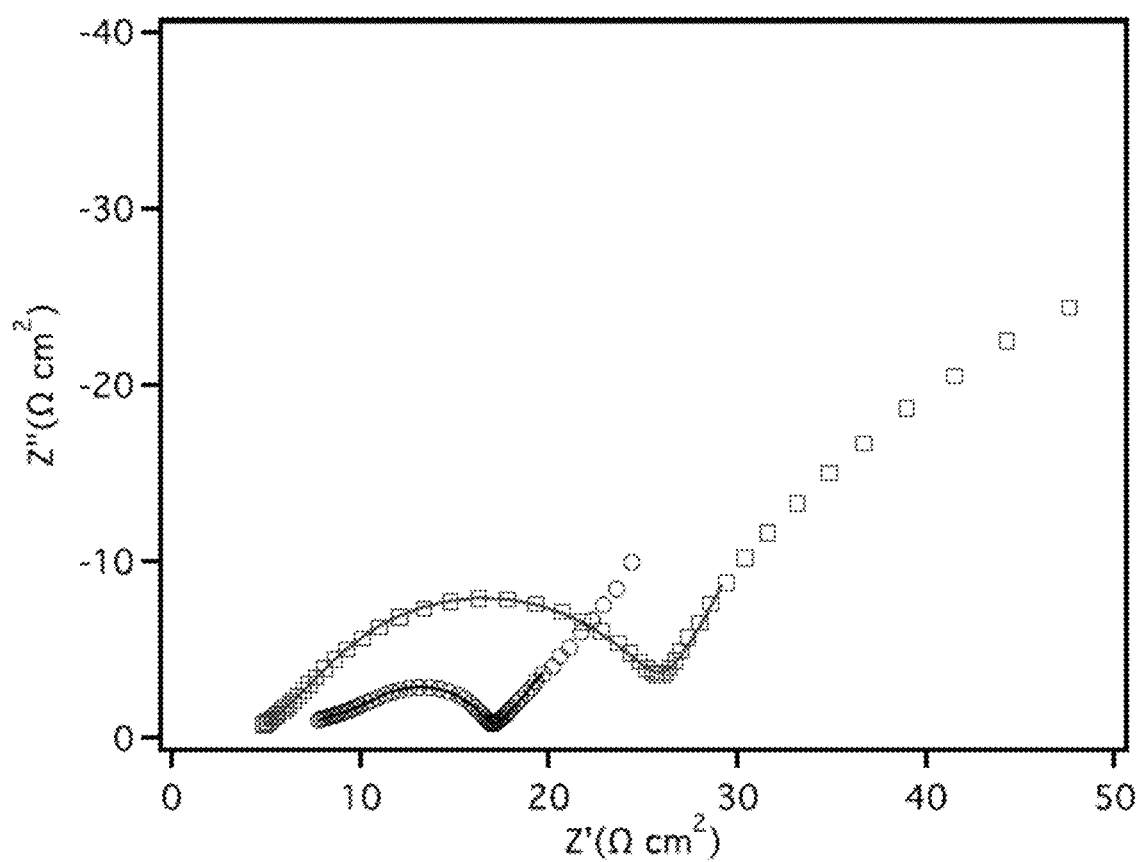
FIG. 22 is a EIS spectrum of Si/MGNS (circles) and Si MGNS (mechanically milled) anodes (squares) obtained after loading Li+ to 0.2 V and their corresponding fits (solid lines). The Si+ MGNS shows higher impedance.
Figure 23:
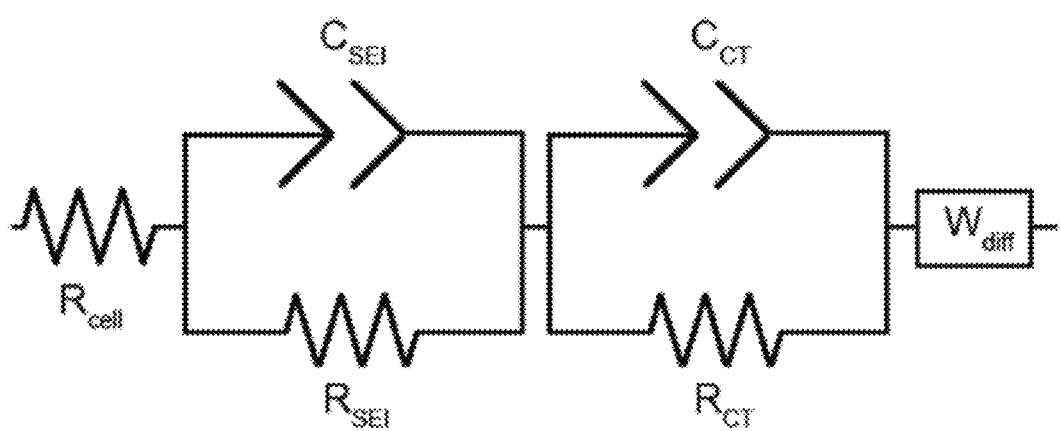
FIG. 23 depicts an exemplary equivalent circuit of the EIS model.

Impedance spectra of the Si/MGNS and Si+MGNS (FIG. 22) were modeled to a modified Randles equivalent circuit composed of an element for the resistance of the electrolyte and cell components ($R_{cell}$), RC elements composed of SEI resistance ($R_{SEI}$), charge-transfer resistance ($R_{CT}$) and constant phase elements ($C_{SEI}$ and $C_{DL}$) for the SEI and charge transfer processes and a Warburg element ($W_{diff}$) for solid state diffusion (FIG. 23).

Analysis of the spectra show that, following the initial cycle, $R_{SEI}$ and $R_{CT}$ of Si/MGNS are nearly identical during loading and unloading, and show little growth with extended cycling, consistent with the high Coulombic efficiency observed and indicating the formation of a stable SEI layer. In contrast, $R_{SEI}$ of Si+MGNS increases upon loading to a value that is approximately the same as for Si/MGNS, but then decreases significantly on fully unloading. Additionally, $R_{CT}$ of Si+MGNS increases during loading and retains its magnitude upon unloading, growing from cycle to cycle. This behavior and the low Coulombic efficiency observed is consistent with the formation of an unstable SEI, that grows during loading to become similar to that on Si/MGNS, but then is significantly disrupted during unload, providing more direct contact between the silicon and the electrolyte and thus lower $R_{SEI}$, but increasing Rex as the remnants of the SEI that have broken free of the Si restrict the porosity of the electrode. The difference in the behavior of the Si/MGNS and the Si+MGNS in this respect may be due to the better dispersion of the silicon in the former as observed in SEM, while larger agglomerates in the latter experience more mechanical degradation during the load/unload cycles.

Example 2

Synthesis of Si Nanomaterial by Mechanical Milling of Silicide and Aluminum Salt In a nitrogen filled glove box (<0.1 ppm $O_2$ and $H_2O$) 1.5 mg of $Mg_2Si$ (99.9% Alfa Aesar) was combined with 4.0 g of anhydrous $AlCl_3$ (99.9% Sigma Aldrich) in a 80 mL tungsten carbide cup with 4 tungsten carbide 1.5 cm balls. The cup was capped with a lid and a Viton Q-ring. Insulating tape was placed around the seal gap to provide additional protection from oxygen. The reactants were milled at 450 rpm for 18 hours. The cup was transferred back into the nitrogen filled glove box and the contents were transferred to a round bottom flask containing a stir bar and capped with a rubber septum. Under nitrogen gas purge, deionized water (purged with argon) was transferred to the round bottom flask via cannula to dissolve the unwanted salts. A 10% HCl solution was added to dissolve Al and any unreacted $Mg_2Si$. The solution was stirred overnight, the Si product washed with distilled water until a neutral pH was obtained, then further dried under vacuum.

Figure 24:
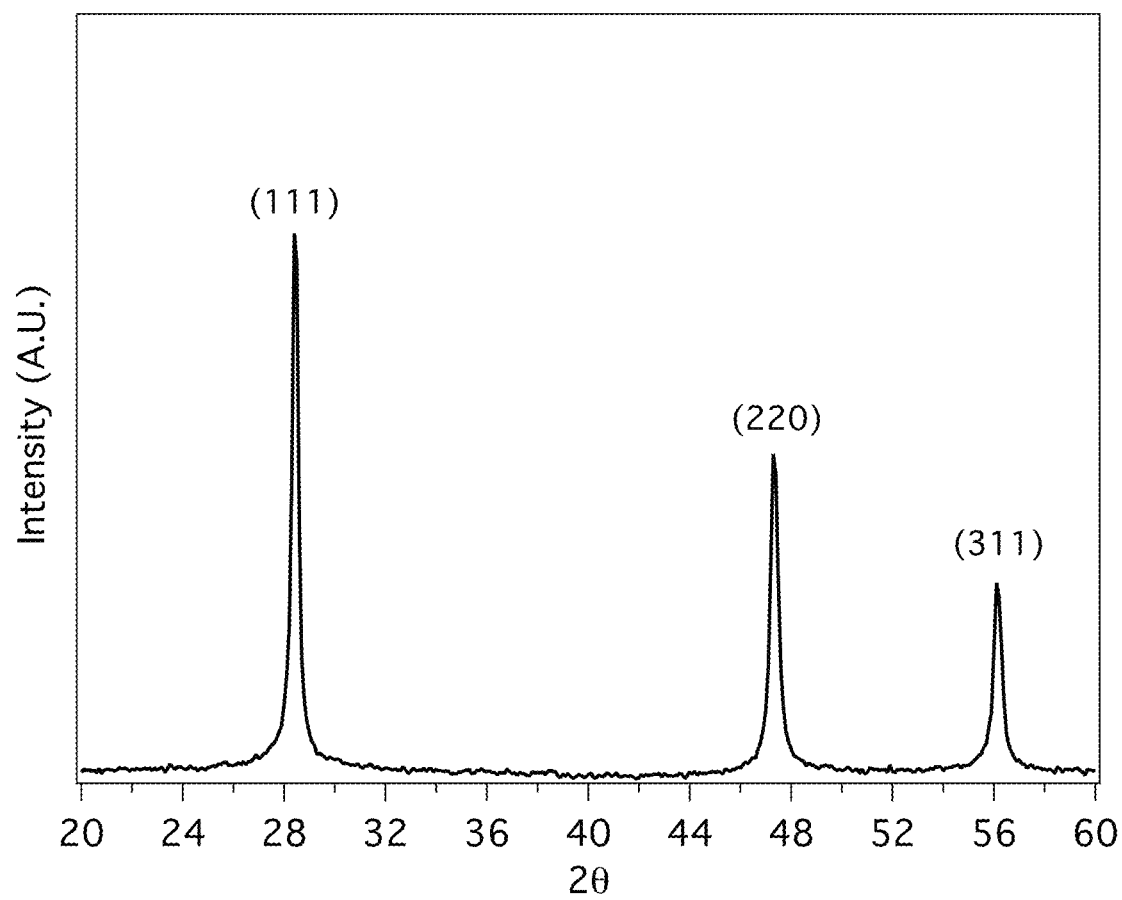
FIG. 24 is a powder X-ray diffraction pattern of a purified (HCl washed) Si nanomaterial prepared by mechanical milling of $Mg_2Si$ and $AlCl_3$.

FIG. 24 shows the XRD pattern of the purified Si product obtained after the HCl wash, showing evidence of crystalline Si with no apparent impurities.

Electrode Preparation 150 mg of the Si product were combined with 50 mg of Super C45 carbon in a 80 mL tempered steel cup and 6 1.5 cm tempered steel balls and mechanically mixed with a Fritsch Pulverisette 6 at 200 RPM for 30 minutes. The resulting powder was combined with 50 mg of a 1:1 wt. ratio of carboxymethyl cellulose and poly-acrylic acid then stirred in a 10% ethanol solution until a viscous slurry was achieved. The slurry was cast onto copper electrodes with a doctor blade and dried under vacuum at 150° C. for 2 hours. The electrode mass was 0.7 mg/cm$^2$.

Electrochemical Cycling

Coin cells (CR2016, MTI Inc.) containing Si/C and Li metal (99.9%, MTI Inc.) electrodes separated by a polypropylene porous membrane (Celgard 3401) were assembled in an argon filled dry box (<0.1 ppm $O_2$ and $H_2O$). The electrolyte used was 1 M $LiPF_6$ in EC:DMC (ethylene carbonate: dimethyl carbonate, 1:1 v/v) mixture (battery grade, <15 ppm $H_2O$ content, Sigma Aldrich) with 10% FEC (>99%, Solvay) by volume. Cells were cycled at constant, current (C/20) for one cycle between open circuit voltage to a cutoff potential then under reverse current to 1.2 V vs. Li/Li+. Subsequent cycling was performed at a C/4 rate, with cutoff potentials of 10 mV vs. Li/Li+.

Figure 25:
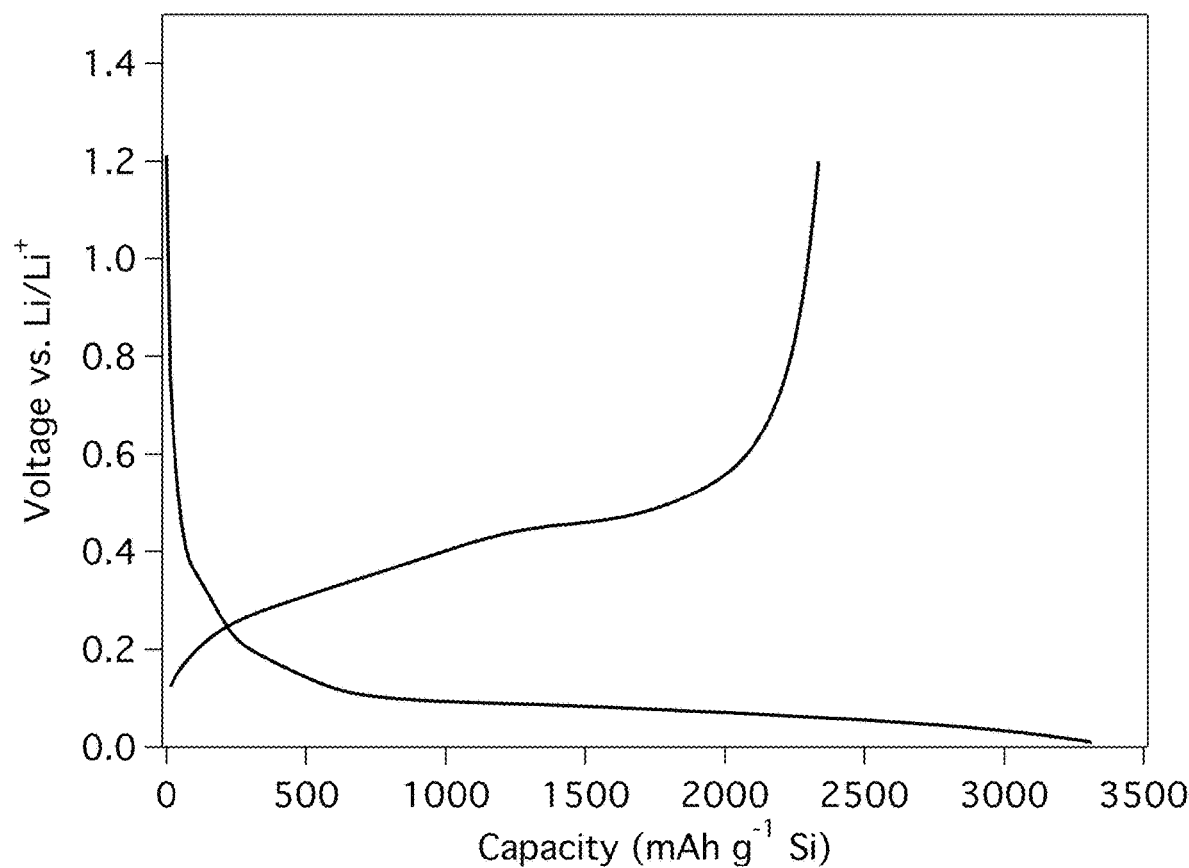
FIG. 25 depicts a first cycle galvanostatic plot of a purified (HCl washed) Si nanomaterial prepared by mechanical milling of $Mg_2Si$ and $AlCl_3$.

FIG. 25 show's the first cycle galvanostatic plot for the Si/C composite.

Figure 26:
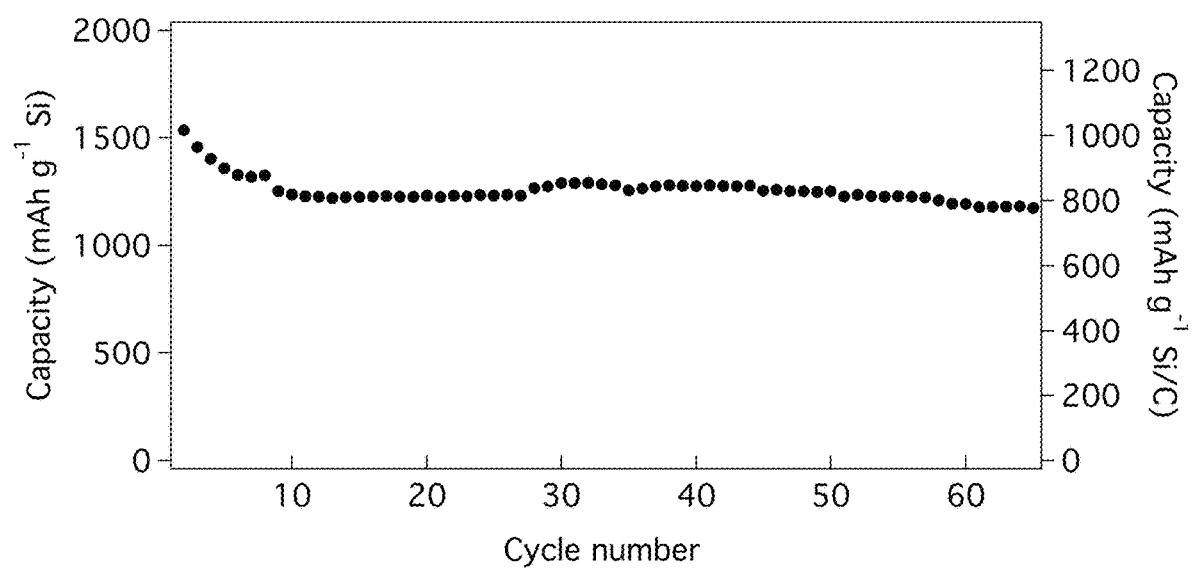
FIG. 26 shows the cycle life of the purified (HCl washed) Si nanomaterial prepared by mechanical milling of $Mg_2Si$ and FIG. 27 shows the XRD pattern for the synthesize Si/graphite product, with the Si mass fractions of each composite indicated on the figure.

FIG. 26 shows the cycle life of the Si/C composite cycle at C/4 rate.

Example 3

Synthesis of Si in the Presence of Graphite as a Support Material to Form a Si/Graphite Composite Material A Si/graphite composite was prepared according to the procedure described in Example 1, with the exception that Timcal SFG-6™ graphite was used as the support instead of carbon nanospheres. The mass fraction of the Si in the composites was varied (10, 20 and 30 w/w % Si in the Si/graphite composites).

Figure 27:
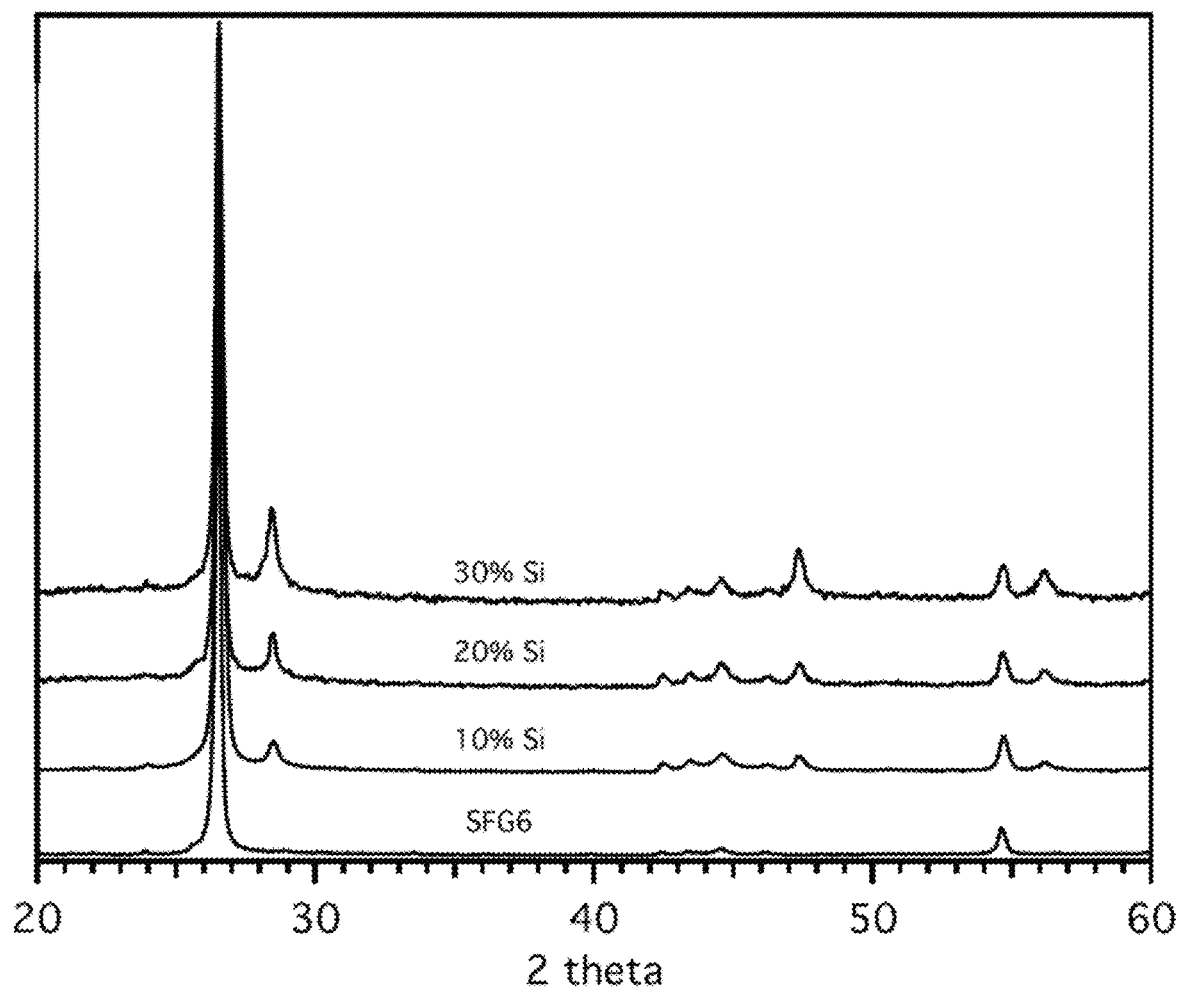

FIG. 27 shows the XRD pattern for the synthesize Si/graphite product, with the Si mass fractions of each composite indicated on the figure. FIG. 27 shows evidence of crystalline Si and graphite.

Figure 28:
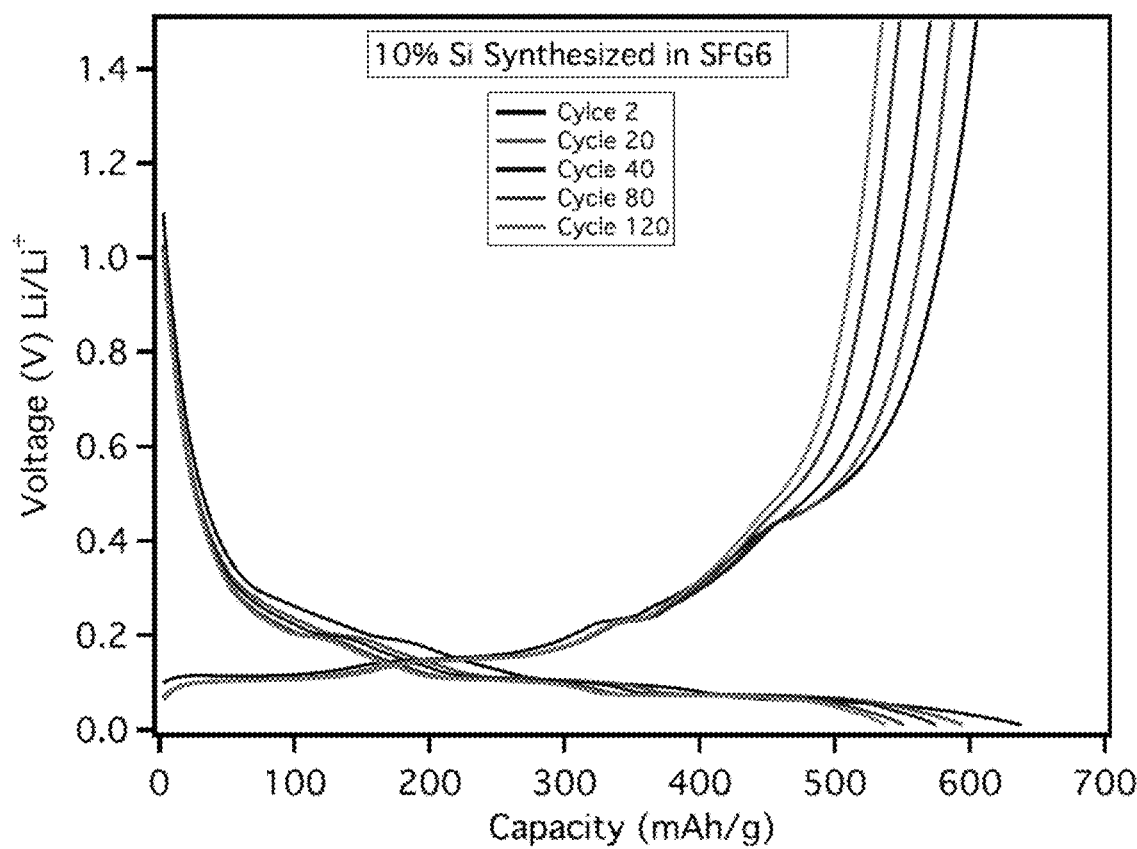
FIG. 28 shows the galvanostatic cycling profile of Si/graphite product in which the mass fraction of Si in the composite is 10%.

FIG. 28 shows the galvanostatic cycling profile of a Si/graphite product in which the mass fraction of Si in the composite is 10%. FIG. 28 shows voltage plateaus consistent with the insertion and de-insertion of Li from Si and graphite.

Figure 29:
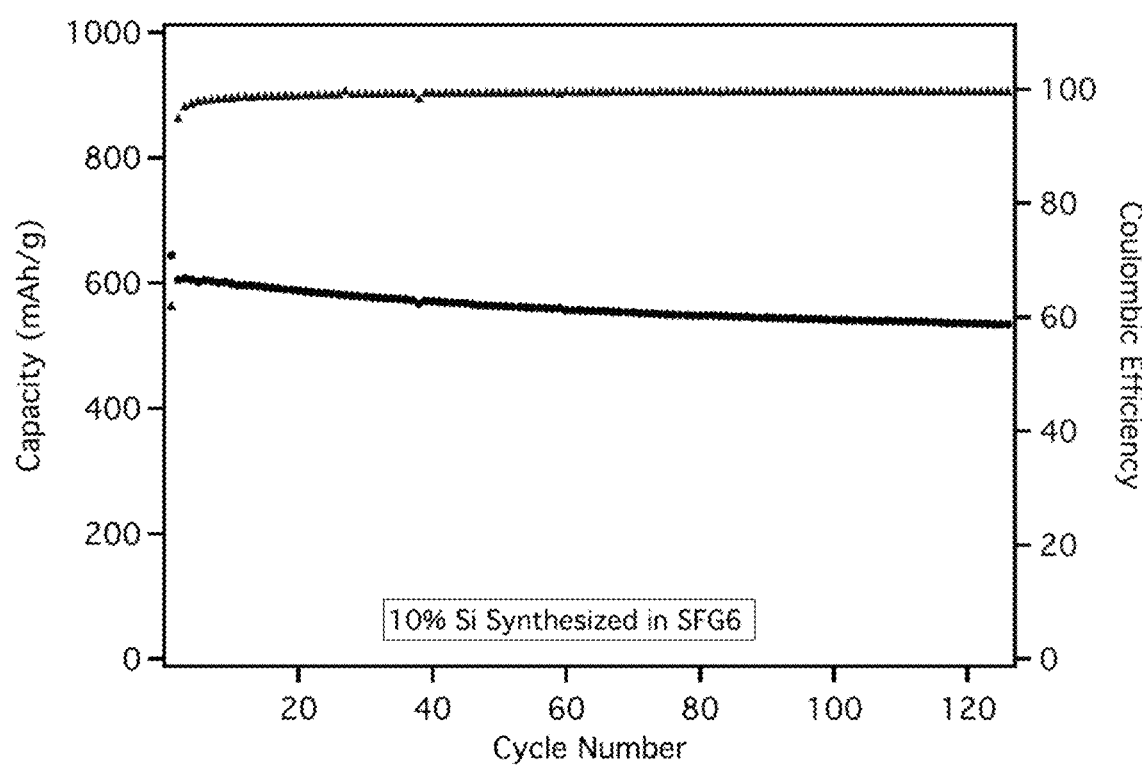
FIG. 29 shows the cycle life (circles) and Coulombic efficiency (triangles) of Si/graphite product in which the mass fraction of Si in the composite is 10%.

FIG. 29 shows the cycle life (black circles) and Coulombic efficiency (blue triangles) of Si/graphite product in which the mass traction of Si in the composite is 10%.

Figure 30:
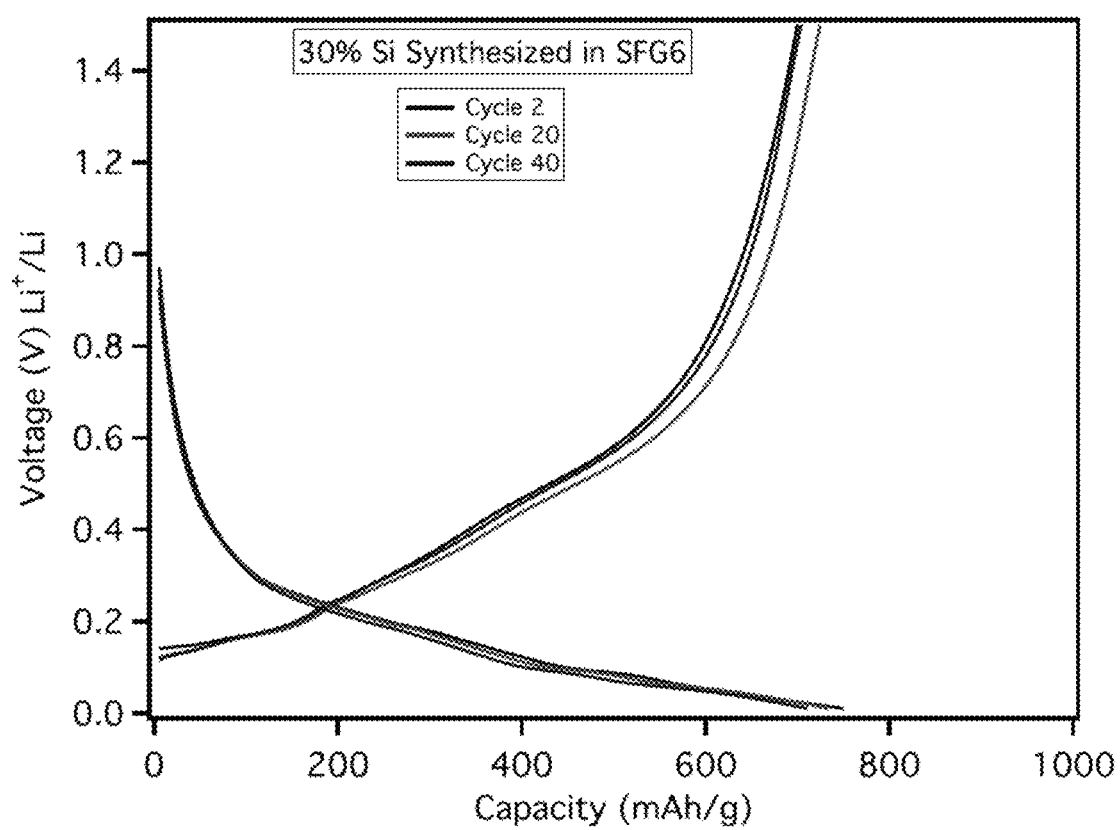
FIG. 30 shows the galvanostatic cycling profile of Si/graphite product in which the mass fraction of Si in the composite is 30%.

FIG. 30 shows the galvanostatic cycling profile of Si/graphite product in which the mass fraction of Si in the composite is 30%.

Figure 31:
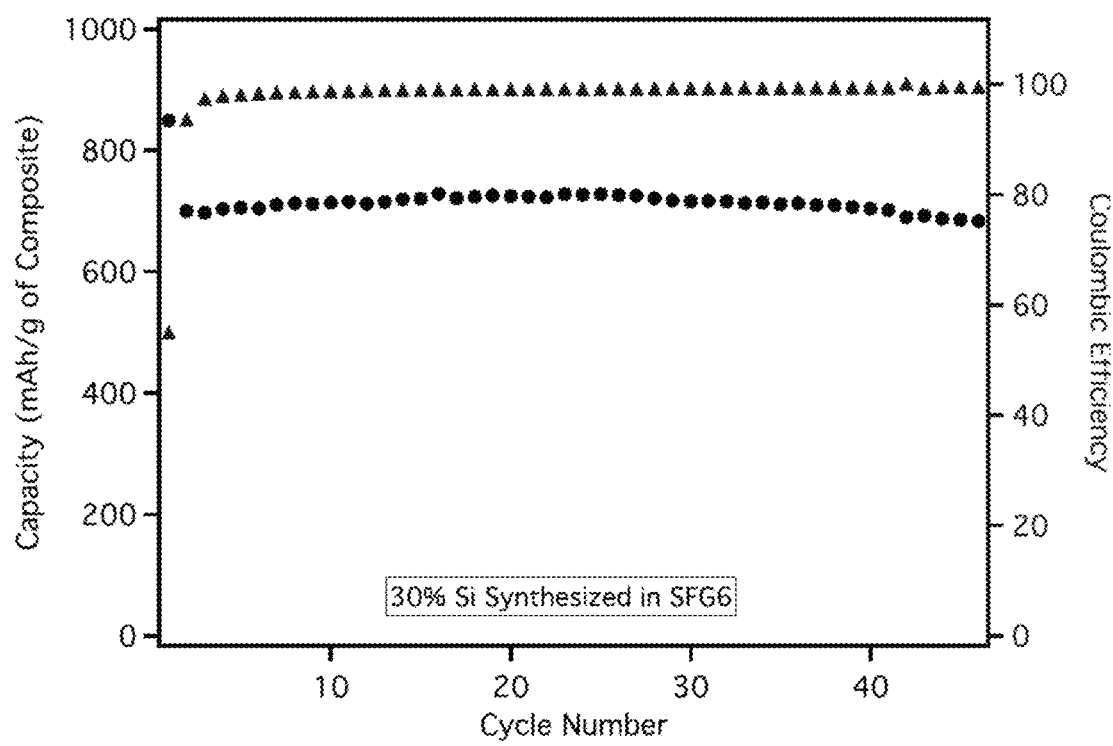
FIG. 31 shows the cycle life (bottom line, circles) and coulombic efficiency (top line, triangles) for Si/graphite product in which the mass fraction of Si in the composite is 30%.

FIG. 31 show's the cycle life (black circles) and Coulombic efficiency (blue triangles) of Si/graphite product in which the mass fraction of Si in the composite is 30%.

Example 4

Synthesis of Si Nanoparticles in a Molten Salt.

Sodium chloride (2.0 g, ACS certified, Fisher Scientific) and potassium chloride (1 g, ACS certified, Fisher Scientific) were dried overnight at 300° C. and then added with aluminum chloride (7.6 g, anhydrous 99.985%, Alfa Aesar), and $Mg_2Si$ (0.24 g, 99.5% Alfa Aesar) to a 50 mL Pyrex round bottom flask containing a polytetrafluoroethylene coated stir bar. The flask was then heated to 150° C. resulting a molten salt mixture. The mixture was stirred for 2 hours and then allowed to cool and solidify, followed by the addition of hydrochloric acid (HCl, 100 ml, ACS grade 36.5 to 38%, VWR Analytical). Following a 3 hour treatment with HCl, the product (Si nanocrystals) was isolated by vacuum filtration and washed with deionized water.

Figure 32:
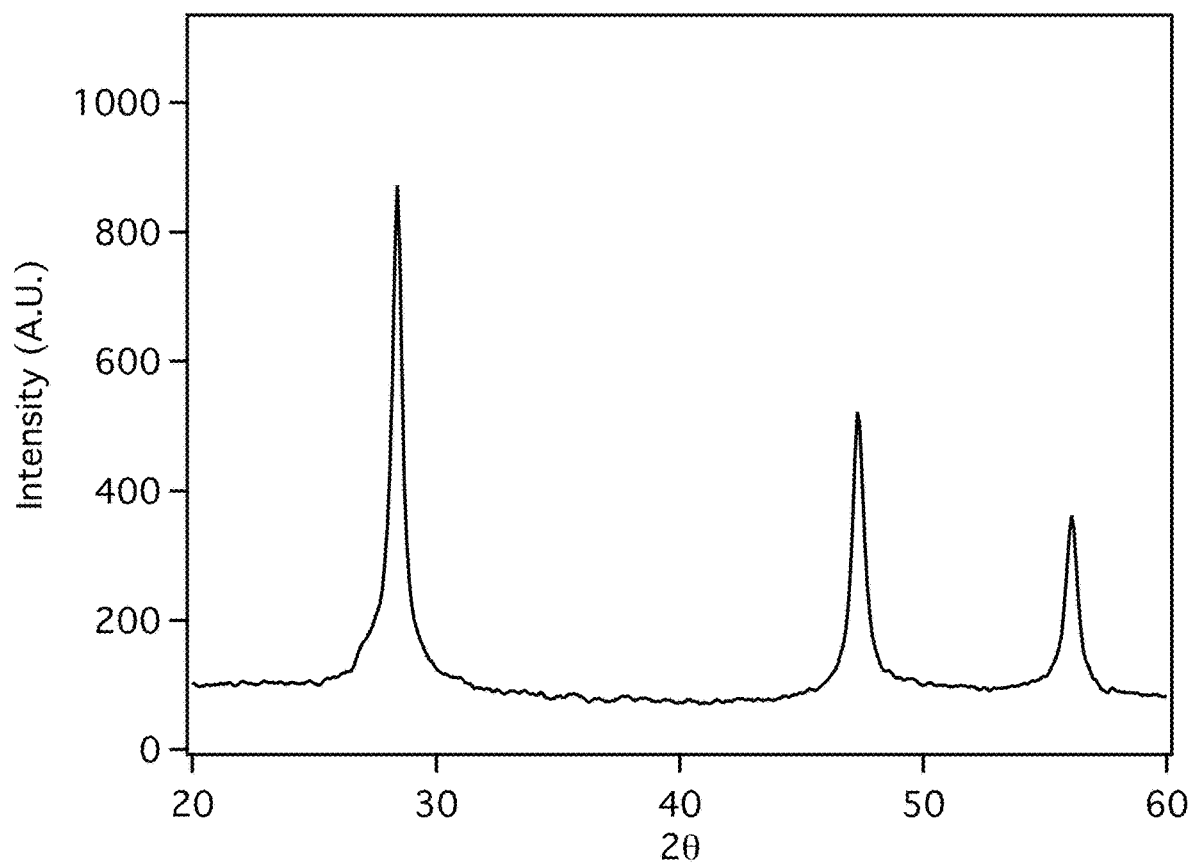
FIG. 32 shows the XRD pattern for the nanoscale Si produced from $Mg_2Si$ in a molten salt matrix of NaCl, KCl and $AlCl_3$ at 150° C.

FIG. 32 shows the XRD pattern for the nanoscale Si produced from $Mg_2Si$ in a molten salt matrix of NaCl, KCl and $AlCl_3$ at 150° C., showing evidence of crystalline Si with no apparent impurities.

Figure 33:
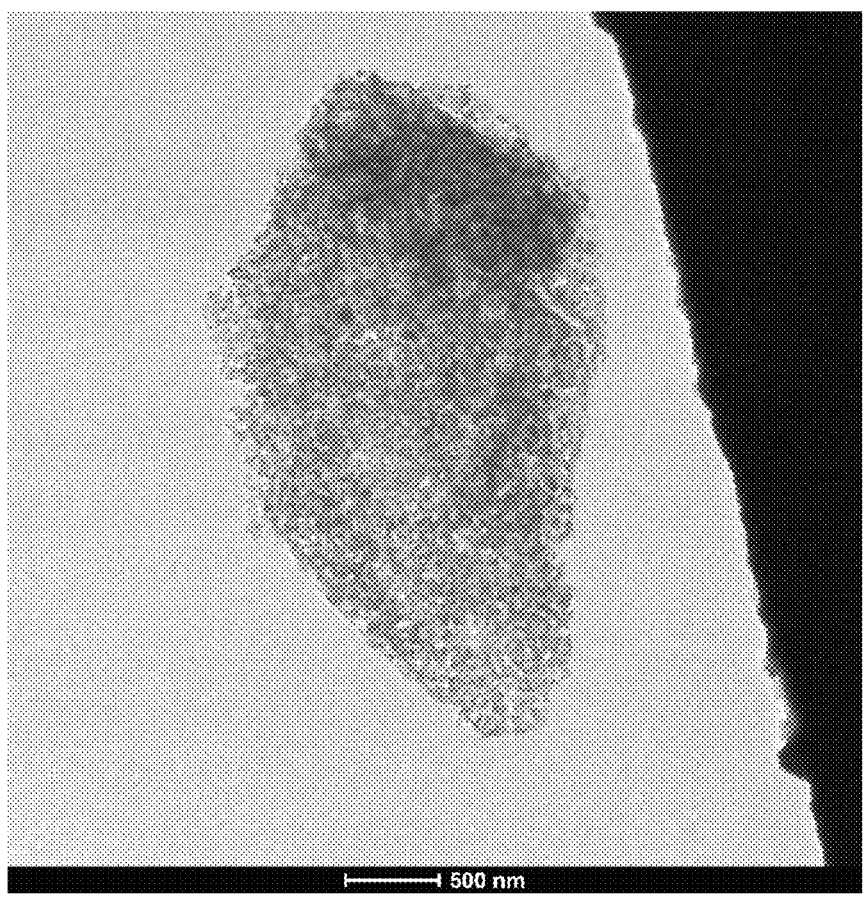
FIG. 33 shows a TEM image of the purified crystalline Si product produced from $Mg_2Si$ in a molten salt matrix of NaCl, KCl and $AlCl_3$ at 150° C.

FIG. 33 shows a TEM image of the purified crystalline Si product produced from $Mg_2Si$ in a molten salt matrix of NaCl, KCl and $AlCl_3$ at 150° C., showing the nanoscale dimensions of the particles.

Figure 34:
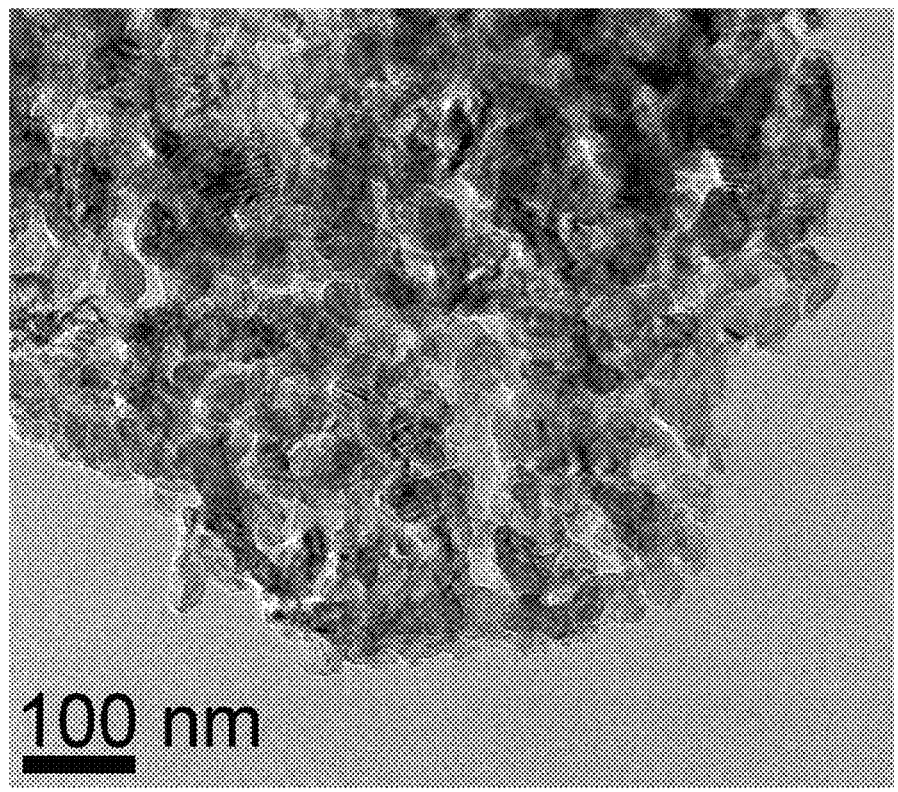
FIG. 34 shows a TEM image of the purified product as shown in FIG. 33 but at higher resolution.

FIG. 34 shows a TEM image of the purified product as in FIG. 33 but at higher resolution.

Figure 35:
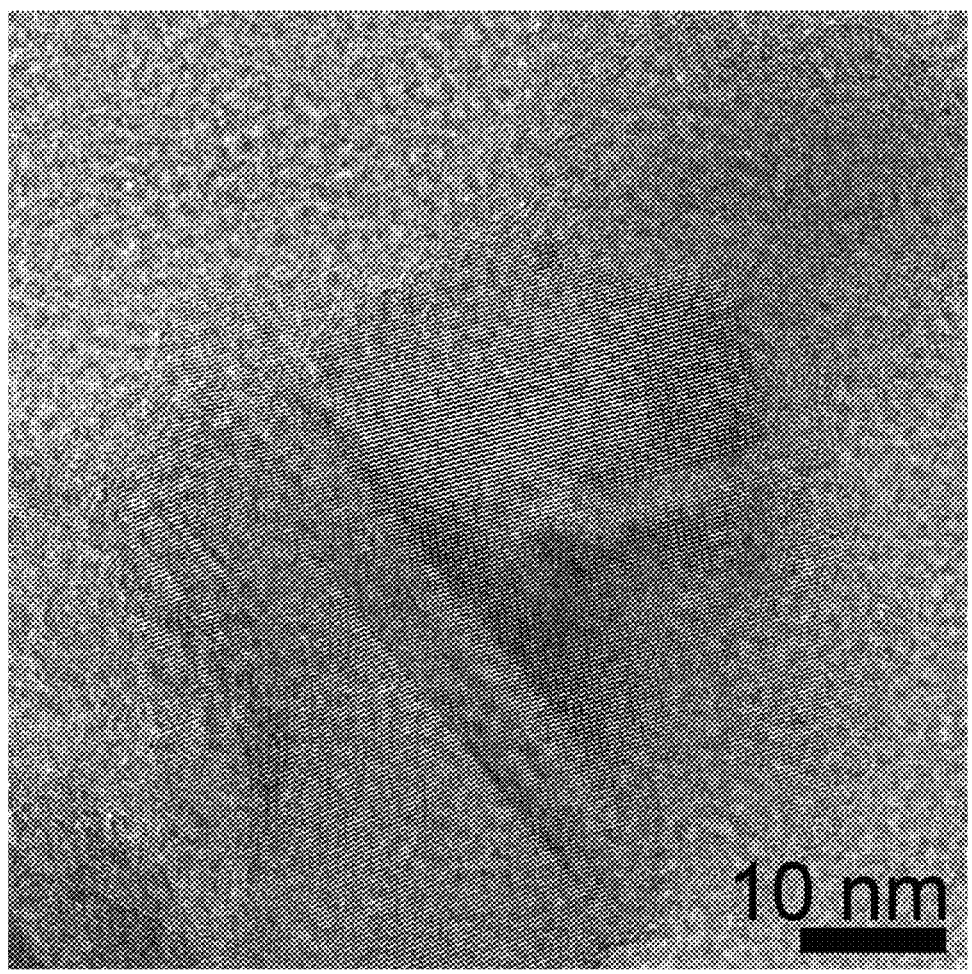
FIG. 35 shows a HR-TEM image of the purified product as shown in FIGS. 33 and 34 but at higher resolution.

FIG. 35 show's a HR-TEM image of the purified product as in FIG. 33 and FIG. 34 at higher resolution, displaying visible lattice fringes consistent with crystalline Si with little or no oxidation despite its previous exposure to air and water.

Figure 36:
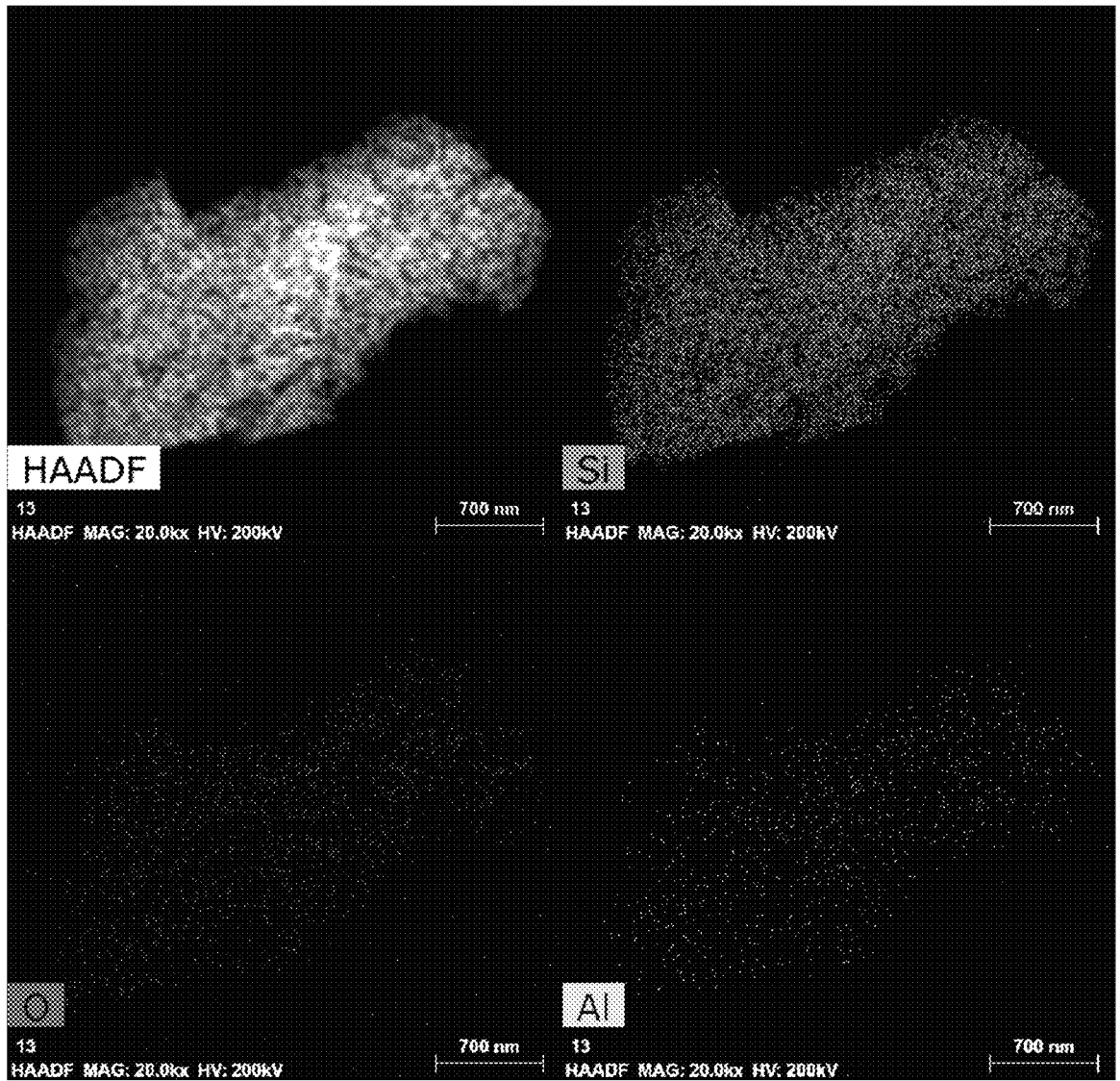
FIG. 36 shows an EDS hypermap of the purified product highlighting the location of Si (upper right), O (lower left), and Al (lower right) in the TEM image (upper left).

FIG. 36 show's an EDS hypermap of the purified product highlighting the location of Si (upper right), O (lower left), and Al (lower right) in the TEM image (upper left). Spectral analysis found the overall composition to be 87% Si, 10% O, and 3% Al.

Example 5

Synthesis of Si Nanoparticles in Solution

In an inert atmosphere ($N_2$) dry box, $AlBr_3$ (2.5 g) was combined with $Mg_2Si$ (0.523 g), toluene (10 mL) and a polytetrafluoroethylene coated magnetic stir bar in a 50 mL dual neck round bottom flask. One of the flasks necks was then capped with a rubber septum and the other with a glass stopper. The flask was removed from the dry box and connected to a water cooled condenser attached to a Schlenk line, while purging the headspace of the flask with nitrogen using a needle inserted through the septum. The solution was brought to and held at reflux for 24 hours, then allowed to cool to room temperature. The resulting solid product was separated from the solution by centrifuge. 40 mL of acetone was then added to the solid and the product again separated by centrifuge. The solid product was combined with HCl solution (300 mL, 50% v/v) and left to sit at room temperature for 5 hours. The purified Si nanoparticle product was then isolated by vacuum filtration and washed with deionized water until a neutral pH was obtained.

Figure 37:
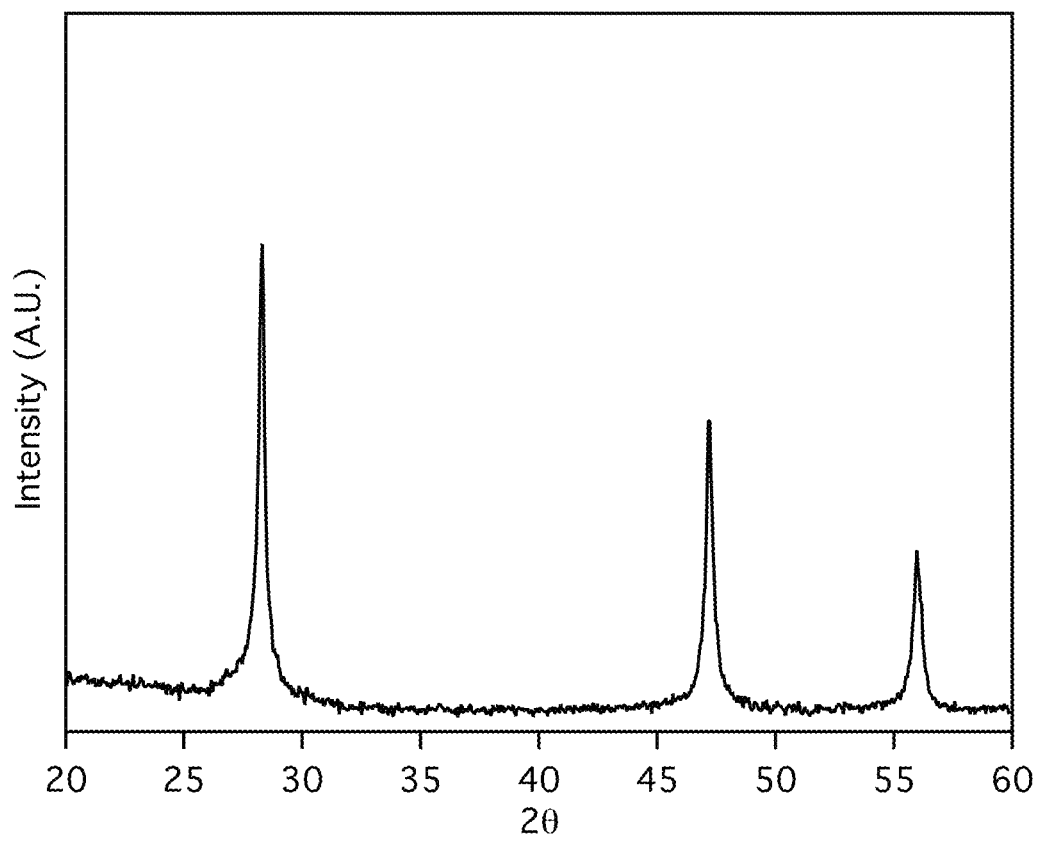
FIG. 37 shows the XRD pattern for the nanoscale Si produced from $AlBr_3$ and $Mg_2Si$ in refluxing toluene.

FIG. 37 shows the XRD pattern for the nanoscale Si produced from $AlBr_3$ and $Mg_2Si$ in refluxing toluene, showing evidence of crystalline Si with no apparent impurities.

Example 6

Synthesis of Hydrogen Terminated Highly Porous Amorphous Silicon Prior to mixing, NaCl (99.5%, Acros Organics) was dried at 300° C. for 12 hours and $Mg_2Si$ (99.99%, Alfa Aesar) was hand ground into a fine powder under an argon atmosphere. In an argon filled dry box (<1 ppm $H_2O$ and <1 ppm $O_2$ content), 10.85 g $AlCl_3$ (anhydrous 99.985%, Alfa Aesar), 0.367 g $Mg_2Si$ and 2.38 g NaCl were combined in an 80 mL tempered steel ball mill with ten 1 cm tempered steel balls (10:1 ball to powder mass ratio) and mixed at 150 rpm for 60 minutes.

In the argon filled dry box, the mixed powder was transferred to a 250 mL round bottom flask and equipped with a Teflon coated stir bar and capped with a rubber septum to prevent air exposure. Under flowing argon gas, the round bottom flask was partially submerged into a preheated oil bath at 125° C. Upon complete melting of the salt, the solution was stirred for an additional 10 minutes. The round bottom flask was removed from the oil bath and allowed to cool to room temperature. The flask was then submerged in an ice bath and 200 mL of degassed methanol was added and stirred until gas ceased to evolve and the solution turned dark red. 10 mL HCl (ACS grade 36.5 to 38%, VWR Analytical) was added and the mixture stirred for 15 minutes. The resulting product (hydrogen terminated highly porous amorphous silicon) was isolated by vacuum filtration, dispersed into 200 mL deionized water, agitated by sonication for 1 minute, isolated again by vacuum filtration and washed with 200 mL deionized water. The product was immediately dried under dynamic vacuum and transferred to an argon filled dry box.

The BET surface area of the resulting product was 769±3.5 $m^2/g$.

The Barret-Joyner-Halenda (BJH) desorption cumulative pore volume of the resulting product was 0.66 $cm^3/g$.

The average BJH desorption pore width of the resulting product was 4.3 nm.

Figure 38:
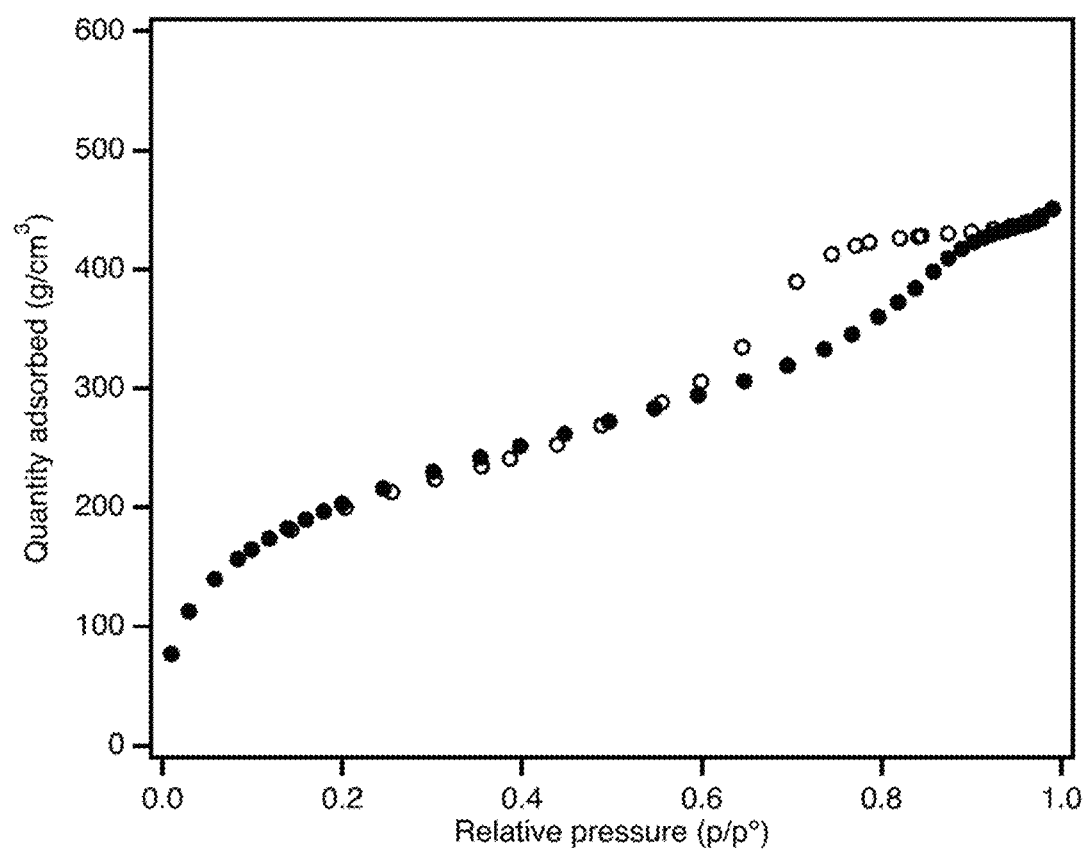
FIG. 38 shows the adsorption (solid circles) and desorption (hollow circles) nitrogen isotherm of the hydrogen terminated silicon prepared in Example 6.

FIG. 38 shows the adsorption (solid circles) and desorption (hollow circles) nitrogen isotherm of the hydrogen terminated silicon product.

Figure 39:
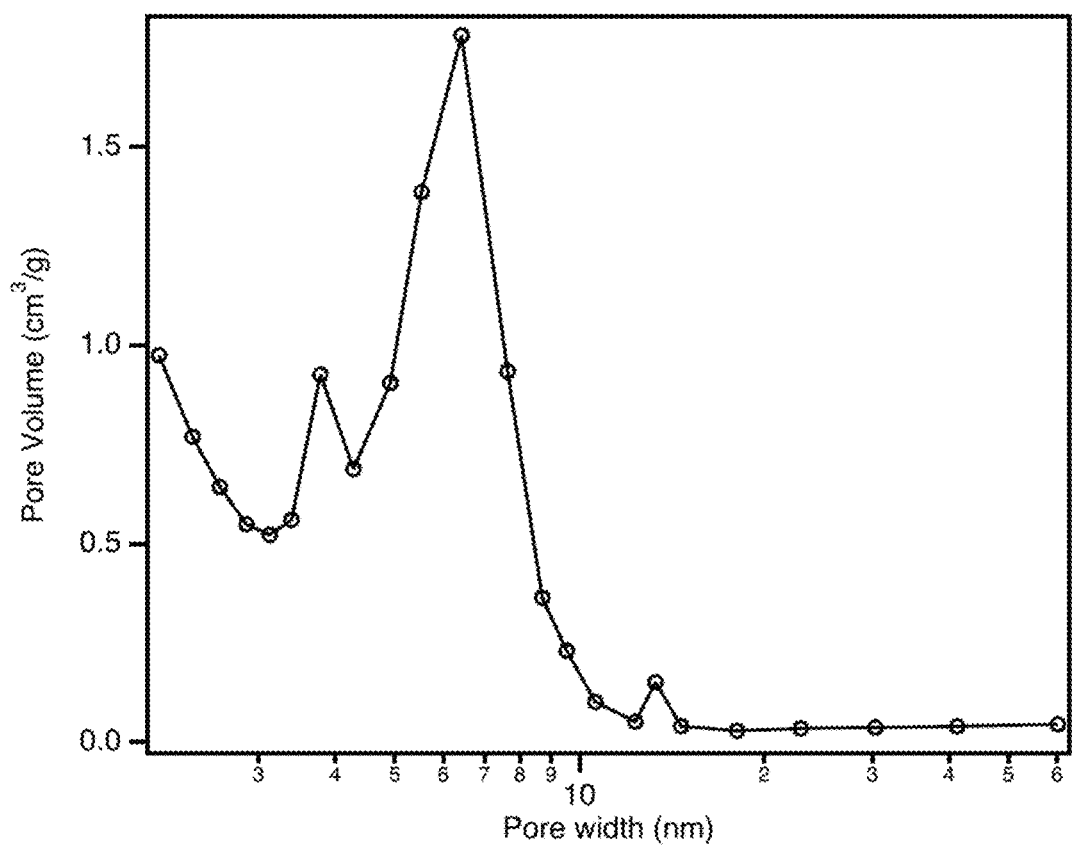
FIG. 39 shows the BM pore size distribution of the hydrogen terminated silicon prepared in Example 6.

FIG. 39 shows the BJH pore size distribution of the hydrogen terminated silicon product.

Figure 40:
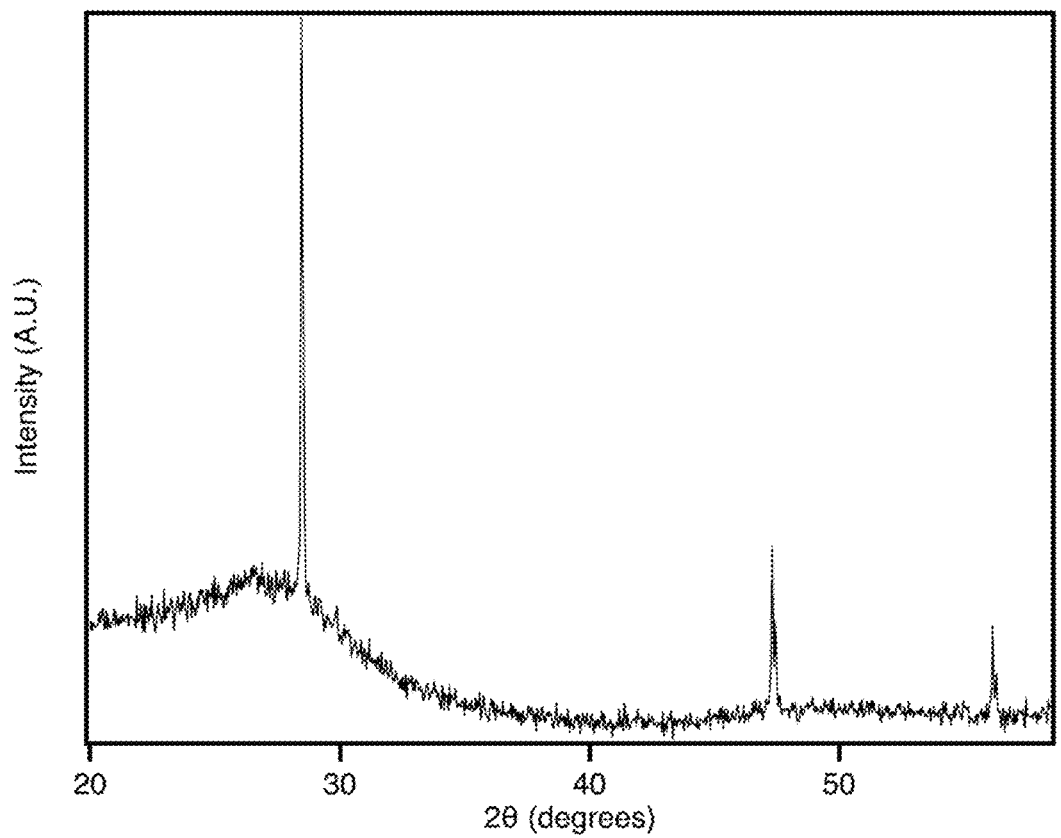
FIG. 40 shows the powder XRPD pattern of the hydrogen terminated silicon prepared in Example 6.

FIG. 40 show's the powder XRPD pattern of the hydrogen terminated silicon product. Three peaks due to the presence of a low percentage (<1%) of residual silicon impurity present in the $Mg_2Si$ starting material can be observed.

Figure 41:
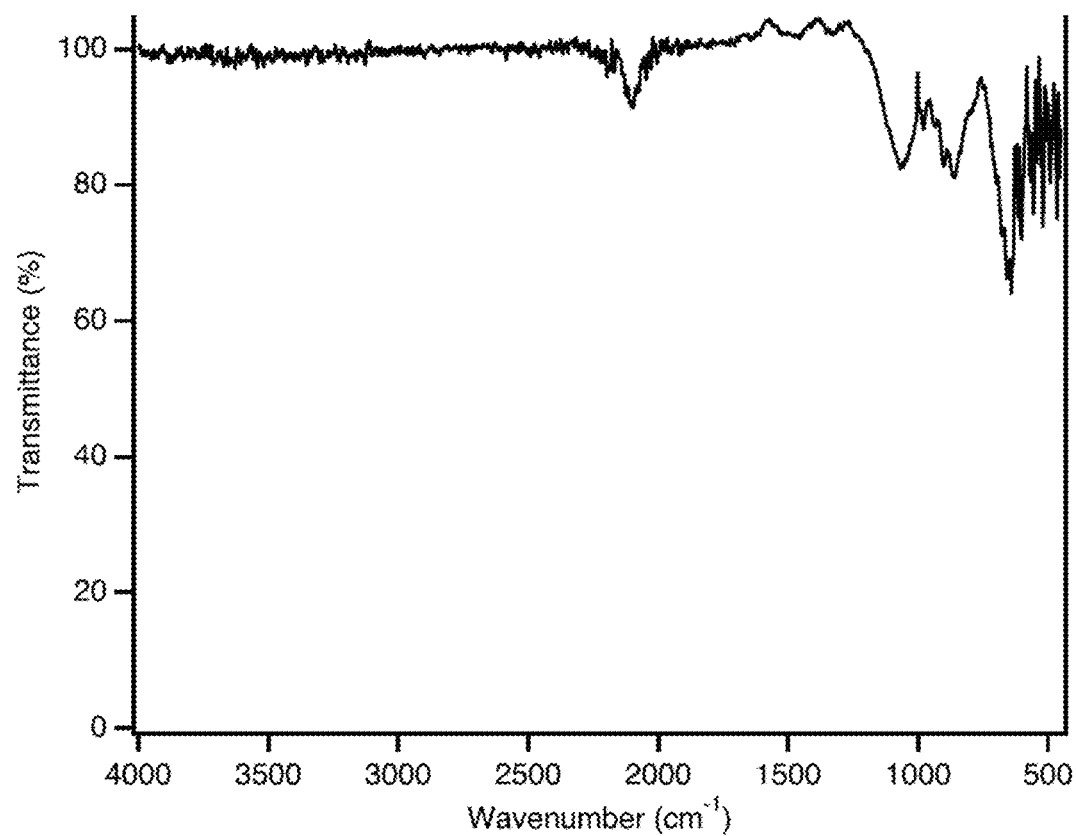
FIG. 41 shows the Infrared (IR) ATR spectrum of the hydrogen terminated silicon prepared in Example 6.

FIG. 41 shows the Infrared (IR) ATR spectrum of the hydrogen terminated silicon product. Peaks observed at approximately 2100 $cm^{-1}$ (Si—H stretch); 1060 $cm^{-1}$ (Q-Si-Q stretch), 910 $cm^{-1}$ and a shoulder 660 $cm^{-1}$ ($Si—H_x$ stretch), 620 $cm^{-1}$ (Si—Si stretch) are all in agreement with literature results for hydrogen terminated highly porous amorphous silicon. See, e.g., FIG. 4.5 at page 83 of Becker, "Galvanic Porous Silicon: Processing and Characterization for Nanoenergetics," Mechanical Engineering Graduate Theses & Dissertations, University of Colorado at Boulder, 2010.

Figure 42:
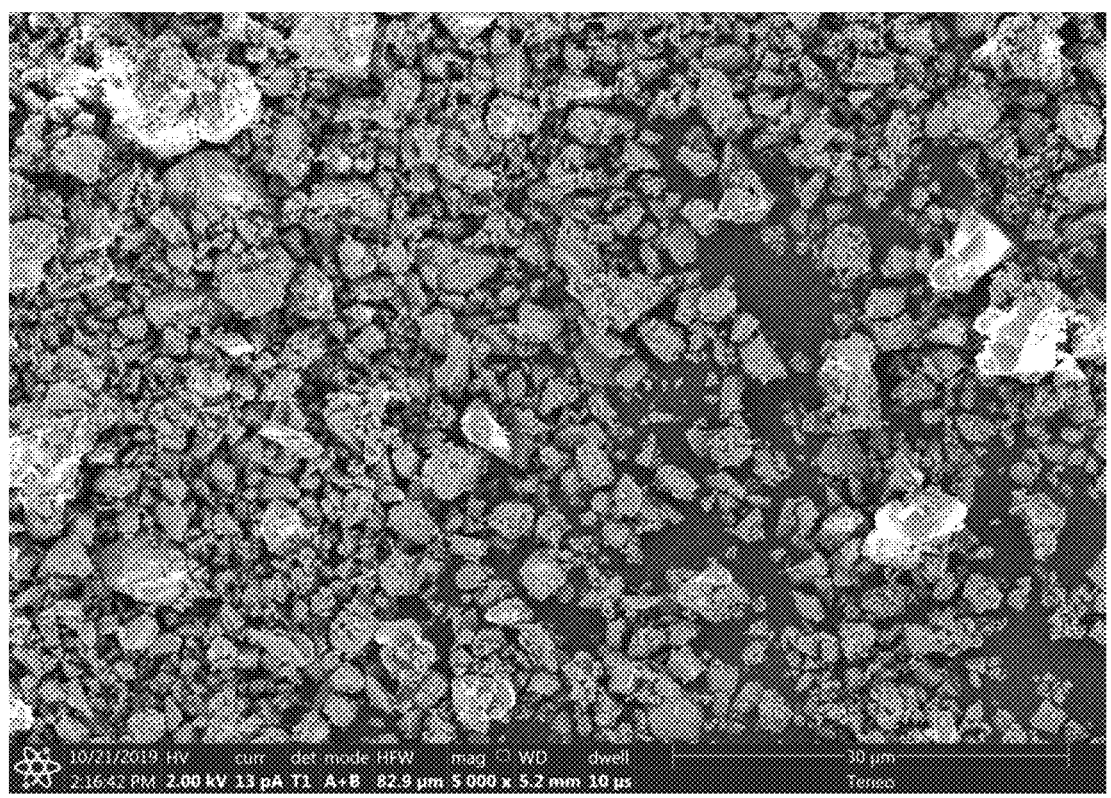
FIG. 42 is an SEM image of the hydrogen terminated silicon prepared in Example 6.

FIG. 42 is an SEM image of the hydrogen terminated silicon product.

Figure 43:
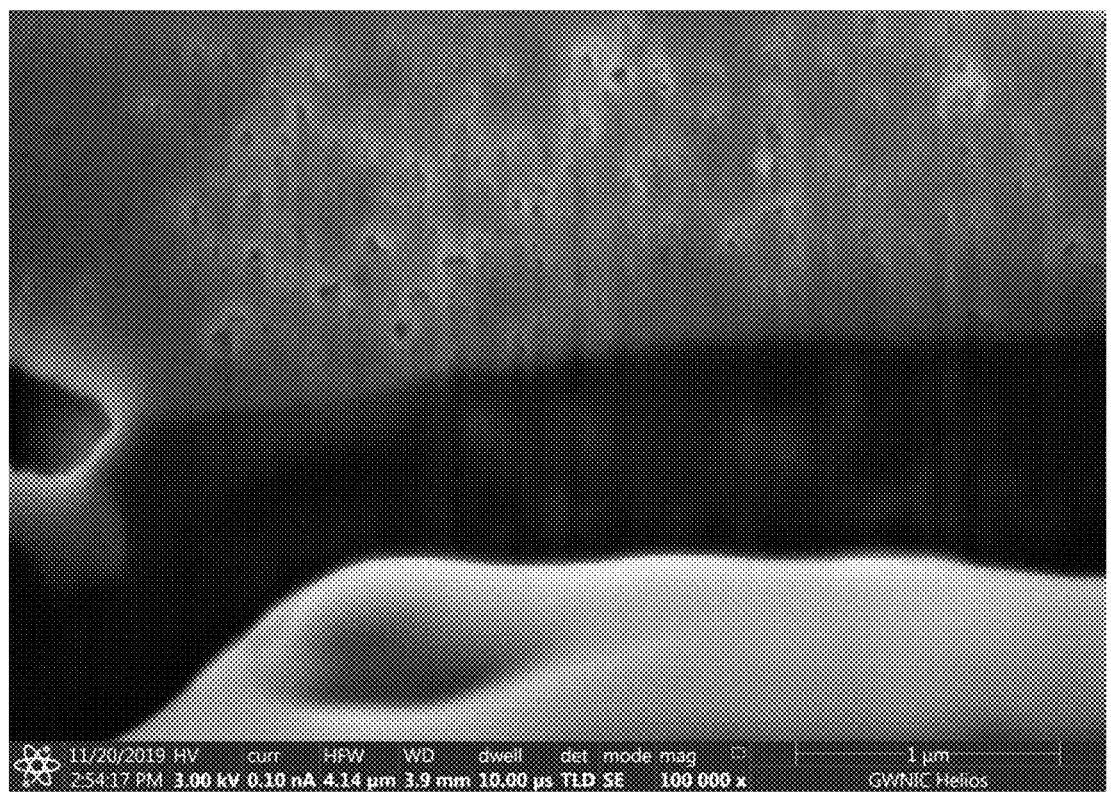
FIG. 43 is a focused ion beam (FIB) cross section of the purified hydrogen terminated silicon in Example 6.

FIG. 43 is a focused ion beam (FIB) cross section of the purified hydrogen terminated silicon showing internal porosity (the lighter, upper half of image). The dark middle image is the bottom of ion etched well, and the light foreground is a surface of sample in which the well was etched.

Figure 44:
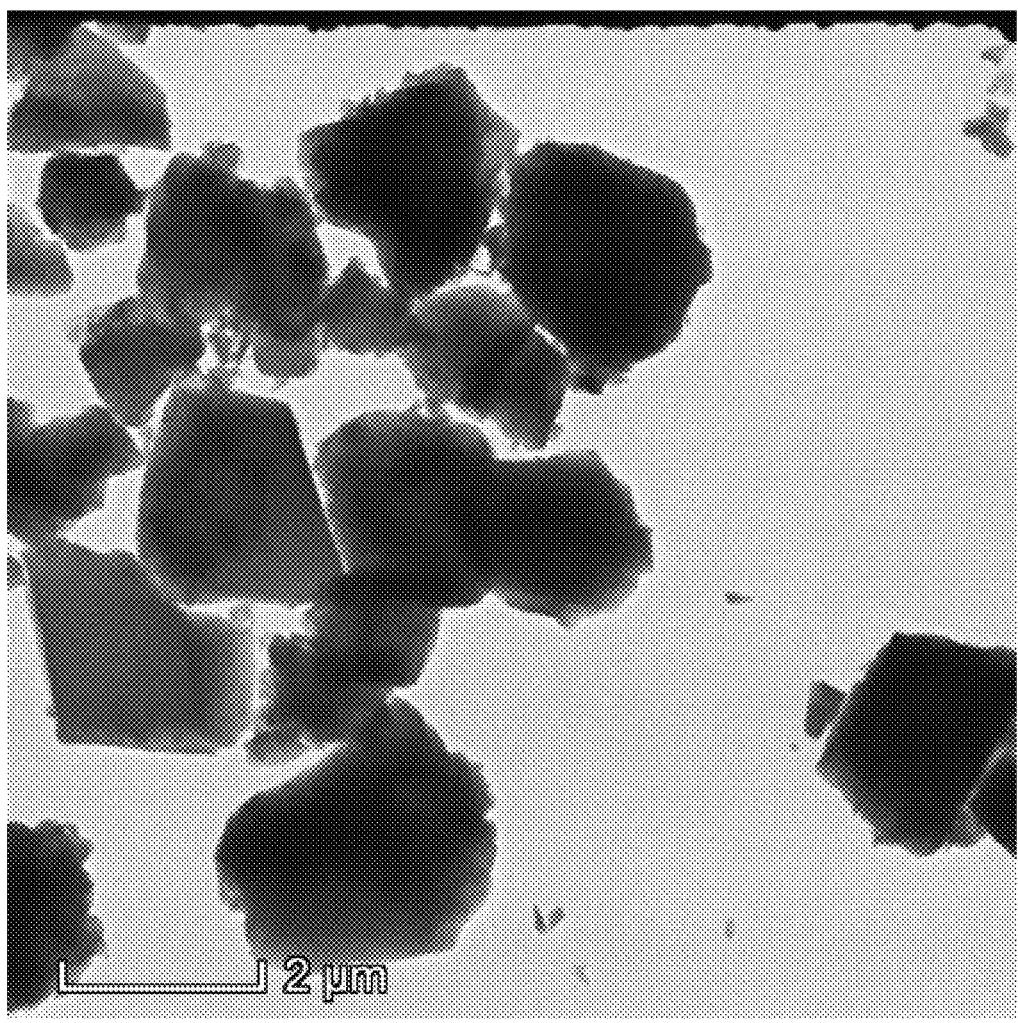
FIG. 44 is a TEM image of the hydrogen terminated silicon in Example 6.

FIG. 44 is a TEM image of the hydrogen terminated silicon product.

Figure 45:
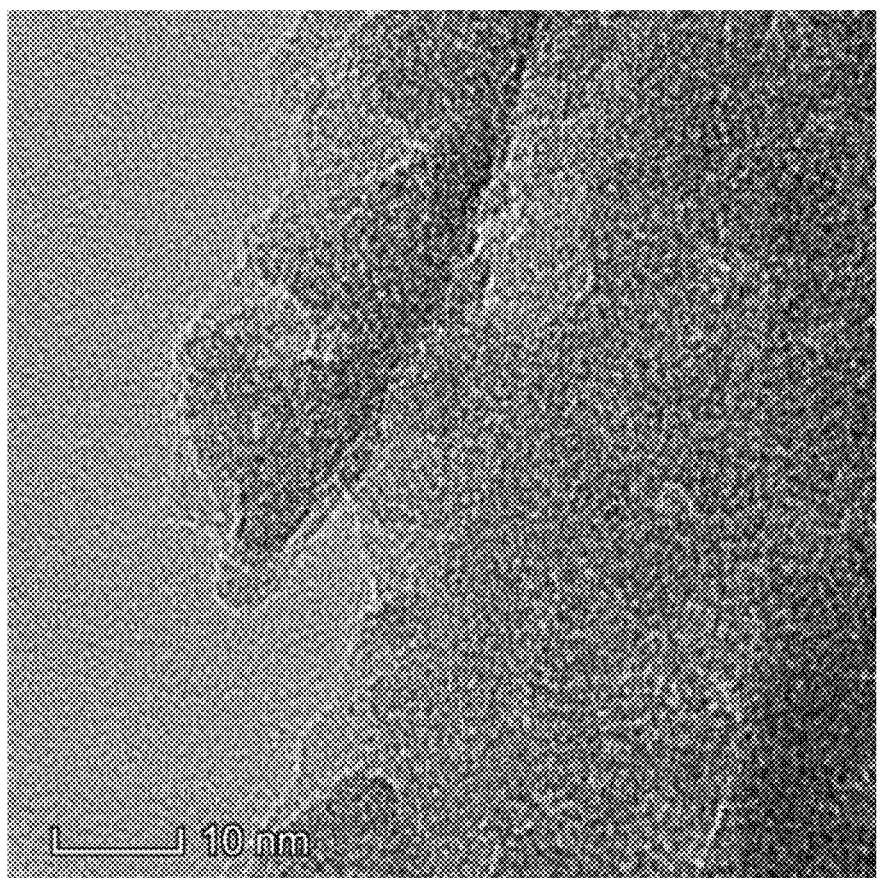
FIG. 45 is HRTEM image of the hydrogen terminated silicon prepared in Example 6, showing its amorphous structure and porosity.

FIG. 45 is HRTEM image of the hydrogen terminated silicon product, showing its amorphous structure and porosity.

Figure 46A:
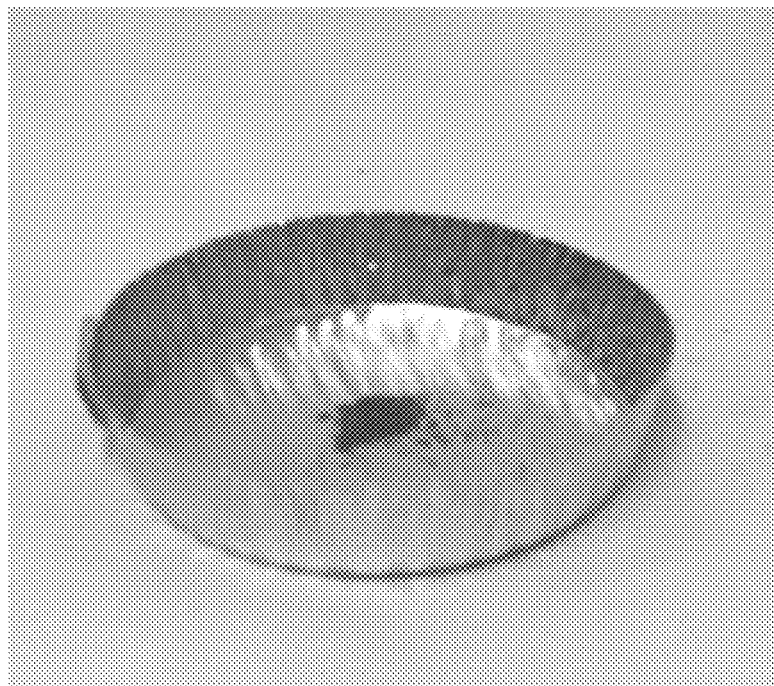
FIG. 46(*a*) shows a sample of the hydrogen terminated silicon prepared in Example 6, prior to oxidation and ignition.

FIG. 46(a) shows a sample of the hydrogen terminated silicon product prior to oxidation and ignition.

Figure 46B:
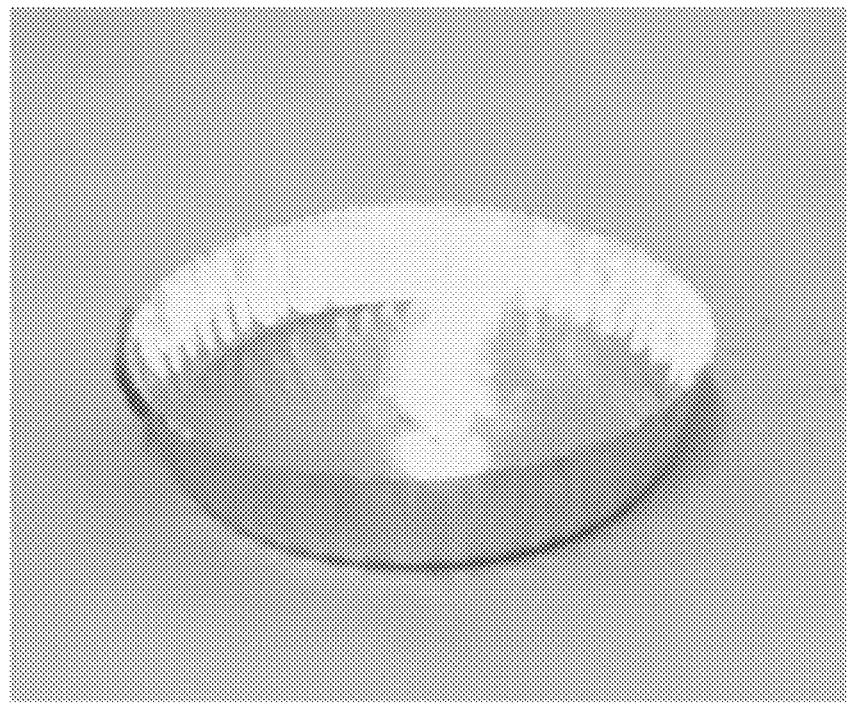

FIG. 46(b) shows a sample of the hydrogen terminated highly porous amorphous silicon product after oxidation and ignition following addition of concentrated nitric acid.

Figure 47A:
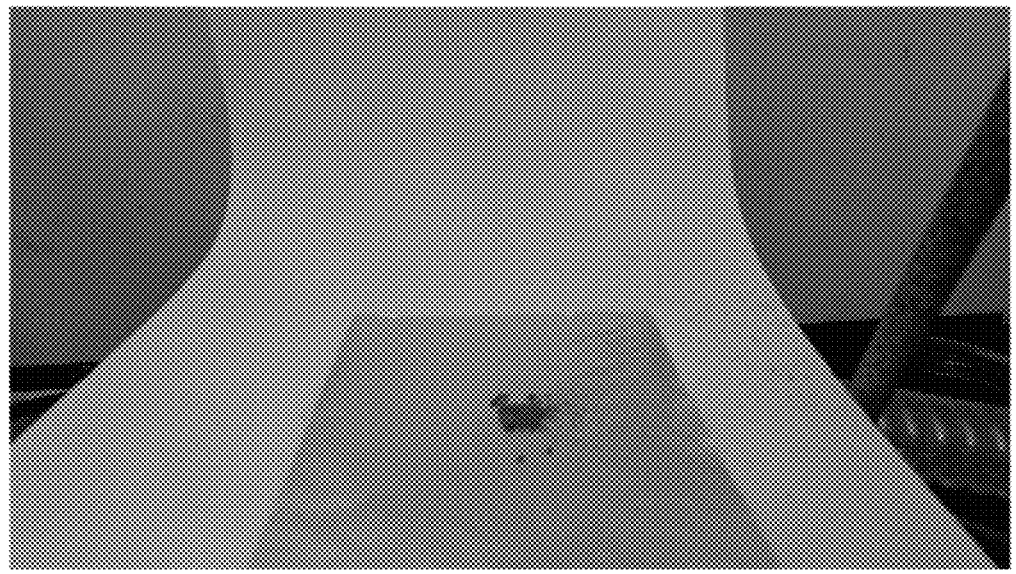
FIG. 47(*a*) shows a sample of the hydrogen terminated silicon prepared in Example 6, prior to oxidation and ignition.

FIG. 47(a) shows a sample of the hydrogen terminated highly porous amorphous silicon product prior to oxidation and ignition.

Figure 47B:

FIG. 47(b) shows a sample of the hydrogen terminated highly porous amorphous silicon product after oxidation and ignition following addition of concentrated nitric acid.

What is claimed is:

1. A process for preparing hydrogen terminated silicon, the process comprising:
   a) reacting a silicon containing Zintl compound with an aluminum compound, optionally in the presence of a support material
   b) optionally isolating the resulting product;
   c) adding a hydroxyl containing compound to produce the hydrogen terminated silicon; and
   d) optionally isolating the hydrogen terminated silicon, wherein step a) is conducted:
      i) by mechanical milling;
      ii) in a solvent; or
      iii) in a molten salt comprising the aluminum compound in combination with one or more alkali metal halides, alkali earth metal halides, or any combination thereof.

2. The process according to any one of claim 1, wherein the hydrogen terminated silicon is substantially amorphous.

3. The process according to claim 1, wherein the hydrogen terminated silicon has a surface area of about 100 to about 1500 $m^2/g$.

4. The process according to claim 1, wherein the hydrogen terminated silicon has a porosity of about 40 to about 90%.

5. The process according to claim 1, wherein the hydrogen terminated silicon has a Barret-Joyner-Halenda (BJH) desorption cumulative pore volume of about 0.4 to about 1.1 $cm^3/g$.

6. The process according to claim 1, wherein the hydrogen terminated silicon has an average Barret-Joyner-Halenda (BJH) desorption pore width of about 1 to about 40 nm.

7. The process according to claim 1, wherein the hydroxyl containing compound is an alcohol, a hydroxyl containing polymer, a carboxylic acid, or any combination thereof.

8. The process according to claim 1, wherein the hydroxyl containing compound is an alcohol.

9. The process according to claim 1, wherein the hydroxyl containing compound is methanol, ethanol, propanol, iso-propanol, pentanol, hexanol, or any combination thereof.

10. The process according to claim 1, wherein step c) further comprises adding an inorganic acid.

11. The process according to claim 1, wherein step c) further comprises adding hydrochloric acid.

12. The process according to claim 1, wherein the Zintl compound is a compound comprising a) a Group 1 metal, a Group 2 metal, or any combination thereof, and b) silicon.

13. The process according to claim 1, wherein the Group 1 and/or Group 2 metal is selected from Li, Na, K, Rb, Cs, Be, Mg, Cn, Sr, Ba, and any combination thereof.

14. The process according to claim 1, wherein the Group 1 and/or Group 2 metal is Mg.

15. The process according to claim 1, wherein the Zintl compound is $Mg_2Si$.

16. The process according to claim 1, wherein the aluminum compound is selected from halides, oxides, alkoxides, hydroxides, sulfates, sulfites, nitrates, nitrites, phosphates, and phosphites of aluminum, hydrates of any of the foregoing, and any combination thereof.

17. The process according to claim 1, wherein the aluminum compound is an aluminum halide.

18. The process according to claim 1, wherein the aluminum compound is $AlCl_3$, $AlBr_3$, $AlI_3$, or any combination thereof.

19. The process according to claim 1, wherein the support material, if present, is selected from carbonaceous materials, metals, glasses, oxides, nitrides, borides, and any combination thereof.

20. The process according to claim 1, wherein the support material, if present, is a carbonaceous material selected from carbon spheres, graphite, carbon nanotubes, carbon nanofibers, carbon fibers, hard and soft carbons, activated carbons, carbon blacks, amorphous carbons, soots, graphene, fullerenes, coal, coke, fossil fuel derived materials, biomass, biochar, charcoal, chars, and any combination thereof.

21. The process according to claim 1, wherein the support material, if present, is selected from a multiwall graphene nanoshell (MGNS), graphite, and any combination thereof.

22. The process according to claim 1, wherein step a) is conducted in a solvent, in the solid state, by molten salt or by solid/solid reaction.

23. The process according to claim 1, wherein step a) is conducted in a molten salt comprising an aluminum compound, optionally in combination with one or more alkali metal halides, alkali earth metal halides, or any combination thereof.

24. The process according to claim 1, wherein step a) is conducted in a solvent selected from aromatic hydrocarbons, nonaromatic hydrocarbons, amines, aprotic solvents, and any combination thereof.

25. The process according to claim 1, wherein step a) is conducted in a solvent selected from cyclohexane, toluene, and any combination thereof.

26. The process according to claim 1, wherein step a) is conducted at a temperature ranging between about 50° C. and about 600° C.

27. The process according to claim 1, wherein the hydrogen terminated silicon comprises between 0 and about 20 wt. % Al.

28. The process according to claim 1, wherein step a) is conducted at a temperature ranging between about 50° C. and about 200° C.

29. The process according to claim 1, wherein step a) is conducted at a temperature ranging between about 100° C. and about 200° C.

30. The process according to claim 1, wherein step a) is conducted at a temperature ranging between about 120° C. and about 180° C.

31. The process according to claim 1, wherein step a) is conducted at a temperature of about 125° C.

32. The process according to claim 1, wherein step a) is conducted at a temperature of about 180° C.

33. The process according to claim 1, wherein the hydrogen terminated silicon comprises between 0 and about 15 wt. % Al.

34. The process according to claim 1, wherein the hydrogen terminated silicon comprises between 0 and about 10 wt. % Al.

35. The process according to claim 1, wherein the hydrogen terminated silicon comprises between 0 and about 5 wt. % Al.

36. The process according to claim 1, wherein the hydrogen terminated silicon comprises between 0 and about 4 wt. % Al.

37. The process according to claim 1, wherein the hydrogen terminated silicon comprises between 0 and about 3 wt. % Al.

38. The process according to claim 1, wherein the hydrogen terminated silicon comprises between 0 and about 2 wt. % Al.

39. The process according to claim 1, wherein the hydrogen terminated silicon comprises between 0 and about 1 wt. % Al.

40. The process according to claim 1, wherein the hydrogen terminated silicon comprises between about 1 and about 3 wt. % Al.

* * * * *